United States Patent
Johnson

(10) Patent No.: US 12,553,345 B2
(45) Date of Patent: Feb. 17, 2026

(54) ORGANIC RANKINE CYCLE DECOMPRESSION HEAT ENGINE

(71) Applicant: Heat Source Energy Corp., American Fork, UT (US)

(72) Inventor: Keith Sterling Johnson, American Fork, UT (US)

(73) Assignee: Heat Source Energy Corp., American Fork, UT (US)

( * ) Notice: Subject to any disclaimer, the term of this patent is extended or adjusted under 35 U.S.C. 154(b) by 0 days.

(21) Appl. No.: 19/201,398

(22) Filed: May 7, 2025

(65) Prior Publication Data
US 2025/0270932 A1 Aug. 28, 2025

Related U.S. Application Data

(63) Continuation of application No. PCT/US2023/078968, filed on Nov. 7, 2023.

(60) Provisional application No. 63/382,648, filed on Nov. 7, 2022.

(51) Int. Cl.
| | |
|---|---|
| *F01C 1/02* | (2006.01) |
| *F01K 7/36* | (2006.01) |
| *F01K 25/08* | (2006.01) |

(52) U.S. Cl.
CPC .............. *F01C 1/0207* (2013.01); *F01K 7/36* (2013.01); *F01K 25/08* (2013.01)

(58) Field of Classification Search
CPC .......... F01C 1/0207; F01K 7/36; F01K 25/08
See application file for complete search history.

(56) References Cited

U.S. PATENT DOCUMENTS

| | | | |
|---|---|---|---|
| 2005/0235670 A1 | 10/2005 | Takeuchi | |
| 2006/0213218 A1 | 9/2006 | Uno | |
| 2007/0245732 A1 | 10/2007 | Uno | |
| 2009/0295881 A1* | 12/2009 | Tasaka | B41J 2/1707 347/85 |
| 2015/0369086 A1* | 12/2015 | Johnson | F01K 23/08 60/671 |
| 2018/0156072 A1* | 6/2018 | Johnson | F01K 25/065 |
| 2021/0402039 A1* | 12/2021 | Cadwell | A61L 9/16 |

OTHER PUBLICATIONS

International Search Report and Written Opinion regarding International Application No. PCT/US2023/078968, mailed Feb. 13, 2024.

* cited by examiner

*Primary Examiner* — Hoang M Nguyen
(74) *Attorney, Agent, or Firm* — Miller Johnson

(57) ABSTRACT

A heat engine is configured to receive a high-pressure fluid and release a low-pressure fluid. The heat engine includes a main housing including an expansion tank and a generator housing. The heat engine includes a scroll decompressor disposed in the expansion tank. The scroll decompressor is configured to progressively decompress the high-pressure fluid to the low-pressure fluid while rotating a main shaft. The heat engine includes a generator disposed in the generator housing. The generator is driven by the main shaft. The heat engine includes a coupling disposed on the main housing configured to couple with a power receiving device. The coupling is configured to transfer rotational motion of the generator to a rotational input of the power receiving device.

22 Claims, 21 Drawing Sheets

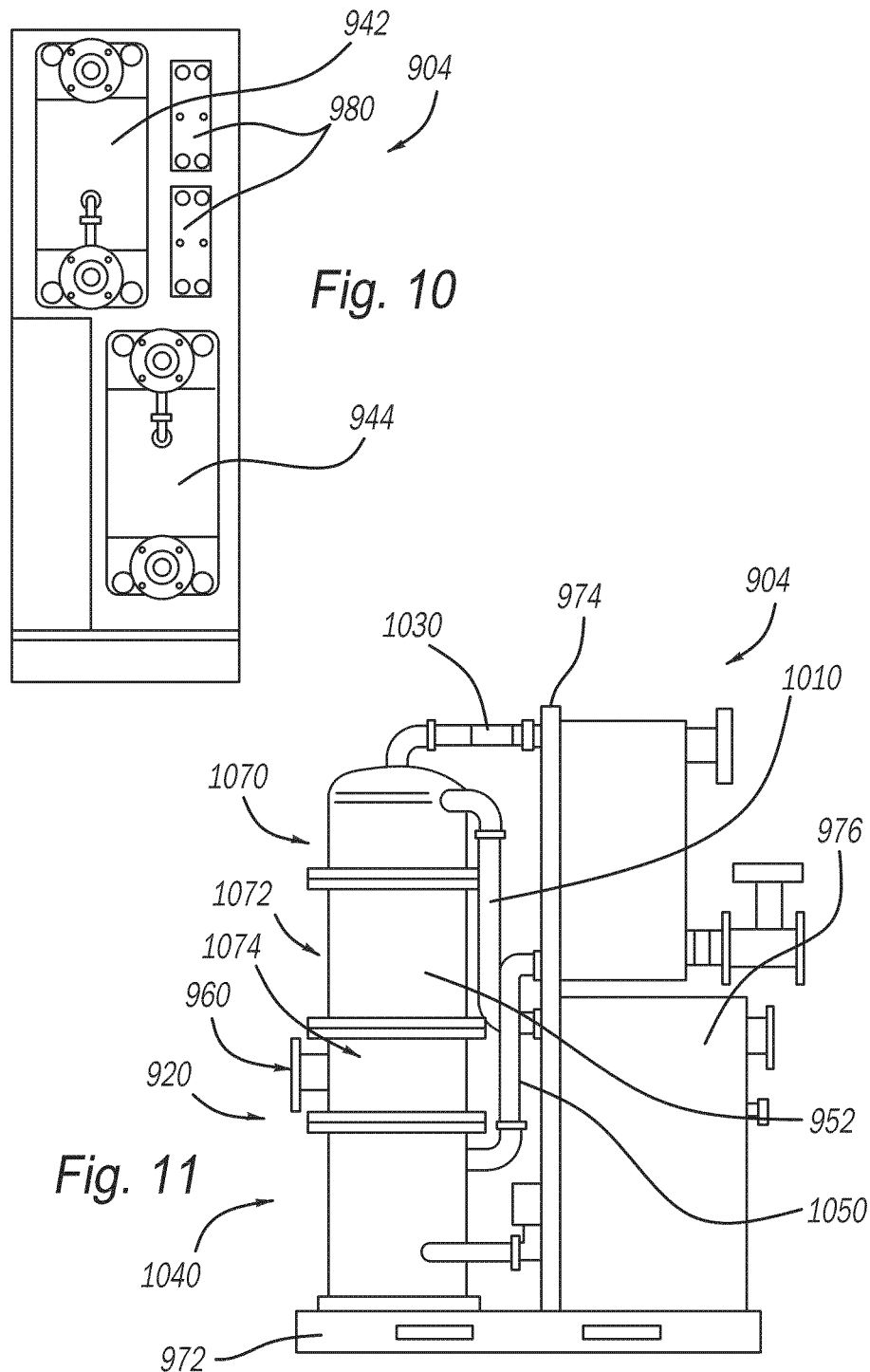

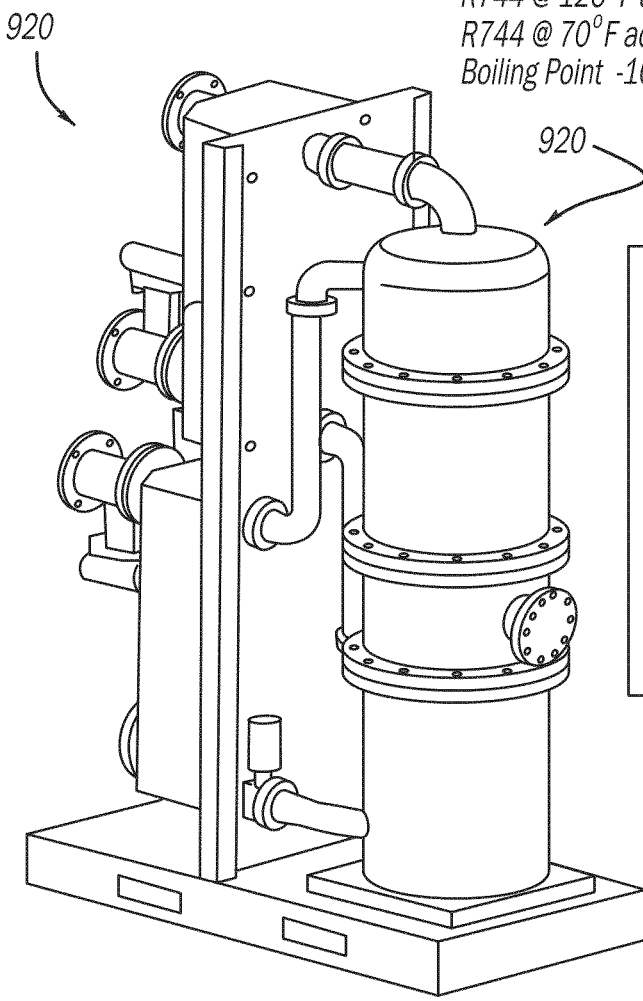

CPP @ 126°F Heat Input
450psi differential energy

*126°F Hot T in 70°F Cold T in
*Overall Delta T= 56°F
*Maximum Possible Carnot Efficiency = 10%
*Actual Efficiency = 8%
*Percentage of Carnot 8% / 10% = 80% +
Pressure Differential Decompression Technology
 *R744 = 1,287psi decompressed to 837psi = 450psi Decompressed R744 @ 126°F achieves 1,287psi
R744 @ 70°F achieves 837psi
Boiling Point -108°F. (450psi Diff)

Compact Power Pack
Use Case Six

Net Output
 30 to 40 kWe net
Temperature range hot
 90°F/32°C x 131°F/55°C
Temperature range cold
 34°F to 75°F
LxWxH
 45 x 33 x 65 inches

Fig. 20

*Built-on air cooling system (OFAF/ODAF)*

*Built-on oil/water cooler (OFWF/ODWF)*

ORGANIC RANKINE CYCLE DECOMPRESSION HEAT ENGINE

CROSS-REFERENCE TO RELATED APPLICATIONS

This application is a continuation of PCT International Application PCT/US23/78968 filed Nov. 7, 2023, which claims the benefit of U.S. Provisional Application No. 63/382,648, filed Nov. 7, 2022. The entire disclosures of the above applications are incorporated by reference.

FIELD

This disclosure relates generally to organic Rankine cycle systems and, more particularly, to an improved heat engine that includes an organic refrigerant exhibiting a boiling point below about −35° C. Embodiments of the present disclosure also relate generally to systems and methods for power generation and other processes involving compressed refrigerants. For example, the systems and methods may be used for generating electricity from a heat source.

BACKGROUND

The Rankine cycle is a thermodynamic cycle that converts heat into work. The heat is supplied externally to a closed loop, which usually uses water as the working fluid. This cycle generates about 80% of all electric power used throughout the world, and is used by the majority of solar, thermal, biomass, coal and nuclear power plants. The combustion of coal, natural gas, and oil, as well as nuclear fission, commonly provides the heat for power plants employing the Rankine cycle. Rankine cycle power systems typically transform thermal energy into electrical energy. A conventional Rankine cycle power system employs the following four basic steps: (1) thermal energy is used in a boiler to heat liquid water into steam; (2) the steam is passed through a turbine, which, in turn, drives an electric generator; (3) the steam is condensed back into water in the liquid phase to form a condensate by discharging the remaining thermal energy in the steam to the environment; and (4) the condensate is pumped back to the boiler.

In the ideal Rankine cycle, the expansion is isentropic and the evaporation and condensation processes are isobaric. However, the presence of irreversibilities in the real world lowers the efficiency of the Rankine cycle. The irreversibilities are primarily attributable to two factors. The first irreversibility is that during expansion of the gas (e.g., in the turbine), only a part of the energy recoverable from the pressure difference is transformed into useful work, while the other part is converted into heat and is lost. The efficiency of the expander is stated as a percentage of work that would be performed by a theoretical isentropic expansion, in which entropy remains constant. The second irreversibility is heat exchanger inefficiency caused by pressure drops associated with the long and sinuous paths that ensure good heat exchange (e.g., in the boiler), but lower the power recoverable from the cycle.

The efficiency of a Rankine cycle is a function of the physical properties of the working fluid. Without the pressure of the working fluid reaching super critical levels, the temperature range over which the Rankine cycle can operate is quite small. For example, turbine entry temperatures are typically 565° C. (the creep limit of stainless steel) and condenser temperatures are around 30° C. This results in a theoretical Carnot efficiency of about 63% compared with an actual efficiency of 42% for a modern coal-fired power station. This low turbine entry temperature (compared with an internal-combustion gas turbine) is why the Rankine cycle is often used as a bottoming cycle in combined cycle gas turbine power stations. The working fluid in a Rankine cycle follows a closed loop and is re-used continually as it is heated to a vapor, passed through an expander (e.g., generator), condensed, and cycled back to the heater.

While many working fluids have been used in the Rankine cycle, water is usually the fluid of choice because it is abundant, inexpensive, nontoxic, and generally non-reactive nature. In addition, water possesses favorable thermodynamic properties. Organic Rankine cycles have been developed to enable the recovery of energy from lower temperature sources, such as industrial waste heat, geothermal heat, solar ponds, and so forth. The organic Rankine cycle (ORC) is named for its use of an organic, high molecular mass fluid having a liquid-vapor phase change, or boiling point, that occurs at a lower temperature than the water-steam phase change. Using the ORC, low-temperature heat can be converted to useful work, which, for example, can be harnessed to generate electricity.

SUMMARY

A heat engine can be configured to receive a high-pressure fluid and release a low-pressure fluid. The heat engine can include a main housing, a scroll decompressor, a generator and a coupling. The main housing can have an expansion tank and a generator housing. The scroll decompressor can be disposed in the expansion tank and be configured to progressively decompress the high-pressure fluid to the low-pressure fluid while rotating a main shaft. The generator can be disposed in the generator housing and be driven by the main shaft. The coupling can be disposed on the main housing and be configured to couple with a power receiving device. The coupling can be configured to transfer rotational motion of the generator to a rotational input of the power receiving device.

In additional examples, the main housing further comprises a power take-off (PTO) housing. The PTO housing can comprise gears to convert rotation of the main shaft to an input of the coupling. The coupling can comprise a magnetic coupling. The power receiving device can comprise one of a power generator, an air compressor, a heat pump, a gear driven device, an electric vehicle and a mechanical pump.

In examples, the main housing can further comprise a refrigerant tank that houses a refrigerant pump configured to pump a refrigerant. The refrigerant pump can be configured to be driven by the main shaft. The refrigerant can comprise R 744. An evaporator can be coupled to the refrigerant tank through a high-pressure liquid pipe. A condenser can be coupled to the refrigerant tank and be configured to provide a low-pressure liquid to the refrigerant tank. A low-pressure gas return can be configured to provide a low-pressure gas from the scroll decompressor to the condenser.

In examples, the scroll decompressor comprises an outlet open to the atmosphere. In other arrangements, the scroll decompressor comprises an outlet coupled to a closed loop system. The generator can comprise a permanent magnet (PM) with an oil cooled jacket. In examples, the high-pressure fluid can include natural gas, propane, carbon dioxide, compressed air, nitrogen and high-pressure process gas. In other examples, the high-pressure fluid comprises transformer oil. In one arrangement, the scroll decompressor can be configured to progressively decompress the high-pressure fluid to the low-pressure fluid at a ratio of 3.5:1. In another arrangement, the scroll decompressor can be configured to progressively decompress the high-pressure fluid to the low-pressure fluid at a ratio of 4:1. In examples, the scroll decompressor can be configured to decompress the high-pressure fluid by about 3.10 MPa. The generator can be configured to provide a net output of between 30 kWe to 40 kWe. The high-pressure fluid can have a high temperature range of between about 90° F. and about 131° F. The high-pressure fluid can have a cold temperature range of between about 34° F. and about 75° F. A stand can include a base and a vertical support wall. The stand can be configured to support the heat engine. In examples, the stand and the heat engine can collectively occupy a volume of about 114.3 cm by about 83.8 cm by about 165.1 cm.

In some embodiments, a method includes mixing a lubricating oil with a first portion of a refrigerant in a liquid phase to form a mixture and heating the mixture of the lubricating oil and the first portion of the refrigerant to form a heated mixture, wherein at least a portion of the first portion of the refrigerant is in a gaseous phase. The method includes mixing the heated mixture with a second portion of the refrigerant in a superheated phase and atomizing the lubricating oil to disperse the lubricating oil within the refrigerant. The refrigerant may exhibit a boiling point below about −35° C. In some embodiments, the refrigerant may include an organic material.

In other embodiments, a heat engine includes a high-pressure zone configured to facilitate the transfer of heat from at least one heat source to a refrigerant and configured to contain a first portion of the refrigerant in a gaseous phase; a low-pressure zone configured to facilitate transfer of heat from the refrigerant to at least one heat sink and configured to contain a second portion of the refrigerant in a liquid phase; a bypass zone configured to mix a third portion of the refrigerant in a liquid phase with a lubricating oil; and an atomizer comprising a mixing media configured to atomize the lubricating oil and disperse the lubricating oil within the first and third portions of the refrigerant. The refrigerant exhibits a boiling point below about −35° C. A substantially closed-loop path for the refrigerant comprises the high-pressure zone, the low-pressure zone, and the bypass zone.

In some embodiments, a system for providing a pressurized refrigerant includes a pump configured to move a first portion of a refrigerant in a liquid phase through a conduit; a mixing device for mixing a lubricating oil with the first portion of the refrigerant in the liquid phase; at least one heat source configured to transfer heat to the first portion of the refrigerant in the liquid phase; another mixing device for mixing a second portion of the refrigerant in a gaseous phase with the lubricating oil and the first portion of the refrigerant; and a mixing media configured to atomize the lubricating oil and disperse the lubricating oil within the refrigerant. The refrigerant exhibits a boiling point below about −35° C. The at least one heat source is configured to evaporate the first portion of the refrigerant.

In yet additional embodiments, a heat engine configured to receive a high-pressure fluid and release a low-pressure fluid comprises a main housing having an expansion tank and a generator housing, a scroll decompressor disposed in the expansion tank, the scroll decompressor configured to progressively decompress the high-pressure fluid to the low-pressure fluid while rotating a main shaft, a generator disposed in the generator housing, the generator being driven by the main shaft; and a coupling disposed on the main housing configured to couple with a power receiving device, the coupling configured to transfer rotational motion of the main shaft to a rotational input of the power receiving device.

BRIEF DESCRIPTION OF THE DRAWINGS

FIG. 10 is a simplified partial back view of the compact power pack of FIG. 7;

FIG. 11 is a simplified partial left side view of the compact power pack of FIG. 7;

FIG. 20 is a front perspective view of a pressure differential decompression unit having various operating temperatures and efficiencies according to another example;

DETAILED DESCRIPTION

Introduction

Figure 1:
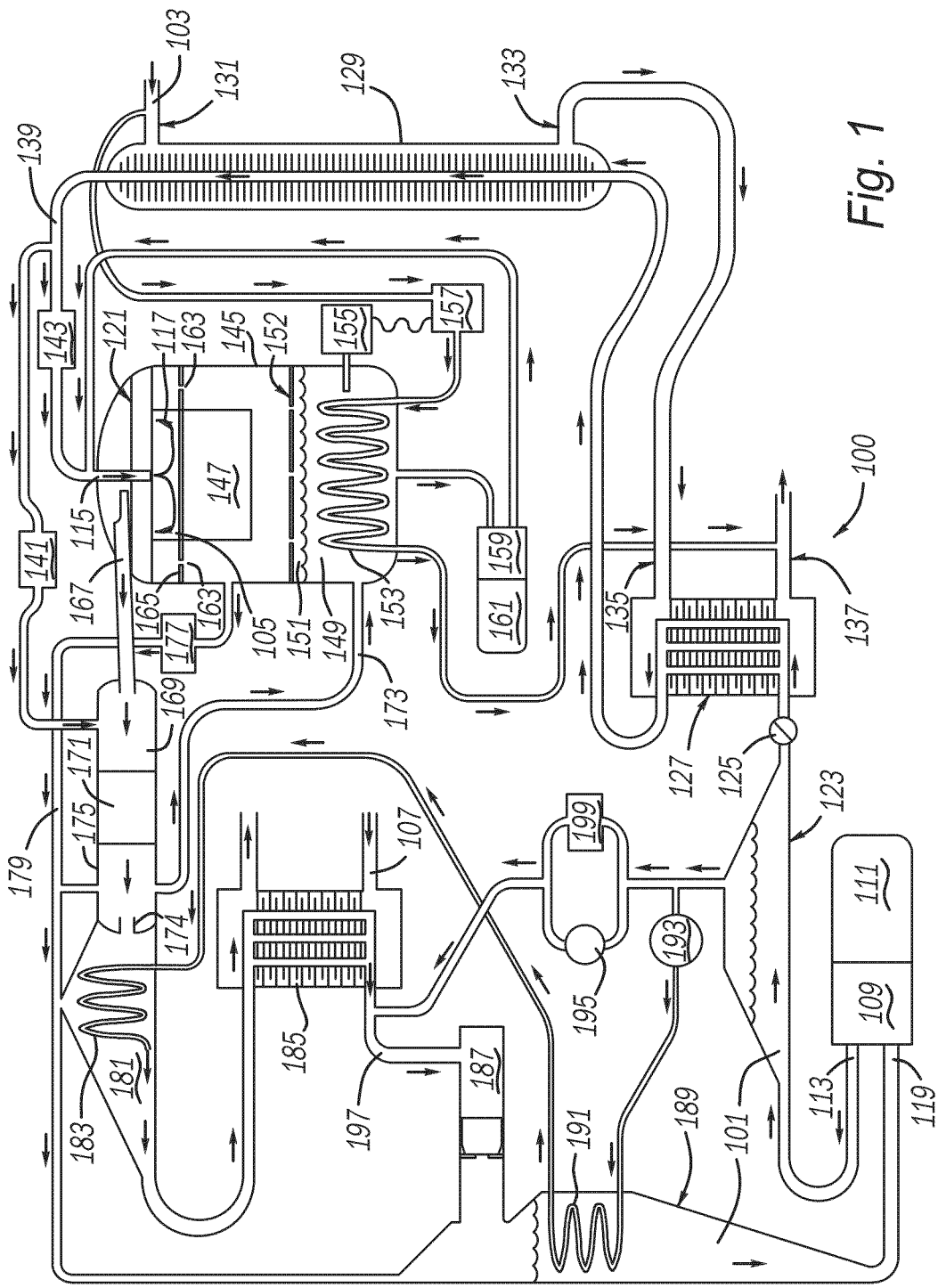
FIG. 1 is a simplified schematic diagram of an organic Rankine cycle decompression heat engine, in accordance with embodiments of the disclosure.

The following description provides specific details, such as material types, compositions, material thicknesses, and processing conditions in order to provide a thorough description of embodiments of the disclosure. However, a person skilled in the art will understand that embodiments of the disclosure may be practiced without employing these specific details. Indeed, embodiments of the disclosure may be practiced in conjunction with conventional techniques employed in the industry. In addition, the description provided below does not form a complete process flow for providing pressurized fluids or operating heat engines. Only those process acts and structures necessary to understand the embodiments of the disclosure are described in detail below. A person skilled in the art will understand that some process components (e.g., pipes, line filters, valves, temperature detectors, flow detectors, pressure detectors, etc.) are inherently disclosed herein and that adding various conventional process components and acts would be in accord with the disclosure. Additional acts or materials may be provided by adding conventional elements to those disclosed.

According to embodiments described herein, a heat engine configured to employ an ORC comprises an organic refrigerant having a boiling point below −35° C.; a heat source (e.g., a hot water heat source) having a temperature less than 82° C.; a heat sink; a sealed, closed-loop path for the organic refrigerant, the closed-loop path having a high-pressure zone configured to facilitate the transfer of heat from the heat source to the organic refrigerant, the high-pressure zone containing a first portion of the organic refrigerant in at least a gaseous phase, and a low-pressure zone configured to facilitate the transfer of heat from the organic refrigerant to a heat sink and containing a second portion of the organic refrigerant in at least a liquid phase; a positive-displacement decompressor configured to provide a pressure gradient between the high-pressure zone and the low-pressure zone and through which the organic refrigerant in the gaseous phase is configured to continuously flow, the decompressor configured to extract mechanical energy from the organic refrigerant based on the pressure differential, wherein the pressure differential is between about 20 bar and about 42 bar; an electrical generator coupled to the decompressor configured to convert the extracted mechanical energy to electrical energy; and a positive-displacement hydraulic pump configured to provide continuous flow of the organic refrigerant in the liquid phase from the low-pressure zone to the high-pressure zone. Since the heat engine comprises a positive-displacement decompressor, the heat engine may be referred to herein as a "decompression heat engine."

In use and operation, the organic refrigerant is cycled between the high-pressure zone and the low-pressure zone and between the liquid phase and the vapor phase. In some embodiments, each of the high-pressure zone and the low-pressure zone include the organic refrigerant in the liquid phase and in the vapor phase. The high-pressure zone and the low-pressure zone are separated from one another by the positive-displacement decompressor and the positive-displacement hydraulic pump. The positive-displacement decompressor decompresses (e.g., reduces the pressure of) a heated organic refrigerant from a high-pressure vapor state to a lower pressure vapor state, thereby creating mechanical work. In some embodiments, the positive-displacement decompressor does not include pistons or valves interrupting the flow of the organic refrigerant, facilitating a continuous and substantially uninterrupted flow of the organic refrigerant and improved efficiency of the positive-displacement decompressor.

The disclosed ORC heat engine provides advantages compared to conventional ORC heat engines. For example, the disclosed ORC heat engine is configured to generate power based primarily on a differential pressure of the organic refrigerant. By way of comparison, conventional ORC heat engines generate power based on a high mass flow rate at a high velocity of the refrigerant through an expander with a high differential temperature. Because of the high mass flow requirements of an ORC, the types of working fluids and/or refrigerants that may be used in conventional ORCs are limited. For example, a conventional ORC utilizes a high-velocity fluid at a low pressure (e.g., at pressures lower than about 20 bar) to produce mechanical work. Thus, the mechanical work of a conventional ORC heat engine is achieved with a relatively low pressure at a high flow rate working fluid. For example, during conventional ORC with an R 245a working fluid, the working fluid flashes (e.g., changes from liquid to vapor phase) at a temperature within a range of from about 93° C. to about 149° C. and returns back to the liquid phase at close to ambient temperatures (approximately 21° C.). During the phase change of conventional heat engines, the pressure differential ranges from about 0.69 bar to about 1.38 bar at a temperature range of from about 12.8° C. to about 21° C. on the cool side (e.g., at the condenser) and from about 10.9 bar to about 13.8 bar at a temperature range of from about 93° C. to about 149° C. on the hot side (e.g., at the expander or evaporator (e.g., heat exchanger)). The force to achieve mechanical work is a high flow rate of the working fluid at a high-velocity vapor before the expander/driver at a pressure within a range of from about 6.9 bar to about 13.8 bar.

The working fluid in an ORC must flow at a high rate through the heat exchange process to transfer heat to and from the working fluid (e.g., at the respective evaporator and condenser). The high flow rate of the working fluid correlates to a high-power requirement for moving the working fluid and reduces the efficiency of the ORC heat engine (e.g., increases the amount of BTU required per kW of power generated). The prime mover in an ORC is designed to provide resistance to a high-mass, high-velocity vapor force, but is not positive displacement because a positive-displacement prime mover can compress vapor to a fluid at its inlet and slow down the driver.

By way of comparison, the heat engine disclosed herein comprises a positive-displacement decompressor and is configured to generate the same amount of power of a lower flow rate of the organic refrigerant compared to conventional ORC heat engines. By way of non-limiting example, the disclosed heat engine utilizes working fluid at a high-pressure super-heated vapor at approximately 41.4 bar and 65.6° C. and decompresses the working fluid in the positive-displacement prime mover to a lower pressure vapor at approximately 13.8 bar and 21° C. The differential pressure (delta P) of the working fluid is about 27.6 (41.4 bar minus 13.8 bar) and is converted into mechanical work. The differential pressure energy function is similar to a refrigerant compressor operating in reverse. Advantageously and surprising, while a compressor that can move 105 kW of heat may require a 62 kW electrical motor to compress a refrigerant to a 41.4 bar high-pressure vapor at 65.6° C., the heat engine of the disclosure may generate more than 62 kW of power when the high-pressure working fluid is at 65.6° C. is forcing the compressor process in the opposite direction (i.e., expanding through a generator). The waste heat energy, for example, is the energy force driving the reverse compressor process to generate electricity rather than electricity being the force to compress a cool vapor/gas to a hot vapor/gas.

By using the differential pressure of the organic refrigerant (which is facilitated with the positive-displacement decompressor), the disclosed heat engine facilitates the use of an organic refrigerant having a relatively lower boiling point and configured to operate at relatively higher pressures than refrigerants used in conventional ORC heat engines. The higher differential pressure of the organic refrigerant within the heat engine facilitates operation of the heat engine with a lower differential temperature compared to conventional ORC heat engines. As one example, the extractable energy using the ORC heat engine described herein with 27.6 bar pressure differential is much greater than the energy that can be extracted using a conventional ORC heat engine with a 9.65 bar energy pressure differential.

In some embodiments, the disclosed ORC may be configured to facilitate generation of electricity from a heat source having a temperature less than about 82° C. Conventional ORC heat engines do not recover significant energy from such low-temperature heat sources.

The heat engine is configured to capture energy from low heat energy more abundantly available (below 82° C.) than higher temperature heat sources and convert the energy into electricity more efficiently than currently available technology. Such energy is extracted using a low boiling point refrigerant (such as R410a, which boils at approximately −51° C.) and generating electricity based on a high differential pressure of from about 20 bar to about 42 bar with a positive-displacement decompressor.

The heat engine may be configured to facilitate use of a heat sink (e.g., a cooling source) to reduce a temperature of the organic refrigerant in the low-pressure zone and remove heat to an abundant heat sink (e.g., a cold stream, a waterway, ambient air). Since the heat engine uses abundant and lower quality heat sources and heat sinks, the heat engine facilitates generation of power with renewable sources that have heretofore been unavailable for power generation.

The heat engine may be used to recover energy from various types of heat sources. The heat sources may include low-temperature natural geothermal sources (e.g., hot springs) (e.g., geothermal sources having a temperature less than about 100° C.), waste heat from industrial processes (e.g., waste heat from methane generators), heat from exhaust streams of ovens or furnaces, flue gas condensation, exhaust gases from vehicles, intercooling of a compressor, the condenser of a power cycle, heat generated from biomass, heat generated from farming processes such as organic products fermentation, manufacturing or any heat source or waste heat source available. The heat engine may also be used in solar parabolic trough technology since the disclosed heat engine facilitates a lower collector temperature, a better collecting efficiency (e.g., less ambient losses) compared to conventional heat engines. The efficiency of the heat engine may facilitate a reduction in the size of the solar field for generation of the same amount of electricity.

The heat engine utilizes suitable working fluids (e.g., refrigerants) configured to recover energy from the low-temperature heat sources. In some embodiments, the working fluid has a boiling temperature less than the boiling temperature of water. In addition, the freezing temperature of the working fluid may be less than the lowest temperature of the ORC. In some embodiments, the working fluid has low ozone depletion and low global warming potential, is non-corrosive, non-flammable, non-toxic, and is readily available at a reasonable cost.

FIG. 1 is a simplified schematic diagram of an organic Rankine cycle decompression heat engine, in accordance with embodiments of the disclosure. FIG. 1 illustrates an ordered arrangement of equipment for implementing an organic Rankine cycle decompression heat engine 100. The heat engine 100 employs a highly specialized organic Rankine cycle and provides a sealed, closed-loop path for an organic refrigerant 101 having a boiling point below −35° C.

By way of non-limiting example, the organic refrigerant 101 may include one or more of R-410A, a near-azeotropic mixture of difluoromethane and pentafluoroethane (the mixture having a boiling point of about −51° C.), R-22, R-502, R-507, R-13, R-503, R-23, ammonia (e.g., R-717), or carbon dioxide (e.g., R-744). Such refrigerants are commercially available, for example, from A irgas Refrigerants, Inc., of Lawrenceville, Ga., USA.

The heat engine 100 may use a low-grade fluid heat source 103 having a temperature of less than 82° C. In some embodiments, the fluid heat source 103 comprises a hot water heat source (e.g., a hot water heat source having a temperature less than about 82° C. Advantageously, a fluid heat source 103 comprising water facilitates rapid heat transfer due to the high specific heat of water (1 calorie/gram° C.=4.186 joule/gram° C.), which is higher than most other common fluids. In addition, hot water sources are plentiful and may include, for example, geothermal water, coolant water from nuclear reactors or from industrial processes (e.g., heat from a methane power generator, heat from exhaust streams of ovens or furnaces, flue gas condensation, exhaust gases from vehicles, intercooling of a compressor, the condenser of a power cycle, heat generated from biomass, heat generated from farming processes such as organic products fermentation), and many other sources that have, heretofore, been considered of too low temperature to be useful in an energy recovery process. In other embodiments, the fluid heat source 103 comprises one or more hot gases.

A primary difference between the heat engine 100 of the present disclosure and previously disclosed heat engines employing conventional organic Rankine cycles is the use of organic refrigerants having relatively lower molecular weights. The heat engine 100 is configured to maintain a relatively high-pressure differential within a range of from about 2,000 kPa (about 20 bar) to about 42,000 kPa (about 42 bar) on opposite sides of a highly efficient positive-displacement decompressor 105 (also simply referred to herein as a "decompressor").

In some embodiments, the positive-displacement decompressor 105 comprises an orbital scroll decompressor manufactured by Danfoss, or Nordborg, Denmark. In other embodiments, the positive-displacement decompressor 105 comprises an orbital scroll compressor (modified for use as decompressors) manufactured by Trane of Dublin, Ireland, Copeland Corporation LLC of Rushville, Indiana, Emerson Electric of St. Louis, Missouri, or Bristol Compressors International, LLC of Bristol, Virginia. In yet other embodiments, the positive-displacement decompressor 105 comprises a Roots-type pump, a starrotor pump, or a dual-lobe pump. As described in further detail herein, the positive-displacement decompressor 105 facilitates the generation of electrical power from low-grade heat sources (the low-grade fluid heat source 103) that have been heretofore ignored.

The heat engine 100 may be configured to facilitate use of a heat sink 107, which is at a temperature that is less than or equal to the ambient temperature. The heat sink 107 may include a fluid cold water source (e.g., such as from a well or pond) having a temperature less than ambient temperature or air (e.g., ambient air). In some embodiments, the heat sink 107 comprises cold water. In yet other embodiments, the heat sink 107 comprises ambient air.

With continued reference to FIG. 1, the heat engine 100 includes a positive-displacement hydraulic pump 109. The hydraulic pump 109 is configured to be operated by a first electric motor 111 and is configured to transfer the organic refrigerant 101 from a low-pressure zone to a high-pressure zone in the liquid phase. The hydraulic pump 109 is configured to move the liquid organic refrigerant 101 while matching the pressure in the high-pressure zone. The high-pressure zone of the heat engine 100 may extend from an output port 113 of the hydraulic pump 109 to an inlet port 115 of the decompressor 105. The low-pressure zone of the heat engine 100 may extend from exhaust ports 117 of the decompressor 105 to an input port 119 of the hydraulic pump 109. In FIG. 1, the arrowheads near the outer edges of the rectangular block that represents the decompressor 105 symbolize the exhaust ports, as well as their relative location and direction. In some embodiments, the exhaust ports 117 are covered by a first porous oil separator 121.

Still referring to FIG. 1, in use and operation of the heat engine 100, from the output port 113 of the hydraulic pump 109, the organic refrigerant 101 enters an eccentrically shaped cool refrigerant pressure holding tank 123 (also simply referred to herein as "holding tank"). In some embodiments, the shape of the cool refrigerant pressure holding tank 123 facilitates trapping of a sufficient amount of refrigerant vapor which serves as a pulsation dampener to mitigate the effect of fluid hammer as the hydraulic pump 109 transfers refrigerant from the low-pressure zone to the high-pressure zone. From the cool refrigerant pressure holding tank 123, the refrigerant flows through a check valve 125 between the holding tank and a refrigerant-heating heat exchanger 127.

In use and operation, from the refrigerant-heating heat exchanger 127, the refrigerant flows to a high-pressure vapor enhancer 129. In some embodiments, the high-pressure vapor enhancer 129 comprises a vertically oriented, tubular, fin-tube heat exchanger. In some embodiments, the low-grade fluid heat source 103 (e.g., hot water) enters the high-pressure vapor enhancer 129 near the top of the high-pressure vapor enhancer 129 through input port 131 and exits near the bottom of the high-pressure vapor enhancer 129 through output port 133. The refrigerant from the refrigerant-heating heat exchanger 127 enters the bottom of the high-pressure vapor enhancer 129 and exits the top thereof. The high-pressure vapor enhancer 129 is configured to transfer heat from the low-grade fluid heat source 103 to the organic refrigerant and flash the organic refrigerant 101 to a superheated vapor as the organic refrigerant 101 passes through the high-pressure vapor enhancer 129. In some embodiments, the organic refrigerant 101 comprises a superheated vapor at the inlet port 115 of the decompressor 105. Piping 139 between the high-pressure vapor enhancer 129 and the inlet port 115 of the decompressor 105 may be sized to reduce substantial pressure drop of the superheated organic refrigerant 101 between the high-pressure vapor enhancer 129 and the inlet port 115.

After exiting the high-pressure vapor enhancer 129 at the output port 133, the low-grade fluid heat source 103 is piped to an entry port 135 of the refrigerant-heating heat exchanger 127 near the top of refrigerant-heating heat exchanger 127. The low-grade fluid heat source 103 is configured to heat the organic refrigerant 101 in the refrigerant-heating heat exchanger 127 and exits the refrigerant-heating heat exchanger 127 through exit port 137.

A first actuator valve 141 serves as a pressure relief valve for superheated refrigerant vapor leaving the high-pressure vapor enhancer 129. The first actuator valve 141 is configured to direct excess heat to the low-pressure zone when the superheated vapor leaving the high-pressure vapor enhancer 129 exceeds a predetermined pressure. In some embodiments, the first actuator valve 141 facilitates bypassing the decompressor 105 during pre-start and post-run operation of the heat engine 100. A second actuator valve 143 controls the pressure of superheated refrigerant vapor entering the decompressor 105.

Still referring to FIG. 1, the decompressor 105 is located within a prime mover shell 145 (also referred to as a "shell"), which also houses a high-efficiency generator 147 that is mechanically coupled to the positive-displacement decompressor 105. In some embodiments, the decompressor 105 is separated from the high-efficiency generator 147 by an exhaust gas barrier ring 165. Lubricating oil 149 is held in an oil reservoir 151 that is separated from the high-efficiency generator 147 by a heat shield 152. The heat shield 152 includes small apertures to enable oil to drain into the reservoir 151. The lubricating oil 149 held in the reservoir 151 is heated by a heating loop 153 that begins at the input port 131 of the high-pressure vapor enhancer 129 and ends at the exit port 137 of the refrigerant-heating heat exchanger 127. The lubricating oil temperature in reservoir 151 is controlled by a thermostat 155 and flow control solenoid 157. The lubricating oil 149 is circulated by an oil pump 159 powered by a second electric motor 161 and is injected into the inlet port 115 of the decompressor 105. In other embodiments, the lubricating oil 149 is circulated by an internal oil pump within the drive shaft of the positive-displacement decompressor 105. In some embodiments, the decompressor 105 can comprise an orbital scroll decompressor and the lubricating oil 149 can lubricate and seal minute gaps between the stationary scroll and the orbital scroll of the decompressor 105, thereby enhancing the efficiency of the decompressor 105.

The lubricating oil 149 may be formed of and include one or more of mineral oil (e.g., napthalenic) or synthetic oils (e.g., glycols, esters, alkylbenzenes, polyolesters, etc.). In some embodiments, the lubricating oil 149 may also include a lubricity enhancer, such as an additive package sold under the trade name A/C Re-New by Nu-Calgon, of St. Louis, Mo., USA. The lubricity enhancer may be formulated to have a higher lubricity than the lubricating oil.

After refrigerant vapor passes through the exhaust ports 117 of the decompressor 105, the refrigerant enters the low-pressure zone of the heat engine 100 and passes through the first porous oil separator 121, which is configured to remove substantially all of (e.g., most of) the lubricating oil from the refrigerant vapor. The removed oil passes through apertures 163 in an exhaust gas barrier ring 165 and then drains through the heat shield 152 into the reservoir 151. The refrigerant vapor then enters exhaust pipe 167 and travels to a vapor expansion chamber 169, which contains a second porous oil separator 171. Oil removed from the refrigerant vapor by oil separator 171 returns, via gravity, to the reservoir 151 through return tube 173. An output tube 174 of the second porous oil separator 171 extends into the chamber housing 175 of the vapor expansion chamber 169. The output tube 174 reduces an amount of oil that may escape through the vapor expansion chamber 169 in the path of the refrigerant (e.g., from the vapor expansion chamber 169 to an eccentrically shaped expansion chamber extension 181). Cooling of the high-efficiency generator 147, along with pressure equalization for the prime mover shell 145, is achieved with an actuator valve 177 and pressure equalization piping 179 from the prime mover shell 145 to the top of the chamber housing 175.

With continued reference to FIG. 1, from the vapor expansion chamber 169, refrigerant vapor passes into an eccentrically shaped expansion chamber extension 181, which is also connected at its apex (e.g., the upper portion thereof) to the pressure equalization piping 179. A first sub-cooling coil 183 is located within the expansion chamber extension 181 and vents into the expansion chamber extension 181 (e.g., vapor from the eccentrically shaped cool refrigerant pressure holding tank 123), where the escaping gas from the first sub-cooling coil 183 joins the refrigerant vapor that has been released from the decompressor 105. Because of the expansion and cooling of the refrigerant from the decompressor 105 and through the chamber housing 175 and the eccentrically shaped expansion chamber extension 181, the refrigerant vapor begins to condense into a liquid at the eccentrically shaped expansion chamber extension 181. In some embodiments, the propensity of the refrigerant vapor to condense is directly related to the amount of liquid refrigerant charge maintained in the low-pressure zone.

From the expansion chamber extension 181, the condensing vapor moves to a refrigerant-cooling heat exchanger 185, where heat from the refrigerant is transferred to the heat sink 107, which may comprise a cold water source. The refrigerant-cooling heat exchanger 185 is configured to substantially condense the refrigerant to the liquid phase. From the refrigerant-cooling heat exchanger 185, the condensing refrigerant vapor passes through a filter/dryer unit 187, which removes any water moisture and any solid particles from the condensing refrigerant. From the filter/dryer unit 187, the substantially condensed organic refrigerant 101 enters a vertically oriented refrigerant tank 189. The vertically oriented refrigerant tank 189 exhibits a downwardly tapering and downwardly decreasing cross-sectional area, which employs gravity to facilitate higher density of the of organic refrigerant 101 in the liquid phase at the lower portion of the vertically oriented refrigerant tank 189 relative to other portions of the vertically oriented refrigerant tank 189. Accordingly, the density of the organic refrigerant 101 entering the input port 119 of the hydraulic pump 109 may be greater than the density of the organic refrigerant 101 at the upper portion of the liquid within the vertically oriented refrigerant tank 189. The vertically oriented refrigerant tank 189 is also connected to the pressure equalization piping 179. A second sub-cooling coil 191 within refrigerant tank 189 may further cool the condensed organic refrigerant 101 before the organic refrigerant 101 enters the hydraulic pump 109. A metering valve 193 provides a pressure drop for either pressurized liquid or vapor stored within eccentrically shaped cool refrigerant pressure holding tank 123. Liquid or vapor released from the upper portion of the eccentrically shaped cool refrigerant pressure holding tank 123 passes through the second sub-cooling coil 191, and subsequently, through the first sub-cooling coil 183, thereby assisting in the condensation and cooling of the refrigerant vapor in the expansion chamber extension 181 and liquid refrigerant in the vertically oriented refrigerant tank 189.

Still referring to FIG. 1, a mechanical pressure relief valve 195 protects the high-pressure zone from incidental or inadvertent over-pressure events. Released vapor and/or liquid refrigerant is released to the input port 197 of the filter/dryer unit 187. In addition, an actuator valve 199 allows controlled pressure relief for system pre-start to purge any refrigerant vapor from the hydraulic pump 109. Vapor and/or liquid organic refrigerant 101 released from the upper portion of the eccentrically shaped cool refrigerant pressure holding tank 123 passes to the input port 197 of the filter/dryer unit 187.

Figure 2:
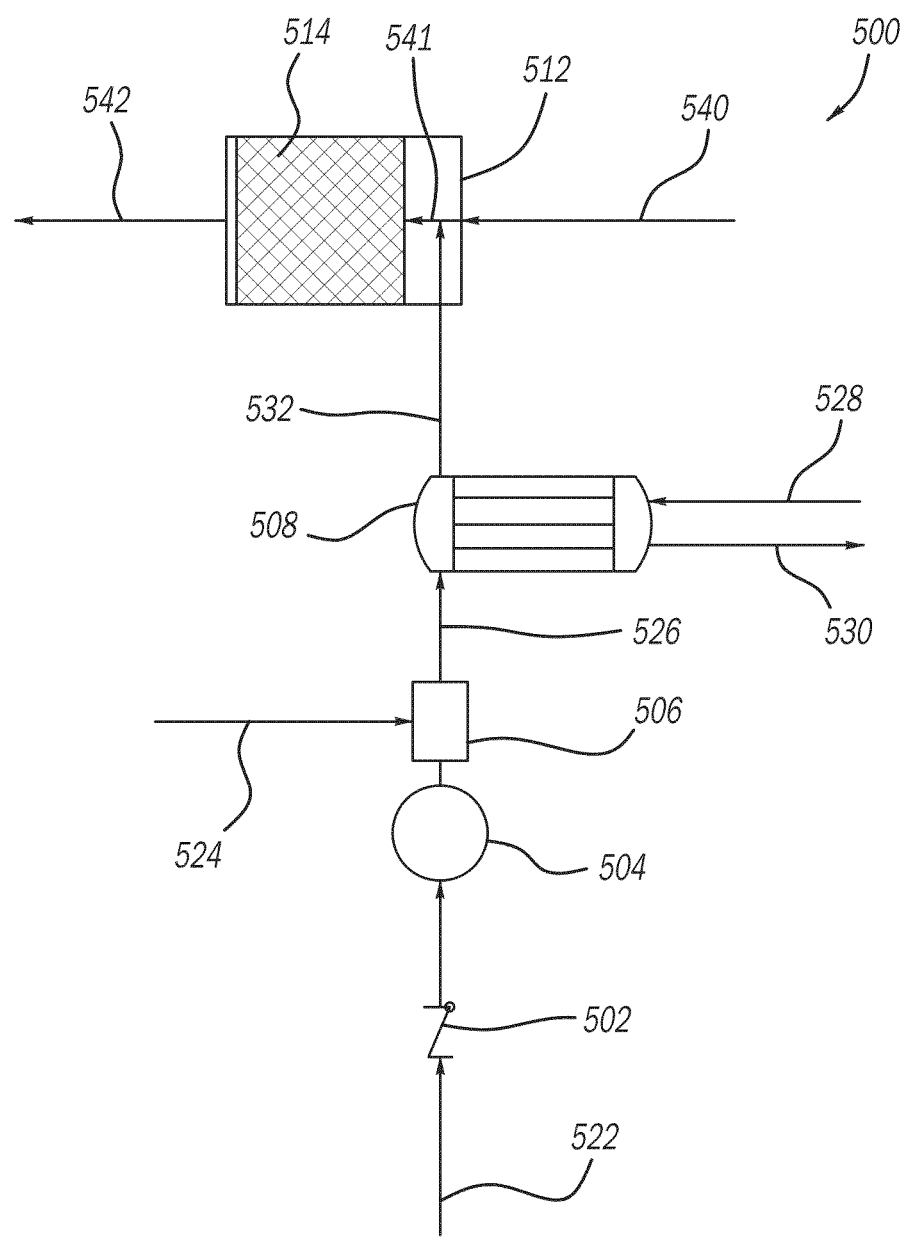
FIG. 2 is a simplified schematic block diagram illustrating a system for providing a pressurized refrigerant, according to the present disclosure.

FIG. 2 is a simplified schematic block diagram illustrating a system 500 for providing a pressurized refrigerant. The system 500 may be used to provide pressurized refrigerant to a heat engine (e.g., the heat engine 100 (FIG. 1)), a refrigeration system, a heat pump, or any other system in which pressurized refrigerant is used. In some embodiments, the system 500 may provide pressurized refrigerant to a heat engine using an organic Rankine cycle (ORC).

As shown in FIG. 2, the system 500 may include a check valve 502 configured to enable the flow of a refrigerant 522 in only one direction. A pump 504 may be configured to receive the refrigerant 522 from the check valve 502 and provide a sufficient pressure to drive the refrigerant 522 through the system 500. The pump 504 may be, for example, a variable speed circulation pump. The pump 504 may be significantly smaller than pumps conventionally used for providing pressurized refrigerants because the pump 504 need not significantly increase the pressure of the refrigerant 522. Instead, the system increases the pressure of the refrigerant 522 by heating, as explained in further detail below.

The refrigerant 522 may be an organic material having a boiling point below about −35° C., such as the organic refrigerant 101 described above with reference to FIG. 1. The relatively low boiling point of the refrigerant 522 facilitates the extraction of energy from heat sources having relatively low temperatures (e.g., below about 82° C.) and conversion of the energy into electricity more efficiently than refrigerants in conventional systems. For example, the refrigerant 522 may be a near-azeotropic mixture of difluoromethane and pentafluoroethane (e.g., R-410A), which mixture has a boiling point of approximately −51° C. The refrigerant 522 may comprise other refrigerant materials, such as those known in the art as R-22, R-502, R-507, R-13, R-503, R-23, ammonia (e.g., R-717), or carbon dioxide (e.g., R-744). Such refrigerants are commercially available, for example, from A irgas Refrigerants, Inc., of Lawrenceville, Ga., USA.

A mixing device 506 may be configured to mix a lubricating oil 524 with the organic refrigerant 522 to form a mixture 526 after the organic refrigerant 522 passes through the pump 504. The mixing device 506 may include, for example, a mixing tee, a mix chamber, an aspirator, or any other means for mixing fluids (e.g., the lubricating oil 524 and the organic refrigerant 522). The lubricating oil 524 may be an organic material formulated to remain in a liquid phase at the operating conditions of a refrigeration process, and to have beneficial lubrication and stability properties. The lubricating oil may include one or more of the materials described above with reference to the lubricating oil 149 (FIG. 1), such as one or more of mineral oil (e.g., napthalenic) or synthetic oils (e.g., glycols, esters, alkylbenzenes, polyolesters, etc.). In some embodiments, the lubricating oil 524 includes a lubricity enhancer, such as an additive package sold under the trade name A/C Re-New by Nu-Calgon, of St. Louis, Mo., USA. The lubricity enhancer may be formulated to have a higher lubricity than the lubricating oil.

The system 500 may further include one or more heat sources 508 to heat the mixture 526 and form a heated mixture 532. The one or more heat sources 508 may include one or more of a heat exchanger, condenser, heating coil, or any other heat source. The one or more heat sources 508 may include at least one wall through which heat may be transferred to the organic refrigerant 522 and the lubricating oil 524. Though one heat source 508 is depicted in FIG. 2, the system 500 may include any number of heat sources, such as one, two, three, four, etc. The one or more heat sources 508 may be configured to evaporate the organic refrigerant 522 to form a vapor. For example, the one or more heat sources 508 may include an evaporator or a superheater.

The system 500 may further include an atomizer 512 configured to mix the heated mixture 532 of the organic refrigerant 522 and the lubricating oil 524 with another portion of organic refrigerant, and to atomize the lubricating oil 524. The atomizer 512 may include a body having mixing and atomizing means 514 therein. For example, the atomizer 512 may include mixing vanes, a metal mesh (e.g., a sintered stainless steel mesh, such as a 316L stainless steel mesh material having a mesh size of about 1,000 microns, sold by Dorstener Wire Tech, of Spring, Texas, USA, under the name SINTERPORE®), a packing media, or any other structure for mixing and/or atomizing. In some embodiments, the atomizer 512 further includes a filter media (which may be replaceable) or other means to prevent un-atomized liquid oil from leaving the atomizer 512. The atomizer 512 may be configured to operate with minimal restriction, such that the pressure drop within the atomizer 512 is small or negligible.

The system 500 may be used to provide a pressurized, heated refrigerant. As discussed above, the refrigerant 522 may pass through the check valve 502 to the pump 504, which pumps the refrigerant 522 through the system 500. In some embodiments, the pump 504 may provide the sole means for circulating the refrigerant 522. The refrigerant 522 leaving the pump 504 may enter the mixing device 506 and mix with the lubricating oil 524 to form the mixture 526 comprising the refrigerant 522 and the lubricating oil 524 which is, in turn, heated in the one or more heat sources 508. The one or more heat sources 508 may receive a hot fluid 528 having a temperature of less than about 80° C., less than about 70° C., less than about 60° C., or even less than about 50° C. In some embodiments, the temperature of the hot fluid 528 is less than the temperature of hot fluids of conventional organic Rankine cycle systems. Accordingly, the system 500 may be used to extract energy from lower quality heat sources compared to conventional ORCs. Heat from the hot fluid 528 is transferred to the mixture 526, such that a cooled fluid 530 (containing material that entered the one or more heat sources 508 as the hot fluid 528) and the heated mixture 532 (containing material that entered the one or more heat sources 508 as the mixture 526) leave the one or more heat sources 508. The volumetric flow rate of the heated mixture 532 may be greater than the volumetric flow rate of the mixture 526 due to evaporation of the refrigerant 522 within the one or more heat sources 508. In other words, evaporation of the refrigerant 522 in the one or more heat sources 508 increases the volume of the heated mixture 532 relative to the mixture 526.

The hot fluid 528 may include, for example, one or more of a waste heat source (e.g., waste heat from industrial processes, such as waste heat from methane generators), heat from an exhaust gas (e.g., exhaust streams of ovens or furnaces, exhaust form vehicles), flue gas condensation, a compressor intercooler, heat generated from biomass, heat generated from farming processes, a geothermal heat source, a solar array, or any other heat source.

The mixture 526 may, in some embodiments, be exposed to additional heat sources. Transferring heat from the one or more heat sources 508 to the mixture 526 may increase the specific volume of the mixture 526.

The heated mixture 532 and another portion of gaseous refrigerant 540 may be mixed within the atomizer 512 to form a superheated mixture 541. In some embodiments, the gaseous refrigerant 540 is superheated. In other embodiments, the heated mixture 532 and the gaseous refrigerant 540 are mixed before entering the atomizer 512 to form the superheated mixture 541 external to the atomizer 512, such as in a mixing tee, a mix chamber, an aspirator, or any other means for mixing fluids. The gaseous refrigerant 540 may have the same composition as the refrigerant 522. The gaseous refrigerant 540 may be at or near its critical temperature. In some embodiments, the atomizer 512 atomizes the lubricating oil 524 from the heated mixture 532 to form a fine mist of the lubricating oil 524, which may be dispersed within the refrigerant 522, 540. For example, the superheated mixture 541 may be passed through the atomizing means 514, which may comprise a metal mesh. In some embodiments, the lubricating oil 524 may be approximately uniformly dispersed throughout the refrigerant 522, 540. The refrigerant 522, 540 and the lubricating oil 524 may leave the atomizer 512 as an atomized mixture 542. In some embodiments, the atomized mixture 542 may be filtered or otherwise processed to enhance homogeneity of the atomized mixture 542.

Figure 3:
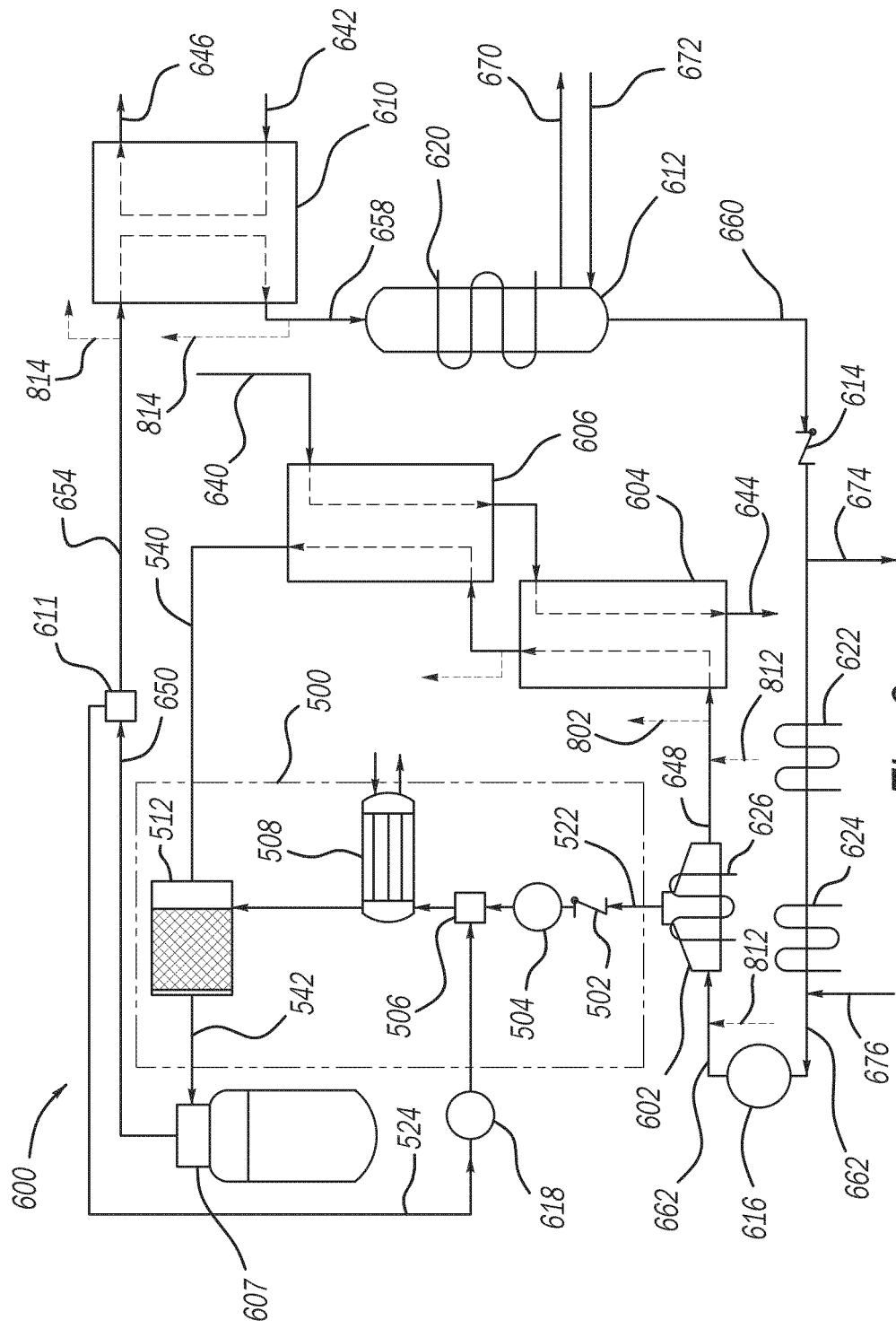
FIG. 3 is a simplified schematic block diagram illustrating a heat engine including the system of FIG. 2, in accordance with embodiments of the disclosure.

In some embodiments, the atomized mixture 542 (i.e., the pressurized refrigerant 522, 540 and the atomized lubricating oil 524) may be used in an ORC heat engine, such as the heat engine 100 of FIG. 1. For example, FIG. 3 is a simplified schematic block diagram illustrating a heat engine 600 including the system 500 shown in FIG. 2 (note that the reference numerals for some material flows shown in FIG. 2 are omitted from FIG. 3 for simplicity). The system 500 is illustrated in a dashed box in FIG. 3. The heat engine 600 includes a high-pressure zone, a low-pressure zone, and a bypass zone. When the heat engine 600 is in operation, the pressure of the refrigerant within the high-pressure zone is approximately constant, with variations in temperature along the flow path. Similarly, within the low-pressure zone, the pressure of the refrigerant is approximately constant and lower than the pressure of the refrigerant in the high-pressure zone. The refrigerant in the bypass zone is at approximately the same pressure as in the high-pressure zone. As described in further detail herein with respect to FIG. 4, because the high-pressure zone and the low-pressure zone are each at approximately constant pressures, refrigerant may be passed through one or more external loops (e.g., external to the heat engine 600) if additional heat transfer is desired or required.

The heat engine 600 includes a holding tank 602 for containing the refrigerant. Pressurized refrigerant 648 travels from the holding tank 602 to a heat source 604 (e.g., an evaporator) and a superheater 606, which may collectively be referred to herein as heat sources 604, 606. The heat sources 604, 606 may each include at least one wall through which heat may be transferred from a hot fluid 640 to the pressurized refrigerant 648. Though two heat sources 604, 606 are depicted in FIG. 3, the heat engine 600 may include any number of heat sources, such as one, two, three, four, etc. One or both of the heat sources 604, 606 may be configured to evaporate the pressurized refrigerant 648 to evaporate the pressurized refrigerant 648 and form a gaseous refrigerant, which may correspond to the gaseous refrigerant 540 shown in FIG. 2. In some embodiments, the superheater 606, is configured to provide the gaseous refrigerant 540 at or near the critical temperature of the gaseous refrigerant.

The heat sources 604, 606, may receive the hot fluid 640 having a temperature of less than about 80° C., less than about 70° C., less than about 60° C., less than about 50° C., or even less than about 40° C. Heat from the hot fluid 640 is transferred to the pressurized refrigerant 648. The hot fluid 640 may leave the heat sources 604, 606 as fluid 644 for disposal or other uses. The hot fluid may be substantially the same as the hot fluid 528 described above with reference to FIG. 2.

The gaseous refrigerant 540 may be mixed with the heated mixture 532 (FIG. 2) of refrigerant 522 and the lubricating oil 524 that has been preheated in the one or more heat sources 508. The lubricating oil 524 may be atomized in the atomizer 512 to form a fine mist, which may be dispersed within the gaseous refrigerant 540 to form the atomized mixture 542, as discussed above and shown in more detail in FIG. 2.

Figure 4:
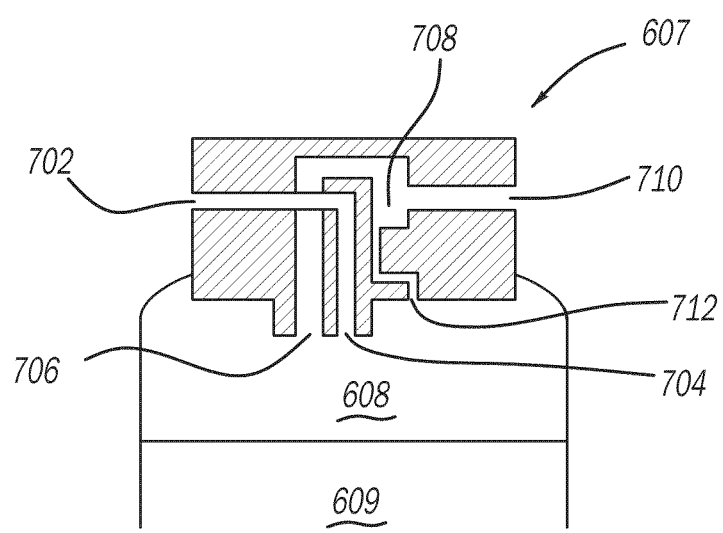
FIG. 4 is a simplified diagram illustrating a manifold that may be used in the heat engine of FIG. 3, in accordance with embodiments of the disclosure.

With collective reference to FIG. 3 and FIG. 4, the atomized mixture 542 may enter a manifold 607 having an expansion device 608 (FIG. 4) coupled to and configured to drive an electrical generator 609 (FIG. 4). FIG. 4 is a simplified diagram illustrating the manifold 607. The expansion device 608 may include a positive displacement decompressor configured to provide a pressure gradient through which the organic refrigerant in the gaseous phase flows continuously from the high-pressure zone to the low-pressure zone. The expansion device 608 may be configured to maintain a pressure differential between the high-pressure zone and the low-pressure zone of between about 1,000 kPa and about 10,000 kPa, and may be configured to extract mechanical energy based on the pressure gradient. For example, the expansion device 608 may be configured to maintain a pressure differential between the high-pressure zone and the low-pressure zone of between about 2,000 kPa and about 4,200 kPa.

The expansion device 608 may comprise a turbine, a decompressor, a twin-screw expander, or any other device configured to rotate a portion of (e.g., provide rotation motion to a portion of) the electrical generator 609. In some embodiments, the expansion device 608 comprises an orbital scroll decompressor. The expansion device 608 may include materials formulated to withstand operating conditions of the heat engine 600. In some embodiments, the expansion device 608 comprises stainless steel.

A mixture 650 leaving the expansion device 608 may be at a relatively lower pressure and a relatively higher temperature than the atomized mixture 542 entering the expansion device 608. Thus, the high-pressure zone of the heat engine 600 may be defined to include the holding tank 602, the heat sources 604, 606, the atomizer 512, and the expansion device 608.

The manifold 607 may be configured to receive the atomized mixture 542 from the atomizer 512 and to provide the mixture 650 at a lower pressure and higher temperature than the atomized mixture 542. The manifold 607 may be configured to facilitate separation of the lubricating oil 524 from the atomized mixture 542 to form the mixture 650. In some embodiments, the mixture 650 comprises less of the lubricating oil 524 (e.g., a lower concentration of the lubricating oil 524) than the atomized mixture 542. In some embodiments, the manifold 607 facilitates separation of the lubricating oil 524 from the atomized mixture 542 using heat from the atomized mixture 542. The mixture 650 may rise vertically within the manifold 607 through orifices or a steel mesh. Passing the mixture 650 through the orifices or the steel mesh in the manifold 607 may facilitate separation of the lubricating oil 524 from the atomized mixture 542 since the lubricating oil 524 may be denser than the organic refrigerant 522, 540 of the atomized mixture 542. Due to the relatively higher specific gravity of the lubricating oil 524 relative to the organic refrigerant 522, 540 within the atomized mixture 542, the lubricating oil 524 may fall (e.g., by gravity) into the electrical generator 609 vertically below the manifold 607, where the lubricating oil 524 may be reused for sealing and lubrication. Separation of the lubricating oil 524 from the organic refrigerant 522, 540 forms the mixture 650 comprising the refrigerant. In some embodiments, after the atomized mixture 542 passes through the opening 706 in the expansion device 608, the lubricating oil 524 may be separated from the atomized mixture 542 to form the mixture 650 comprising the refrigerant 522, 540.

As shown in FIG. 4, the manifold 607 may include an inlet 702 (e.g., a refrigerant inlet) through which the atomized mixture 542 (FIG. 3) may be received. The atomized mixture 542 may pass into the expansion device 608 via a protrusion 704. Refrigerant leaving the expansion device 608 (i.e., as mixture 650 (FIG. 3)) enters the manifold 607 through an opening 706. The refrigerant travels through a separation region 708, where lubricating oil 524 is removed from the refrigerant to form the mixture 650 (FIG. 3), which leaves the manifold 607 via an outlet 710 (e.g., a refrigerant outlet). The lubricating oil 524 removed may return to one or both of the expansion device 608 and the electrical generator 609 via an oil drain 712.

Combining the inlet 702 and the outlet 710 may simplify the installation of the heat engine 600, and may provide a means to use some heat from the incoming atomized mixture 542 to assist in separation of the lubricating oil 524 from the atomized mixture 542. The manifold 607 may include flow paths configured to promote heat transfer between the incoming atomized mixture 542 (including the refrigerant 522, 540 and the lubricating oil 524) and the outgoing mixture 650.

The manifold 607 may include one or more tortuous paths through which the refrigerant may pass before leaving the manifold 607. For example, the opening 706 may include one or more (e.g., a plurality of) holes or orifices, which may optionally be packed with a steel mesh or other material having a high surface area. In some embodiments, the holes and the steel mesh (or other high surface area material) facilitates the separation of the lubricating oil 524 from the atomized mixture 542. Forcing the atomized mixture 542 to rise vertically through such a path may enhance the separation of the lubricating oil 524 from the refrigerant (e.g., because the lubricating oil 524 may be heavier than the refrigerant 522, 540).

The atomized mixture 542 may rise vertically within the manifold 607, then flow around sharp edges, before flowing downwardly again, thus promoting the separation of heavier lubricating oil from the refrigerant, which may drain downwardly from the separation region 708 through the opening 706 back to the expansion device 608, based on gravity.

The protrusion 704 may be configured such that the atomized mixture 542 entering the expansion device 608 through the protrusion 704 does not disrupt the flow of the atomized mixture 542 in the separation region 708. For example, the protrusion 704 may extend downwardly from the center of the manifold 607 so as to substantially prevent the atomized mixture 542 entering the expansion device 608 cause the lubricating oil 524 leaving the expansion device 608 to enter the opening 706. That is, refrigerant 522, 540 leaving the expansion device 608 may enter the separation region 708 through the opening 706 while the atomized mixture 542 is provided to the manifold 607 through the protrusion 704. Such an arrangement may also promote heat transfer between the incoming atomized mixture 542 and the outgoing mixture 650, which may enhance separation of the lubricating oil 524 from the refrigerant 522, 540.

The electrical generator 609 may be any device configured to convert mechanical energy extracted from the refrigerant 522, 540 in the expansion device 608 to electrical energy, such as an alternating-current generator having a rotor and a stator. The expansion device 608 may be located vertically above or vertically below the electrical generator 609. In some embodiments, the expansion device 608 and the electrical generator 609 may be integrated into a single device.

With reference back to FIG. 3, at least a portion of the lubricating oil 524 remaining in the mixture 650 may be extracted from the mixture 650 in a separator 611 to form a low-pressure, high-temperature refrigerant 654. The separator 611 may comprise, for example, a trap or a filter. The lubricating oil 524 may be returned to the refrigerant 522 via a pump 618 and the mixing device 506. The low-pressure, high-temperature refrigerant 654 may enter a condenser 610, where the low-pressure, high-temperature refrigerant 654 is cooled by a heat sink 642 to condense the low-pressure, high-temperature refrigerant 654 and form a condensed refrigerant 658. The heat sink 642 may comprise cold water (e.g., culinary water, well water, etc.). The heat sink 642 may be at approximately ambient or room temperature. For example, the heat sink 642 may enter the condenser 610 at a temperature of from about 5° C. to about 35° C., such as from about 15° C. to about 25° C. The temperature of the heat sink 642 leaving the condenser 610 may be from about 1° C. to about 15° C. higher than the temperature of the heat sink 642, which temperature difference may depend on the flow rates and temperatures of the heat sink 642 and low-pressure, high-temperature refrigerant 654. The low-pressure, high-temperature refrigerant 654 may be partially or fully condensed in the condenser 610.

The condensed refrigerant 658 may be transferred to a liquid refrigerant tank 612, where the condensed refrigerant 658 may optionally be further cooled by one or more additional heat sinks 620 to form a cooled refrigerant 660 having a lower temperature than the condensed refrigerant 658. The heat sink 620 may comprise, for example, cold water, a thermal expansion valve (TXV), a thermoelectric device, or any other material or device capable of absorbing or transferring heat. The heat engine 600 may be operable to facilitate use multiple heat sinks 620 comprising different materials, having a different temperature, or both. Heat sinks 620 may be added to balance heat loads with other processes. In some embodiments, the condensed refrigerant 658 or a portion thereof may be cycled through a conduit 670 out of the heat engine 600 to an external heat sink for cooling, and subsequently returned to the heat engine 600 through another conduit 672 (e.g., back to the liquid refrigerant tank 612). In such embodiments, the refrigerant may be considered as having a substantially closed-loop path that includes the heat engine 600 and the external heat sink.

A pressure control system 614 may be configured to regulate the flow and pressure of the cooled refrigerant 660 from the liquid refrigerant tank 612. The pressure control system 614 may include a check valve, a pressure regulator, a dampening chamber, a manual or electronic controller, and/or any other selected control device.

After passing through the pressure control system 614, heat sources(s) 622, 624 may optionally preheat the cooled refrigerant 660 to form a preheated refrigerant 662. In some embodiments, the preheated refrigerant 662 comprises a liquid. The heat sources 622, 624 may comprise, for example, a waste heat source, exhaust gas, a compressor intercooler, biomass, a geothermal heat source, a solar array, or any other material or device capable of generating or transferring heat. In some embodiments, the cooled refrigerant 660 or a portion thereof may be cycled through a conduit 674 out of the heat engine 600 to an external heat source for heating, either instead of or in addition to the heat sources 622, 624, and subsequently returned to the heat engine 600 through another conduit 676. In such embodiments, the refrigerant may be considered as having a substantially closed-loop path that includes the heat engine 600 and the external heat source. Thus, the heat engine 600 may be operable to use multiple heat sources 622, 624 of different types and at different temperatures. Heat sources 622, 624 may be added to balance heat loads with other processes.

A circulation pump 616 may return the preheated refrigerant 662 to the holding tank 602, and may separate the low-pressure zone from the high-pressure zone. Thus, the low-pressure zone of the heat engine 600 may be defined to include the separator 611, the condenser 610, the liquid refrigerant tank 612, and the pressure control system 614. The circulation pump 616 may provide a continuous flow of the preheated refrigerant 662 in the liquid phase from the low-pressure zone to the high-pressure zone. In some embodiments, the circulation pump 616 comprises a positive displacement hydraulic pump. The circulation pump 616 may be configured to operate as a liquid pressure booster pump, increasing the pressure of the preheated refrigerant 662 in the heat engine 600. Pumping the preheated refrigerant 662 in the liquid phase may be a relatively more efficient way to increase the pressure of the preheated refrigerant 662 than compressing a gas-phase refrigerant. The holding tank 602 may optionally be further preheated by another heat source 626. The heat source 626 may be, for example, a waste heat source, exhaust gas, a compressor intercooler, biomass, a geothermal heat source, a solar array, or any other material or device capable of generating or transferring heat. The use of multiple heat sources 622, 624, 626 to preheat the refrigerant (in addition to the heat sources 604, 606) may increase the amount of energy generation by increasing the total amount of heat transferred to the refrigerant in the ORC cycle facilitated by the heat engine 600.

The heat engine 600 includes a bypass zone, in which a relatively small amount of the refrigerant 522 is mixed with lubricating oil 524. The bypass zone may be defined to include the check valve 502, the pump 504, the mixing device 506, and the one or more heat sources 508. The lubricating oil 524 may facilitate sealing of the expansion device 608 to limit or substantially prevent slippage of the moving parts of the expansion device 608. The lubricating oil 524 may also increase the density of the refrigerant 522, 540 entering the expansion device 608 as the atomized mixture 542. However, if the lubricating oil 524 passes through the expansion device 608 in bulk form, the lubricating oil 524 may stall the expansion device 608, such as by blocking flow of the refrigerant 522, 540. Thus, in the bypass zone, the lubricating oil 524 may be pre-mixed with a portion of the refrigerant 522 to improve dispersion of the lubricating oil 524 within the atomized mixture 542. The operation of units in the bypass zone (in particular, the check valve 502, the pump 504, the mixing device 506, and the heat sources 508) are described above with respect to FIG. 2. The atomizer 512 may further promote dispersion of the lubricating oil 524 in the refrigerant 522, 540, such that the lubricating oil 524 can effectively lubricate the moving parts of the expansion device 608 without inhibiting flow of the refrigerant. Thus, the lubricating oil 524 may increase the efficiency of the heat engine 600 (by reducing friction losses in the expansion device 608) and increase the expected operating life thereof.

The heat engine 600 may include a means for mixing the refrigerant 522 and lubricating oil 524 from the bypass zone with the refrigerant 540 from the superheater 606 before the refrigerant 522, 540 and the lubricating oil 524 enter the atomizer 512, such as in a mixing tee, a mix chamber, an aspirator, or any other means for mixing fluids. In some embodiments, the refrigerant 522, the gaseous refrigerant 540, and the lubricating oil 524 may be mixed within the atomizer 512 or within a body also containing the atomizer 512.

The atomized mixture 542 entering the expansion device 608 may comprise from about 0.01% to about 10% by mass of the lubricating oil 524 (i.e., a ratio of a mass flow rate of the refrigerant 522, 540 to a mass flow rate of the lubricating oil 524 may be between about 10:1 and about 10,000:1). Stated another way, the lubricating oil 524 may constitute from about 0.01% by mass to about 10% by mass of the atomized mixture 542. For example, the atomized mixture 542 may comprise from about 0.1% to about 1.0% by mass of the lubricating oil 524 (i.e., a ratio of the mass flow rate of the refrigerant 522, 540 to the mass flow rate of the lubricating oil 524 may be between about 100:1 and about 1000:1). The atomized mixture 542 may comprise about 5.0% by mass of the lubricating oil 524 (i.e., a ratio of the mass flow rate of the refrigerant 522, 540 to the mass flow rate of the lubricating oil 524 may be about 20:1).

A method for generating power from a heat source includes mixing a portion of a refrigerant in a liquid phase (e.g., the preheated refrigerant 662) with a lubricating oil to form a mixture of the portion of the refrigerant and the lubricating oil, heating the mixture to evaporate the portion of the refrigerant and form a vapor refrigerant, mixing the heated mixture with a superheated portion of the refrigerant, atomizing the lubricating oil, and passing the atomized lubricating oil and the refrigerant through a decompressor coupled with an electrical generator to generate an electrical current. At least a portion of the lubricating oil may be separated from the refrigerant, and the refrigerant may be condensed back to liquid form.

The power may be generated without using a compressor, and thus, the power output may be higher than power output from a conventional heat engine with the same inputs. That is, the heat engine may be more efficient in power conversion than conventional systems.

In the heat engine 600, heat is transferred to the refrigerant (e.g., the pressurized refrigerant 648) by means of the heat sources 604, 606. The heat is converted to mechanical work, and to electricity in the expansion device 608 (FIG. 4) and the electrical generator 609 (FIG. 4). Waste heat is removed from the heat engine 600 via the condenser 610. Minor amounts of energy are consumed by pumping the preheated refrigerant 662 with the circulation pump 616, pumping the lubricating oil 524, and heat sources and sinks (e.g., water). Advantageously, the heat engine 600 does not require a compressor to pressurize the pressurized refrigerant 648 or the gaseous refrigerant 540 (FIG. 2). Thus, the heat engine 600 may operate more efficiently than conventional heat engines.

Figure 5:
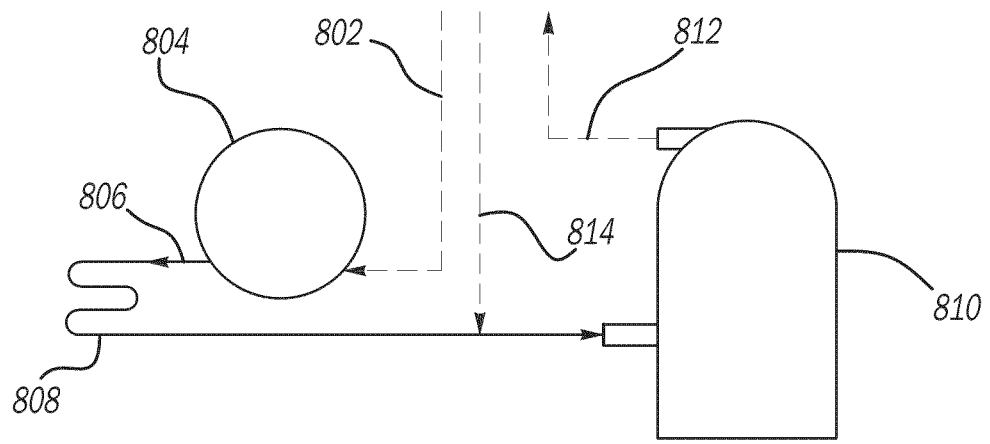
FIG. 5 is a simplified schematic diagram illustrating how refrigerant in the heat engine of FIG. 3 may be used in conjunction with other equipment, in accordance with embodiments of the disclosure.

In some embodiments, refrigerant may be extracted from the heat engine 600, used in another device or operation, and returned to the heat engine 600. FIG. 5 is a simplified schematic diagram illustrating use of the refrigerant from the heat engine 600 of FIG. 3 in another device. With reference to FIG. 5, a refrigerant 802 in liquid form (e.g., the pressurized refrigerant 648 (FIG. 3)) may enter a thermal expansion device 804. The expansion device 804 may reduce a pressure of the refrigerant 802 to convert the refrigerant 802 to a gaseous refrigerant 806. A coil 808 may be used as a heat sink for refrigeration or air conditioning.

The gaseous refrigerant 806 may enter a variable-speed compressor 810, which may produce a pressurized hot gaseous refrigerant 812 suitable for return to the heat engine 600 (FIG. 3), such as to the holding tank 602 or to the pressurized refrigerant 648. Another gaseous refrigerant 814 may also be compressed in the variable-speed compressor 810, instead of or in addition to the gaseous refrigerant 806. The amount of energy to operate the variable-speed compressor 810 sufficient to return the pressurized hot gaseous refrigerant 812 to the heat engine 600 may be less than the energy to operate conventional cooling equipment.

Returning to FIG. 3, the refrigerant 802 in liquid form may be separated from the refrigerant 648 (either before or after the heat source 604), or any other selected point in the heat engine 600 (e.g., one or both the preheated refrigerant 662 and the cooled refrigerant 660 may be provided as the refrigerant 802). The refrigerant 814 in gaseous form may be separated from the low-pressure, high-temperature refrigerant 654, the condensed refrigerant 658, or any other selected point in the heat engine 600. The pressurized hot gaseous refrigerant 812 may be returned to the heat engine 600 at one or more of after the circulation pump 616, after the holding tank 602, or at any other appropriate location. The extraction or addition point for the refrigerant 802 and the refrigerant 814, respectively, may be selected based on the pressure of the refrigerant in the low-pressure zone or the high-pressure zone and may be anywhere within the low-pressure zone or the high-pressure zone. That is, by matching the pressure, the refrigerant 802, 814 may flow and mix with refrigerant in the heat engine 600 without additional conditioning. In some embodiments, since the pressure of the high-pressure zone is substantially uniform, the pressurized hot gaseous refrigerant 812 may be returned anywhere within the high-pressure zone.

Additional nonlimiting example embodiments of the disclosure are described below. In some embodiments, a lubricating oil is mixed with a first portion of a refrigerant in a liquid phase to form a mixture and the mixture of the lubricating oil and the first portion of the refrigerant are heated to form a heated mixture, wherein at least a portion of the first portion of the refrigerant is in a gaseous phase. The heated mixture may be mixed with a second portion of the refrigerant in a superheated phase to form a superheated mixture, and the lubricating oil may be atomized to disperse the lubricating oil within the superheated mixture to form an atomized mixture. In some embodiments, forming the atomized mixture comprises passing the lubricating oil and the refrigerant through a metal mesh.

In some embodiments, the first portion of the refrigerant is pumped through a conduit before mixing the lubricating oil therewith.

In some embodiments, heating the mixture of the lubricating oil and the first portion of the refrigerant to form the heated mixture comprises transferring heat to the mixture from at least one source selected from at least one of a waste heat source, an exhaust gas, a compressor intercooler, biomass, a geothermal heat source, and a solar array.

In some embodiments, the refrigerant exhibits a boiling point below about −35° C.

In some embodiments, the method further comprises passing the atomized mixture (e.g., the atomized lubricating oil and the superheated mixture comprising the refrigerant) through a decompressor operatively associated with an electrical generator to decrease a pressure of the refrigerant within the atomized mixture and generate an electrical current; separating at least a portion of the lubricating oil from the refrigerant in the atomized mixture; and condensing at least a portion of the refrigerant to re-form the first portion of the refrigerant.

In some embodiments, at least a portion of the refrigerant is condensed to form the first portion of the refrigerant by transferring heat from the refrigerant to each of a first heat sink and a second heat sink.

In some embodiments, heating the mixture of the lubricating oil and the first portion of the refrigerant to form a heated mixture comprises increasing a specific volume of the mixture to form a heated mixture comprising a higher specific volume than the mixture.

In some embodiments, the atomized lubricating oil and the refrigerant are passed through a replaceable filter.

In some embodiments, atomizing of the lubricating oil comprises maintaining the lubricating oil and the refrigerant (e.g., the superheated mixture) at approximately constant pressure.

In some embodiments, an additive is mixed with the mixture, the additive exhibiting a higher lubricity than the lubricating oil.

In some embodiments, mixing of a lubricating oil with a first portion of a refrigerant to form a mixture comprises mixing the first portion of the refrigerant in a liquid phase with the lubricating oil downstream of a pump circulating the first portion of the refrigerant.

In some embodiments, a heat engine comprises a high-pressure zone configured to transfer heat from at least one heat source to a refrigerant and configured to contain a first portion of the refrigerant in a gaseous phase; a low-pressure zone configured to transfer heat from the refrigerant to at least one heat sink and configured to contain a second portion of the refrigerant in a liquid phase; a bypass zone configured to mix a third portion of the refrigerant in a liquid phase with a lubricating oil; and an atomizer comprising a mixing media configured to atomize the lubricating oil and disperse the lubricating oil within the first and third portions of the refrigerant. The refrigerant exhibits a boiling point below about −35° C. A substantially closed-loop path for the refrigerant comprises the high-pressure zone, the low-pressure zone, and the bypass zone.

In some embodiments, the heat engine is configured to circulate the refrigerant in a Rankine cycle.

In some embodiments, the heat engine comprises a mixing device configured to mix the lubricating oil with the third portion of the refrigerant in the liquid phase.

In some embodiments, the high-pressure zone comprises at least one wall through which heat from the heat source configured to transfer heat from the at least one heat source to the first portion of the refrigerant in the liquid phase, wherein the at least one heat source is configured to evaporate the first portion of the refrigerant.

In some embodiments, the heat engine further comprises a positive displacement decompressor configured to provide a pressure gradient through which the refrigerant in the gaseous phase flows continuously from the high-pressure zone to the low-pressure zone, the positive displacement decompressor configured to maintain a pressure differential between the high-pressure zone and the low-pressure zone of between about 2,000 kPa and about 42 kPa, the positive displacement decompressor configured to extract mechanical energy due to the pressure gradient.

In some embodiments, the heat engine further comprises an electrical generator coupled to the positive displacement decompressor and configured to convert the extracted mechanical energy to electrical energy.

In some embodiments, the heat engine further comprises a positive displacement hydraulic pump for providing continuous flow of the refrigerant in the liquid phase from the low-pressure zone to the high-pressure zone.

In some embodiments, the heat engine further comprises the at least one heat source comprising a material having a temperature of less than about 60° C.

In some embodiments, the heat engine comprises the refrigerant that circulates through the closed-loop path absorbing additional heat without passing through a compressor.

In some embodiments, the refrigerant absorbs or rejects heat while circulating through the closed-loop path without passing through a compressor.

In some embodiments, a ratio of a mass flow rate of a sum of the first and third portions of the refrigerant to a mass flow rate of the lubricating oil is between about 10:1 and about 100:1.

In some embodiments, the substantially closed-loop path further comprises at least one heat-transfer conduit external to the heat engine.

In some embodiments, the methods and systems further include a system for providing a pressurized refrigerant that comprises a pump configured to move a first portion of a refrigerant in a liquid phase through a conduit; a mixing device for mixing a lubricating oil with the first portion of the refrigerant in the liquid phase; at least one heat source configured to transfer heat to the first portion of the refrigerant in the liquid phase; another mixing device for mixing a second portion of the refrigerant in a gaseous phase with the lubricating oil and the first portion of the refrigerant; and a mixing media configured to atomize the lubricating oil and disperse the lubricating oil within the refrigerant. The refrigerant exhibits a boiling point below about −35° C. The at least one heat source is configured to evaporate the first portion of the refrigerant.

In some embodiments, the mixing media comprises metal mesh.

In some embodiments, the refrigerant comprises an organic refrigerant. In some embodiments, the refrigerant comprises ammonia. In other embodiments, the refrigerant comprises carbon dioxide.

Figure 6:
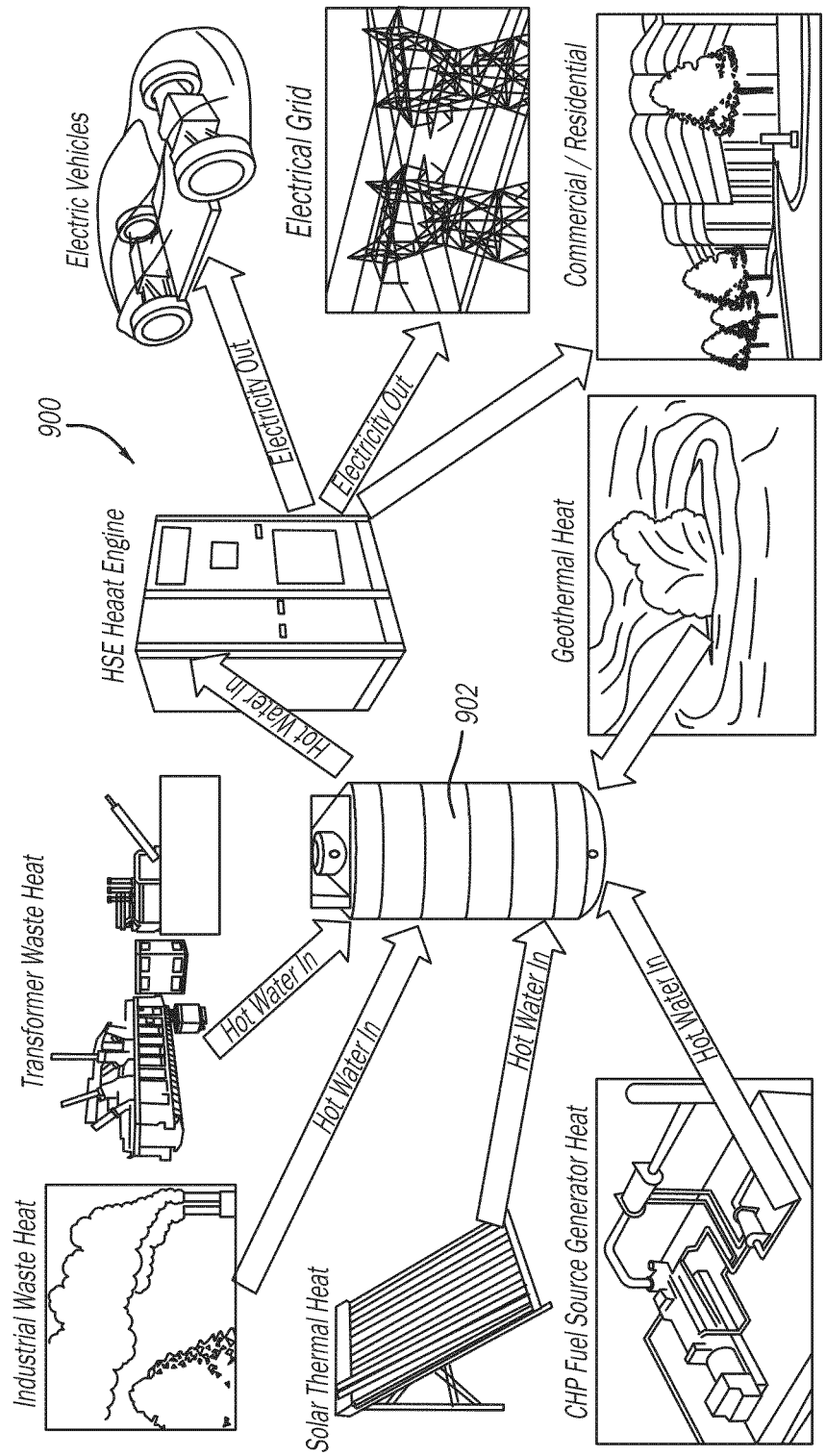
FIG. 6 is a representation of exemplary heat engine uses according to various embodiments.

FIG. 6 is a simplified diagram illustrating systems including a heat engine 900. The heat engine 900 may comprise the heat engine 100 (FIG. 1), the heat engine 600 (FIG. 3), or the heat engine 904 described herein. In some embodiments, the heat engine 900 is configured to use various heat sources (in the exemplary illustration as "hot water"). Such heat sources can include, but are not limited to, transformer waste heat, data center waste heat, industrial waste heat, solar thermal heat, combined heat and power (CHP) fuel source generator heat, and geothermal heat. A storage tank 902 may be used to store the hot water prior to delivery of the hot water to the heat engine 900. The heat engine 900 may be configured to deliver rotational power (e.g., to a generator) that can be used to produce electricity, such as described herein, and provide such electricity to any power requiring end user. By way of example only, electricity may be provided to electric vehicles, an electrical grid, and commercial/residential buildings.

Heat engines can be configured for use with refrigerant R 410a. The following table illustrates various exemplary operating parameters that can be realized using a heat engine, such as disclosed herein, that is configured for operation using R 410a.

| Heat Engine use case using R 410a | Heat Source Energy Model No. | Net Output (kWe) | Hot Temp in (° F.) | Cold Temp in (° F.) | Delta Temp (° F.) | Dimensions (inches) |
|---|---|---|---|---|---|---|
| 1 | HSE 35 | 35 | 150-210 | 34-75 | 116-135 | 60 × 60 × 85 |
| 2 | HSE 50 | 50 | 150-210 | 34-75 | 116-135 | 60 × 60 × 85 |
| 3 | HSE 100 | 100 | 150-210 | 34-75 | 116-135 | 60 × 60 × 85 |
| 4 | CPP 50 | 50 | 150-210 | 34-75 | 116-135 | 50 × 26 × 71 |

The heat engines and CPP's disclosed herein provide many advantages over other heat engines. For example, the heat engines and CPP's disclosed herein may have a footprint about 120 times smaller than a footprint of solar panels outputting the same power. The heat engines and CPP's have an energy density of about 1,800 Watts/sq. ft. compared to 15 Watts/sq. ft. for solar panels. The heat engines and CPP's may be configured to run continuously (24 hours a day, seven days a week) compared to intermittently or with diurnal variations as is experienced with solar and wind power. The cold water and hot water flow rates may be lower than cold water and hot water flow rates of typical heat engines for less parasitic loads. Accordingly, small pumps can be satisfactory at providing a reduction in cost and an increase in profit. In addition, the lower hot water temperatures of the heat engines described herein facilitate the use of less costly external piping compared to conventional heat engines. Further, the efficiency of the heat engines described herein may be two or more times greater than the efficiency of conventional waste heat engines for the same fluid heat source temperature. In some embodiments, high efficiency operating is attained with fluid heat sources having temperatures as low as 47.8° C. (118° F.) with cooling sources having a temperature below 4.5° C. (40° F.). In other embodiments, the temperature of the cooling sources is about 4.5° C. (40° F.) and high-power output is achieved at temperatures above 71.2° C. (160° F.) yielding very high efficiencies. In some embodiments, the heat engines disclosed herein are configured to absorb rejected heat from the refrigerant compressor and/or a refrigerant chiller, which can be in the range of 30° C. to 76° C. (86.0° F. to 168.8° F.). In some embodiments, the heat engines are configured to absorb rejected heat with a liquid-to-liquid-phase-preheater, which, in some examples, can be similar to economizer functionality. The preheater for the heat engine may enhance the primary heating or flashing/evaporating of the high-pressure vapor phase that enters the scroll decompressor as a superheated gas. It will be appreciated in light of the disclosure that the preheating may add ultra-low temperature thermal energy to the entire cycle and thus further improve efficiency.

In some embodiments, the heat engines disclosed herein comprise modular heat engines comprising plug-and-play arrangements that are stackable to achieve a desired total power generation (e.g., based on the number of modular heat engines) coupled together. The heat engines may operate on waste heat from one or more processes, as shown in FIG. 6. In combination with waste heat from diesel generators, the combined systems can reduce fuel consumption, reduce carbon dioxide emissions and increase power production. Explained further, waste heat that would otherwise be expelled into the environment can be utilized as an input for the heat engines disclosed herein whereby the waste heat can be used by the heat engines to generate electricity. In this regard, fuel consumption that may otherwise be needed to generate a power input can be reduced or eliminated. Similarly, carbon dioxide emissions can also be reduced as the waste heat can now be repurposed as a useful input to the heat engine.

In some embodiments, the heat engines 900 are configured to switch between zero output to maximum output (and any various intermediate output between zero and maximum output). The output of the heat engine 900 may range from between about 5 kW to about 100 kW net output per module. In other embodiments, grid synching configurations are implemented to provide three-phase 480 volts, 60 Hz electricity output, using, for example, permanent magnet generators. It will be appreciated in light of the disclosure, and as described in the examples shown in FIGS. 23-26, that the efficiency of cooling can be a crucial factor in determining the operational safety and the life span of various transformer installations. In some embodiments, one or more transformer installations (e.g., associated with an electrical grid) can deploy natural cooling with radiators. In some embodiments, the heat loss from the transformers is absorbed by the transformer oil and transferred to the surrounding air via radiators. The radiator radiative capacity may be reduced or eliminated with one or more heat engines 900. For example, the heated transformer oil can heat the storage tank 902, which can be deployed with other fluids, use the oil from the transformer, or other combinations or heat exchanges as needed. Stated another way, the heated transformer oil may be used to heat the fluids within the storage tank 902 which, in turn, may be used as a fluid heat source (e.g., the low-grade fluid heat source 103 (FIG. 1), the hot fluid 528 (FIG. 2), the hot fluid 640 (FIG. 3); or the heated transformed oil may itself by used as a fluid heat source. In embodiments, the one or more heat engines 900 may be deployed to work with Siemen's closed TUPROTECT® system that is configured to prevent the transformer oil from contacting the surrounding air. In these examples, the oil expansion may be compensated by an air bag, other expansion devices, or absorbing such tail energy with the one or more heat engines 900.

Figure 7:
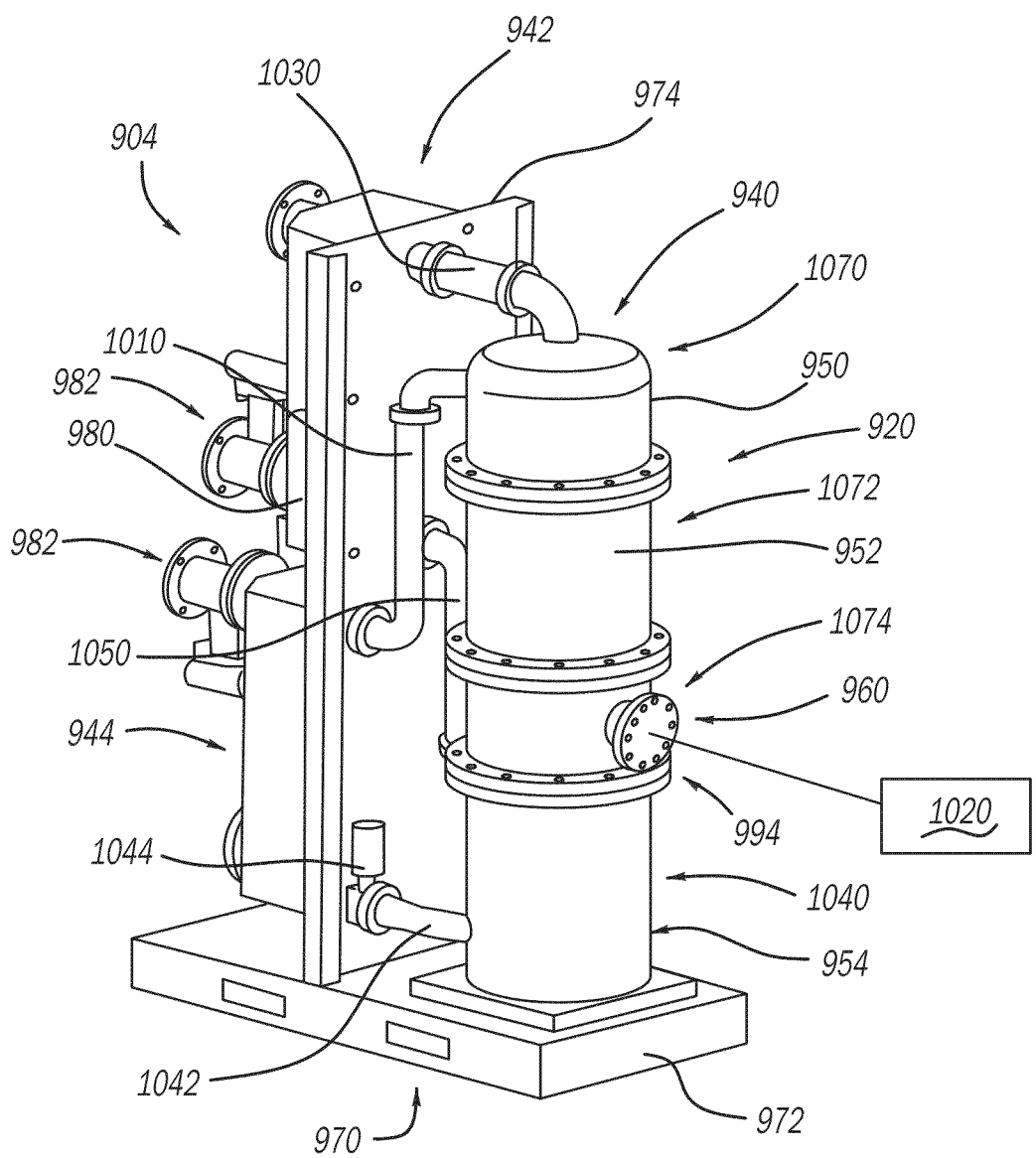
FIG. 7 is a simplified partial perspective view of a compact power pack, in accordance with embodiments of the disclosure.
Figure 8:
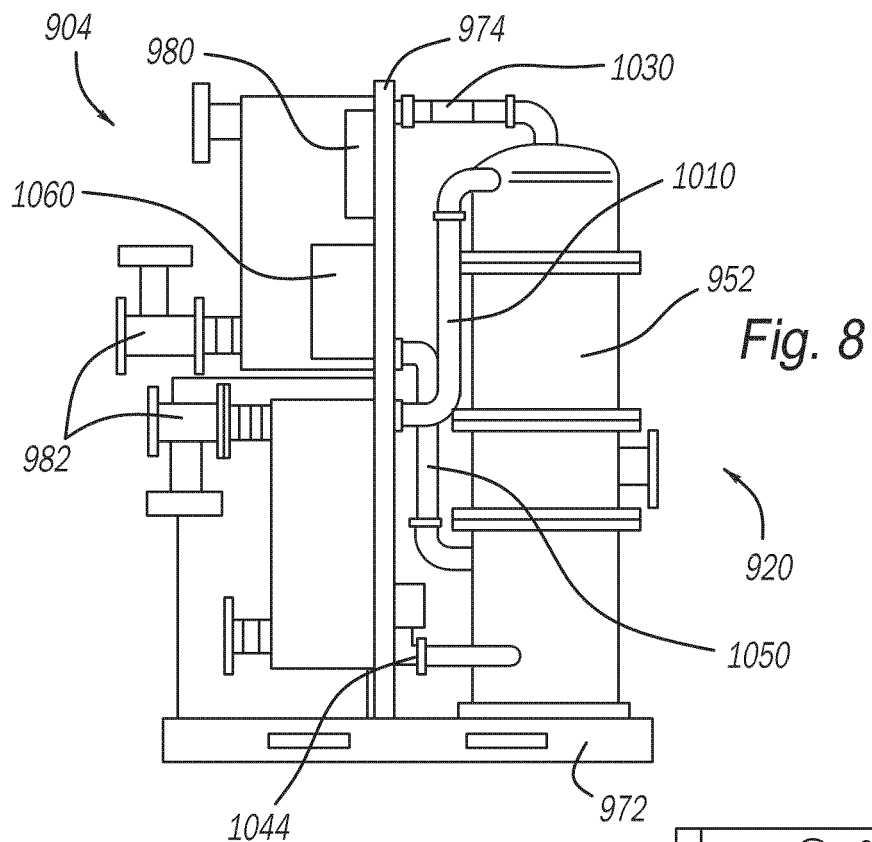
FIG. 8 is a simplified partial right side view of the compact power pack of FIG. 7.
Figure 9:
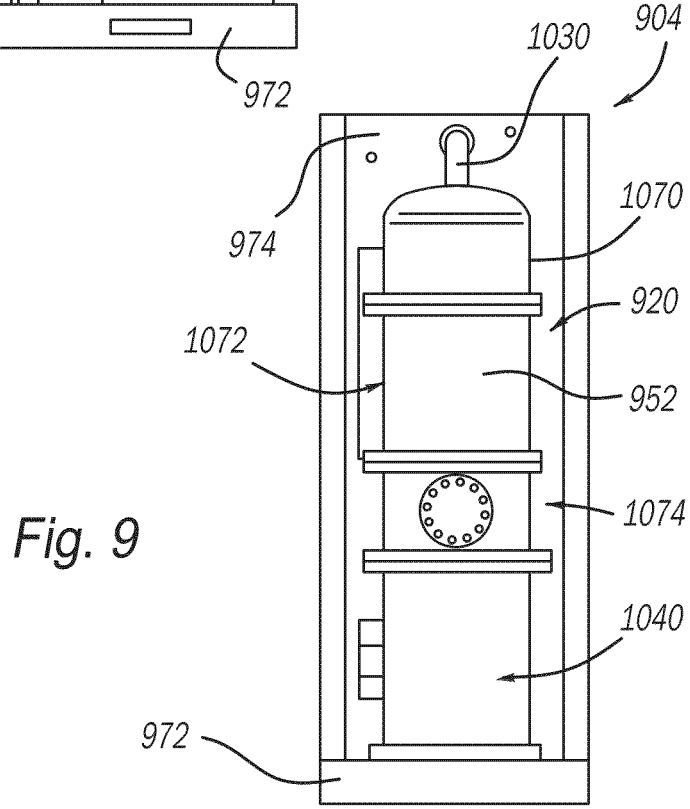
FIG. 9 is a simplified partial front view of the compact power pack of FIG. 7.
Figure 12:
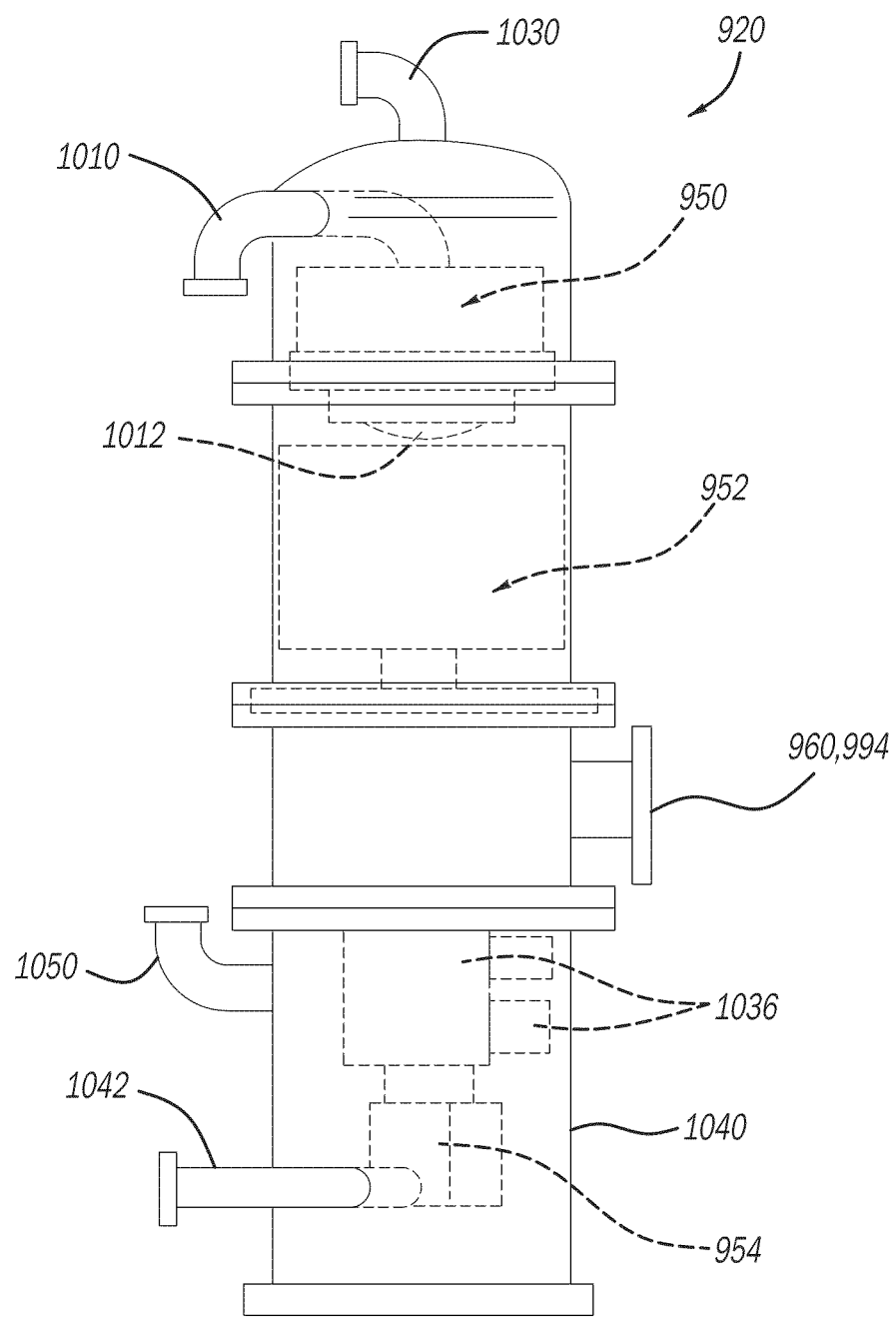
FIG. 12 is a simplified partial cross-sectional view of the compact power pack of FIG. 7 illustrating internal portions of the compact power pack.

FIG. 7 is a simplified front perspective view of a heat engine 904 incorporating a compact power pack (CPP) 920, in accordance with embodiments of the disclosure. FIG. 8 is a simplified partial side view of the heat engine 904 and CPP 920; FIG. 9 is a simplified partial front view of the heat engine 904 and CPP 920; FIG. 10 is a simplified partial back view of the heat engine 904; FIG. 11 is a simplified left side view of the heat engine 904 and CPP 920; FIG. 12 is a simplified view of the CPP 920 illustrating internal portions of the CPP 920. The CPP 920 is an ultra-low temperature unit, meaning that the CPP 920 is configured to generate electricity with a heat source having a relatively low temperature (e.g., less than about 82° C.). The CPP 920 may be configured to use carbon dioxide or R 744 as a refrigerant. It will be appreciated that in the examples described herein, the refrigerant may be provided in a liquid form (e.g., to the positive-displacement hydraulic pump 109 (FIG. 1), to the pump 504 (FIG. 2), to the circulation pump 616 (FIG. 3)) so that the refrigerant can be efficiently pumped so as not to introduce unwanted cavitation of the respective pump. In embodiments where the refrigerant comprises carbon dioxide, the carbon dioxide may be maintained at a temperature below about the critical temperature (e.g., 30.8° C. (about 87.5° F.)) to facilitate hydraulic pumping of the refrigerant. In other words, the pump 504 may exhibit a net positive head to facilitate pumping of the carbon dioxide. In some embodiments, condensing the carbon dioxide may facilitate maintaining the carbon dioxide below about 30.8° C. (about 87.5° F.) to maintain efficient pumping. The use of carbon dioxide as a refrigerant may be advantageous compared to the use of conventional refrigerants, such as R 410A, as carbon dioxide is a naturally occurring refrigerant.

The CPP 920 may be configured to provide a net output of between about 30 kW and about 40 kWe. By way of non-limiting example, a temperature range for the fluid heat source is within a range of from about 32.2° C. (about 90° F.) to about 55.0° C. (about 131° F.). An exemplary temperature range for the heat sink is within a range of from about 1.2° C. (about 34° F.) to about 23.9° C. (about 75° F.). In some examples, the CPP 910 has a size of about 114.3 cm by about 83.8 cm by about 165.1 cm.

With collective reference to FIG. 7 through FIG. 14, the CPP 920 includes a generally cylindrical main housing that can serve as a high-pressure shell 940. The CPP also includes a condenser 942 and an evaporator 944. The high-pressure shell 940 may house an orbital scroll decompressor 950, a permanent magnet (PM) generator 952, a refrigerant pump 954, and a magnetic coupling 960. As will be described herein, the magnetic coupling 960 may be configured to magnetically couple the CPP 920 to one or more other devices to drive the one or more devices. By way of non-limiting example, the one or more devices may comprise a generator, an air compressor, a heat pump, a gear driven device, and a pump. All components within the high-pressure shell 940 may be arranged to be driven with a single direct drivetrain. In some embodiments, the high-pressure shell 940 is configured to maintain an internal pressure of about 10.3 MPa (about 1,500 psi). As shown, various flanges may be incorporated at locations along the high-pressure shell 940. In some embodiments, the internal components (described in detail herein) are configured for operation at a maximum pressure differential of about 3.1 MPa (about 450 psi) between the low-pressure zone and the high-pressure zone.

For background, a typical organic Rankine cycle refrigerant R 245fa (such as Genetron® brand refrigerant) boils at about 60° F. at atmospheric pressure. Accordingly, a maximum possible Carnot efficiency is defined as a highest efficiency a heat engine can operate between the two energy reservoirs and a percentage of Carnot is defined as an actual Carnot from the heat engine divided by a maximum possible Carnot. The heat engine efficiency is, therefore, defined as a work or electricity in kWe (kilowatts electricity) divided by thermal energy in kWt (kilowatts thermal); and the overall delta T is defined as a temperature hot (the temperature of the fluid heat source) minus a temperature cold (the temperature of the heat sink). By way of comparison, a typical steam turbine can operate with 1200° F. (648.9° C.) hot temperature in, and 60° F. (15.6° C.) cold temperature in. Overall delta T is 1,140° F. (615.6° C.). Maximum possible Carnot efficiency is 68%. A steam engine actual efficiency is 50%. A percentage of Carnot (50%/68%) is 73%. The boiling point of the operating fluid is 212° F. (100° C.).

Figure 15:
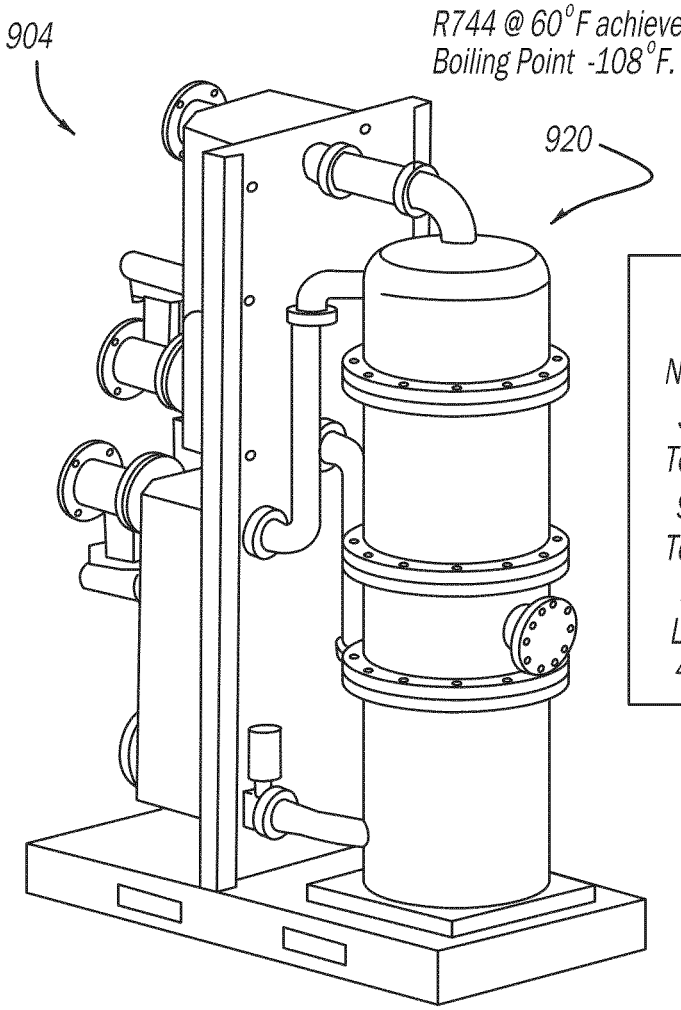
FIG. 15 is a front perspective view of a pressure differential decompression unit having various operating temperatures and efficiencies according to one example.

Turning now to FIGS. 15-21, various heat engine configurations according to the present disclosure will be described. FIG. 15 illustrates a heat engine 904 incorporating a CPP 920 according to various features. The CPP 920 shown in FIG. 15 using pressure differential decompression technology can operate with 116° F. (46.7° C.) hot temperature in and 60° F. (15.6° C.) cold temperature in. Overall delta T is 56° F. (13.3° C.). It can be shown that maximum possible Carnot efficiency is 11%. It can also be shown that the actual efficiency of the heat engine 904 is 9%. As such, a percentage of Carnot (9%/11%) is 81%. The heat engine 904 can use R 744 that decompresses from 1,184 PSI (8.1 mPa) to 734 PSI (8.1 mPa), which is 450 PSI of decompression (3.1 mPa). R 744 at 116° F. achieves 1,184 PSI. R 744 at 60° F. (15.6° C.) achieves 734 V. The boiling point of R 744 is −108° F. (−77.8° C.). The heat engine 904 can be shown to have a net output of between 30 and 40 kWe. In embodiments, the temperature range for hot can be between 90° F. to 131° F. and a temperature range for cold can be between 34° F. to 75° F. (1.1° C. to 23.9° C.). In these examples, the heat engine 904 can be relatively compact and, for example, can measure 45×33×65 inches.

Figure 16:
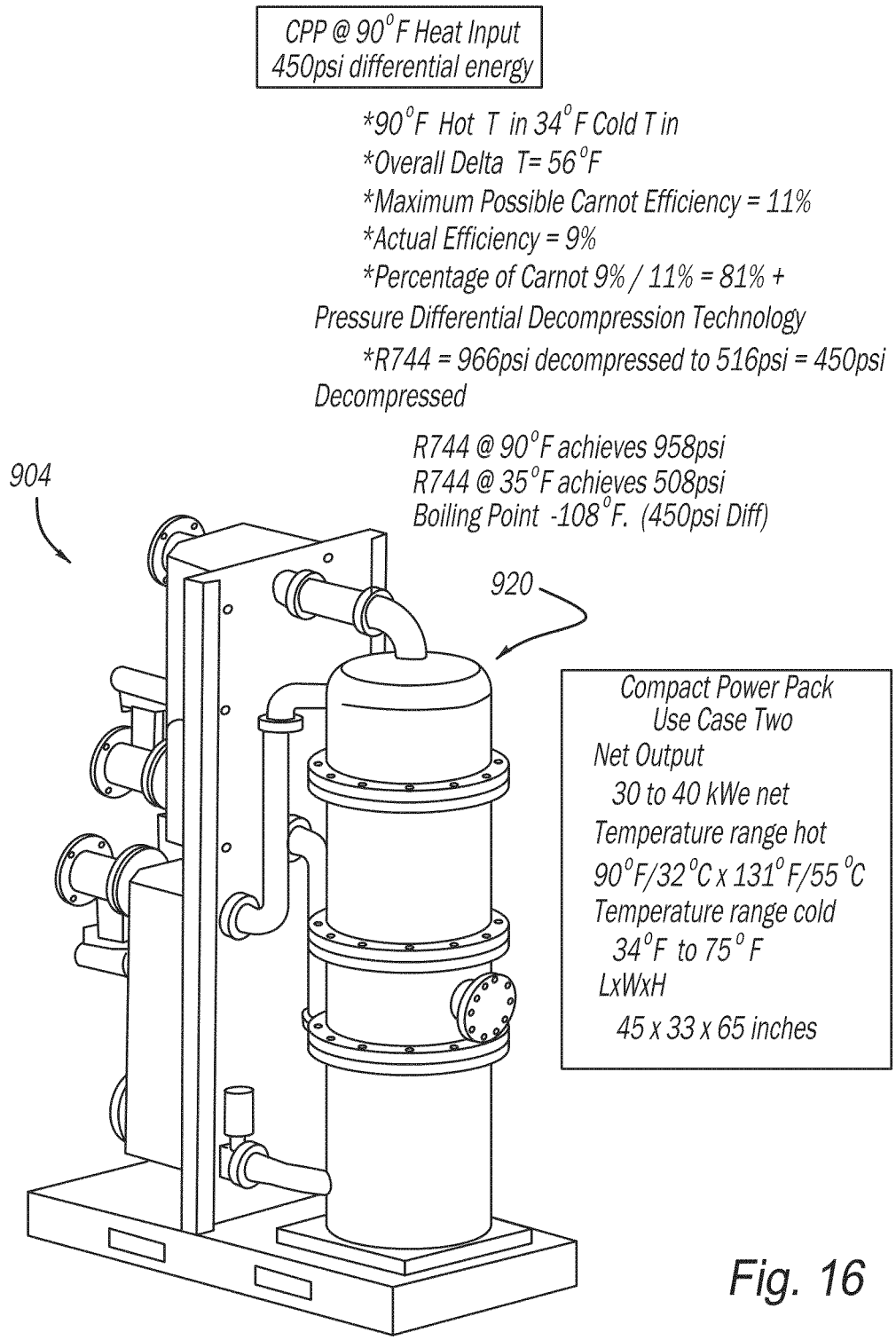
FIG. 16 is a front perspective view of a pressure differential decompression unit having various operating temperatures and efficiencies according to another example.

FIG. 16 illustrates a heat engine 904 incorporating a CPP 920 configured for use according to additional operating parameters. The heat engine 904 shown in FIG. 16 using pressure differential decompression technology can operate with 90° F. (32.2° C.) hot temperature in and 34° F. (1.1° C.) cold temperature in. Overall delta T is 56° F. (13.3° C.). It can be shown that maximum possible Carnot efficiency is 11%. It can also be shown that actual efficiency of the heat engine 904 is 9%. As such, a percentage of Carnot (9%/11%) is 81%. The heat engine 904 can use R 744 that decompresses from 966 PSI to 516 PSI (450 PSI of decompression). R 744 at 90° F. (32.2° C.) achieves 958 PSI. R 744 at 35° F. (1.7° C.) achieves 508 PSI (3.5 mPa). As noted above, the boiling point of R 744 is −108° F. (−77.8° C.). In these examples, the heat engine 904 can have a net output of between 30 and 40 kWe. In embodiments, the temperature range for hot can be between 90° F. to 131° F. (32.2° C. to 55.0° C.) and a temperature range for cold is between 34° F. to 75° F. (1.1° C. to 23.9° C.). In these examples, the heat engine 904 can be configured to be relatively compact and, for example, can measure 45×33×65 inches.

Figure 17:
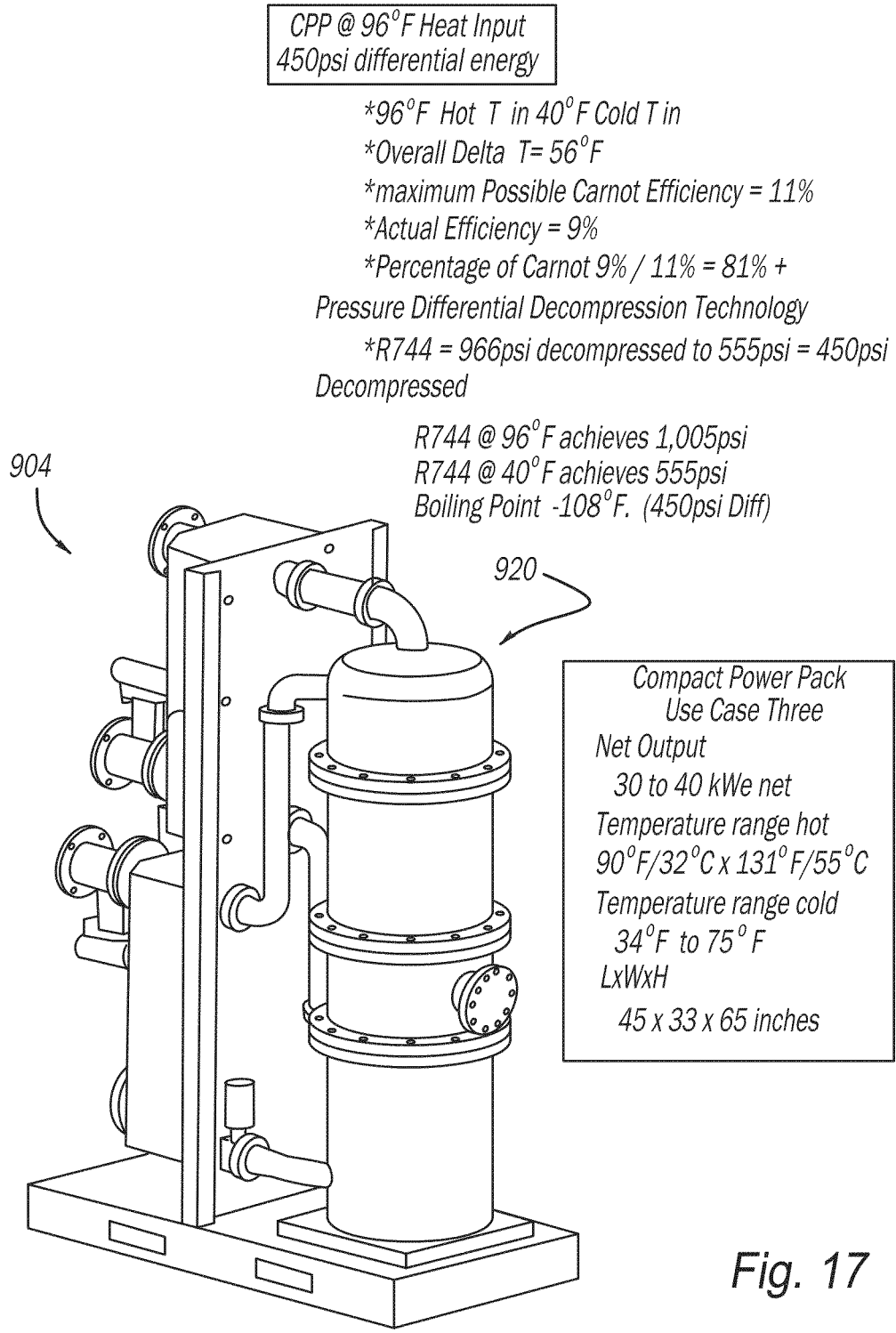
FIG. 17 is a front perspective view of a pressure differential decompression unit having various operating temperatures and efficiencies according to another example.

FIG. 17 illustrates a heat engine 904 incorporating the CPP 920 configured for use according to additional operating parameters. The heat engine 904 shown in FIG. 17 using pressure differential decompression technology can operate with 96° F. (35.6° C.) hot temperature in and 40° F. (4.5° C.) cold temperature in. Overall delta T is 56° F. (13.3° C.). It can be shown that maximum possible Carnot efficiency is 11%. It can also be shown that actual efficiency of the heat engine 904 is 9%. As such, a percentage of Carnot (9%/11%) is 81%. The heat engine 904 can use R 744 that decompresses from 1,005 PSI (6.9 mPa) to 555 PSI (3.8 mPa), which is 450 PSI (3.1 mPa) decompression. R 744 at 96° F. achieves 1,005 PSI. R 744 at 40° F. achieves 555 PSI. As noted above, the boiling point of R 744 is −108° F. (−77.8° C.). In these examples, the heat engine 904 can have a net output of between 30 and 40 kWe. In embodiments, the temperature range for hot can be between 90° F. to 131° F. (32.2° C. to 55.0° C.) and a temperature range for cold is between 34° F. to 75° F. (1.1° C. to 23.9° C.). In these examples, the heat engine 904 can be configured to be relatively compact and, for example, can measure 45×33×65 inches.

Figure 18:
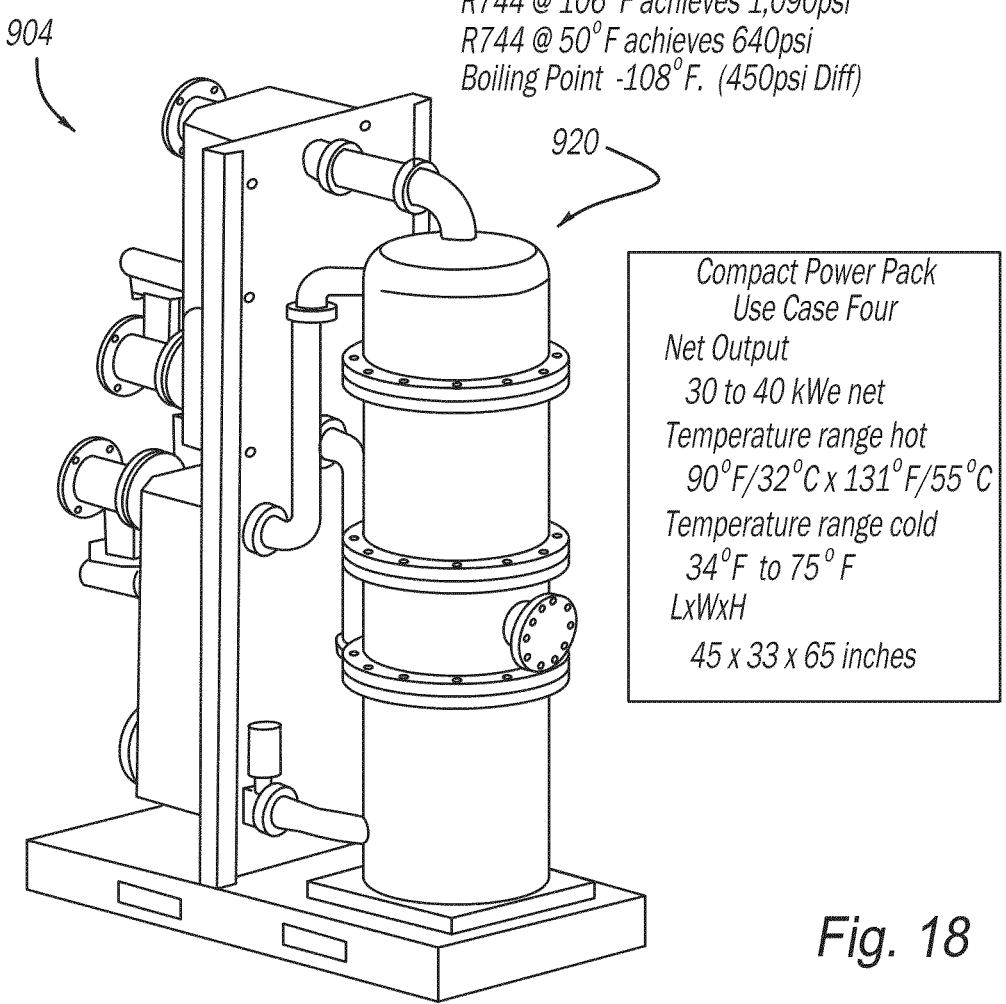
FIG. 18 is a front perspective view of a pressure differential decompression unit having various operating temperatures and efficiencies according to another example.

FIG. 18 illustrates a heat engine 904 incorporating the CPP 920 configured for use according to additional operating parameters. The heat engine 904 shown in FIG. 18 using pressure differential decompression technology can operate with 106° F. hot temperature in and 50° F. cold temperature in. Overall delta T is 56° F. It can be shown that maximum possible Carnot efficiency is 11%. It can also be shown that actual efficiency of the heat engine 904 is 9%. As such, a percentage of Carnot (9%/11%) is 80%. The heat engine 904 can use R 744 that decompresses from 1,090 PSI (7.5 mPa) to 640 PSI (4.4 mPa), which is 450 PSI (3.1 mPa) decompression. R 744 at 106° F. (41.4° C.) achieves 1,090 PSI. R 744 at 50° F. (10.0° C.) achieves 640 PSI (4.4 mPa). As noted above, the boiling point of R 744 is −108° F. (−77.8° C.). The heat engine 904 can have a net output of between 30 and 40 kWe. In embodiments, the temperature range for hot can be between 90° F. to 131° F. (32.2° C. to 55.0° C.) and a temperature range for cold is between 34° F. to 75° F. (1.1° C. to 23.9° C.). In these examples, the heat engine 904 can be configured to be relatively compact and, for example, can measure 45×33×65 inches (114.3×83.8×165.1 centimeters).

Figure 19:
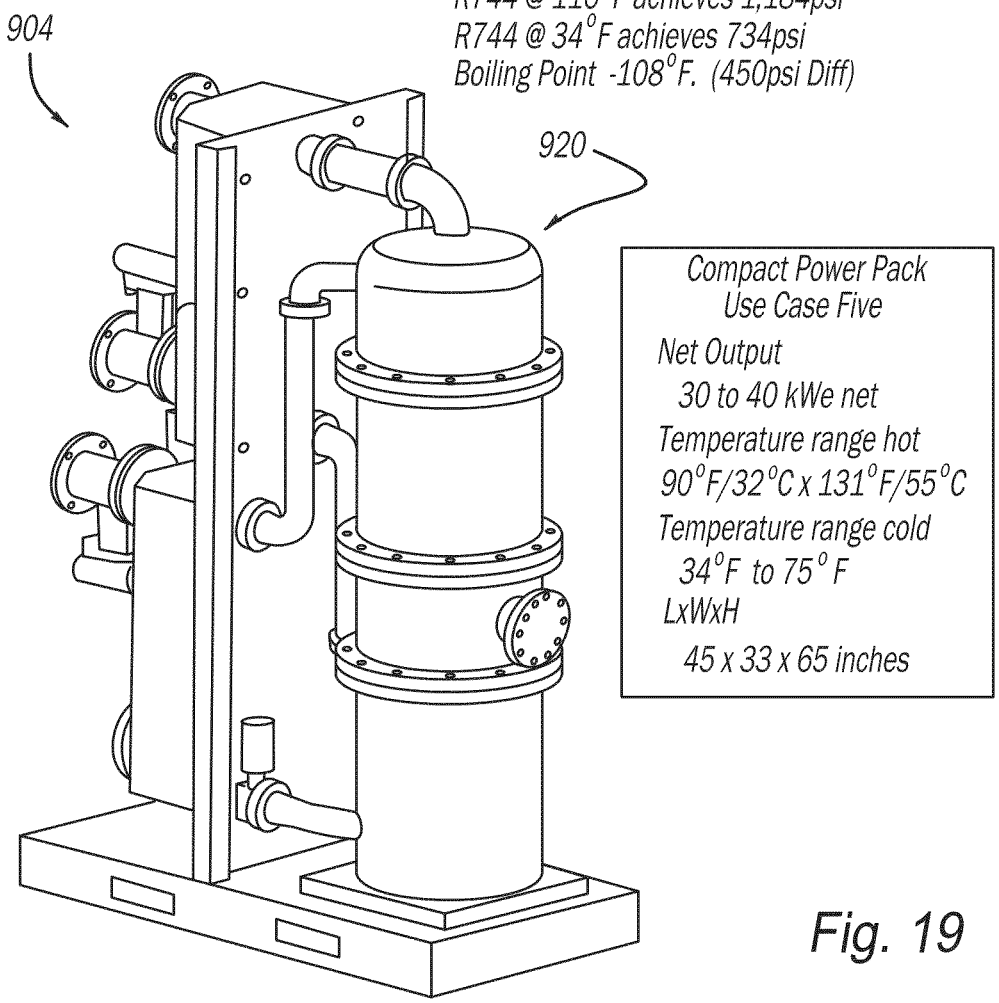
FIG. 19 is a front perspective view of a pressure differential decompression unit having various operating temperatures and efficiencies according to another example.

FIG. 19 illustrates a heat engine 904 incorporating the CPP 920 configured for use according to additional operating parameters. The heat engine 904 shown in FIG. 19 using pressure differential decompression technology can operate with 116° F. (46.7° C.) hot temperature in and 60° F. (15.6° C.) cold temperature in. Overall delta T is 56° F. It can be shown that maximum possible Carnot efficiency is 11%. It can also be shown that actual efficiency of the heat engine 904 is 9%. As such, a percentage of Carnot (9%/11%) is 81%. The heat engine 904 can use R 744 that decompresses from 1,184 PSI to 734 PSI (450 PSI of decompression). R 744 at 116° F. (46.7° C.) achieves 1,184 PSI. R 744 at 34° F. (1.1° C.) achieves 734 PSI (5.0 mPa). As noted above, the boiling point of R 744 is −108° F. (−77.8° C.). In these examples, the heat engine 904 can have a net output of between 30 and 40 kWe. In embodiments, the temperature range for hot is between 90° F. to 131° F. (32.2° C. to 55.0° C.) and a temperature range for cold is between 34° F. to 75° F. (1.1° C. to 23.9° C.). In these examples, the heat engine 904 can be relatively compact and, for example, can measure 45×33×65 inches (114.3×83.8×165.1 centimeters).

FIG. 20 illustrates a heat engine 904 incorporating the CPP 920 configured for use according to additional operating parameters. The heat engine 904 shown in FIG. 20 using pressure differential decompression technology can operate with 126° F. (32.2° C. to 55.0° C.) hot temperature in and 70° F. cold temperature in. Overall delta T is 56° F. It can be shown that maximum possible Carnot efficiency is 10%. It can also be shown that actual efficiency of the heat engine 904 is 8%. A percentage of Carnot (8%/10%) is 80%. The heat engine 904 can use R 744 that decompresses from 1,287 PSI (8.8 mPa) to 837 PSI (5.8 mPa), which is 450 PSI (3.1 mPa) of decompression. R 744 at 126° F. (52.2° C.) achieves 1,287 PSI. R 744 at 70° F. (52.2° C.) achieves 837 PSI (5.8 mPa). As noted above, the boiling point of R 744 is −108° F. (−77.8° C.). The heat engine 904 can have a net output of between 30 and 40 kWe. In embodiments, the temperature range for hot can be between 90° F. to 131° F. (32.2° C. to 55.0° C.). In these examples, the heat engine 904 can also be relatively compact and, for example, can measure 45×33×65 inches (114.3×83.8×165.1 centimeters).

Figure 21:
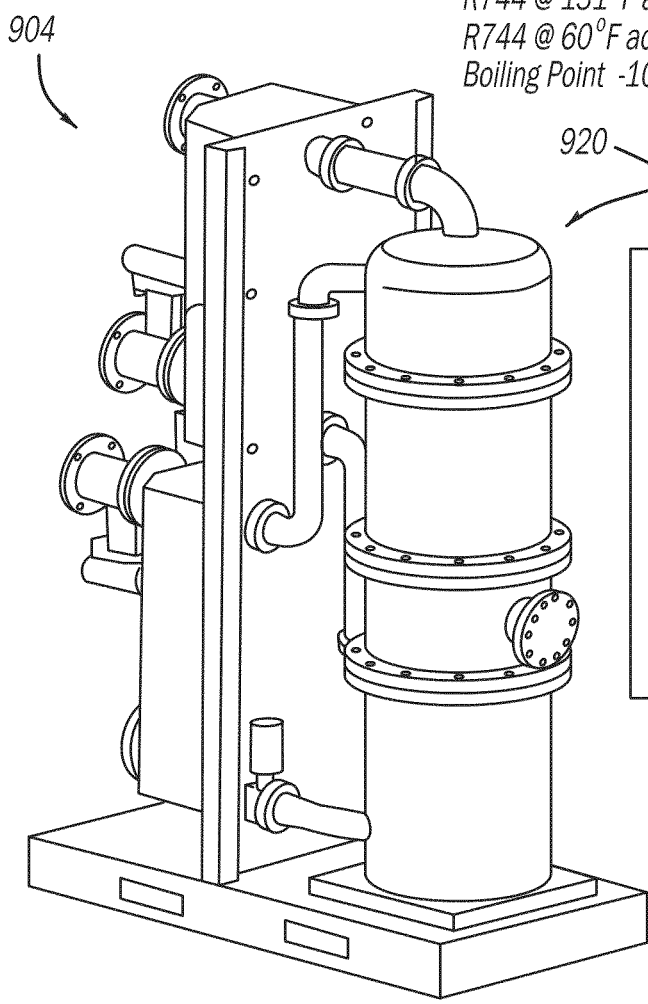
FIG. 21 is a front perspective view of a pressure differential decompression unit having various operating temperatures and efficiencies according to another example.

FIG. 21 illustrates a heat engine 904 incorporating the CPP 920 configured for use according to additional operating parameters. The heat engine 904 shown in FIG. 21 using pressure differential decompression technology can operate with 131° F. (55.0° C.) hot temperature in and 75° F. (23.9° C.) cold temperature in. Overall delta tis 56° F. (13.3° C.). It can be shown that maximum possible Carnot efficiency is 10%. It can also be shown that actual efficiency of the heat engine 904 is 8%. A percentage of Carnot (8%/10%) is 80%. The heat engine 904 can use R 744 that decompresses from 1,342 PSI (9.3 mPa) to 892 PSI (6.2 mPa), which is 450 PSI (3.1 mPa) of decompression. R 744 at 131° F. achieves 1,342 PSI. R 744 at 60° F. achieves 892 PSI. As noted above, the boiling point of R 744 is −108° F. (−77.8° C.). In these examples, the heat engine 904 can have a net output of between 30 and 40 kWe. In embodiments, the temperature range for hot is between 90° F. to 131° F. (32.2° C. to 55.0° C.) and a temperature range for cold is between 34° F. to 75° F. (1.1° C. to 23.9° C.). In these examples, the heat engine 904 can be relatively compact and, for example, can measure 45×33×65 inches (114.3×83.8×165.1 centimeters).

The following table illustrates the various exemplary operating parameters identified above that can be realized using a heat engine, such as disclosed herein, that is configured for operation using R 744.

| Heat Engine use case using R 744 | Hot Temp in (° F.) | Cold Temp in (° F.) | Delta Temp (° F.) | Max Possible Carnot Efficiency (%) | Actual Efficiency (%) | % of Carnot | Pressure Differential (psi) of R 744 | psi of R 744 @ Hot Temp | psi of R 744 @ Cold Temp |
|---|---|---|---|---|---|---|---|---|---|
| 5 | 116 | 60 | 56 | 11 | 9 | 81 | 450 | 1184 | 734 |
| 6 | 90 | 34 | 56 | 11 | 9 | 81 | 450 | 958 | 508 |
| 7 | 96 | 40 | 56 | 11 | 9 | 81 | 450 | 1005 | 555 |
| 8 | 106 | 50 | 56 | 11 | 9 | 80 | 450 | 1090 | 640 |
| 9 | 116 | 60 | 56 | 11 | 9 | 81 | 450 | 1184 | 734 |
| 10 | 126 | 70 | 56 | 10 | 8 | 80 | 450 | 1287 | 837 |
| 11 | 131 | 75 | 56 | 10 | 8 | 80 | 450 | 1342 | 892 |

By way of comparison, the following table illustrates both example use case 2 using R 410a and example use cases 5 through 8 using R 744. As can be seen, a similar efficiency can be realized while requiring significantly reduced hot temperature in as well as reduced cold temperature in.

| Heat Engine use case | Average Hot Temp in (° F.) | Average Cold Temp in (° F.) | Delta Temp (° F.) | Max Possible Carnot Efficiency (%) | Actual Efficiency (%) | % of Carnot | Pressure Differential (psi) of coolant | psi of coolant @ Hot Temp | psi of coolant @ Cold Temp |
|---|---|---|---|---|---|---|---|---|---|
| 2 (R 410a) | 185 | 60 | 125 | 19 | 12 | 63 | 450 | 620 | 170 |
| 5 (R 744) | 116 | 60 | 56 | 11 | 9 | 81 | 450 | 1184 | 734 |
| 6 (R 744) | 90 | 34 | 56 | 11 | 9 | 81 | 450 | 958 | 508 |
| 7 (R 744) | 96 | 40 | 56 | 11 | 9 | 81 | 450 | 1005 | 555 |
| 8 (R 744) | 106 | 50 | 56 | 11 | 9 | 80 | 450 | 1090 | 640 |

Returning now to FIG. 7 through FIG. 11, the CPP 920 can be supported by a stand 970 comprising a base 972 and a vertical support wall 974. A control cabinet 976 may be supported on the base 972. Supplemental heat exchangers 980 may be provided to absorb other low temperature heat sources using another economizing heat exchanger that utilizes liquid to liquid exchange. Flow sensors 982 can be incorporated to measure and communicate the flow at the condenser 942 and/or the evaporator 944.

In some embodiments, referring to FIG. 7, cooler refrigerant and/or lubricating oil may be injected (e.g., at a low-pressure gas return 1030 and/or a high-pressure liquid pipe 1042). The cooler refrigerant and/or lubricating oil may act as a supercharger to increase working fluid mass when the working fluid is over superheated (e.g., at a density lower than desired). Mixing the cooler refrigerant and/or the lubricating oil with the working fluid may enhance the efficiency of the CPP 920 by decreasing pressure-slippage of the orbital scroll decompressor 950 when the working fluid is too thin (e.g., has a low viscosity and a low density). A lower temperature heat exchanger can be used before the supercharger to increase performance. The outlet pressure of the refrigerant pump 954 can be slightly higher than the inlet pressure of the orbital scroll decompressor 950, which may facilitate controlled liquid supercharged refrigerant injection into the inlet of the orbital scroll decompressor 950 to increase performance of the CPP 920. The PM generator 952 may serve as a motor drive shaft assist to a power take-off (PTO) 994 as desired when intermittent or increased power is desired. Electricity can be generated when the PTO is not in use or intermittently in use. In examples where water is available to the heat engine or CPP platforms and the platforms are providing electricity, such configurations can be used in instances where hydrogen production is desired. By way of these examples, the heat engines and CPP platforms disclosed herein can be used for hydrogen production. In examples, the hydrogen production can be particularly useful for remote hydrogen fuel stations.

In use and operation, a high-pressure gas inlet pipe 1010 may deliver high pressure gas from the evaporator 944 to the orbital scroll decompressor 950. The orbital scroll decompressor 950 is configured to rotate a main shaft 1012 (FIG. 12) that in turn rotates the permanent magnet generator 952. A power receiving device 1020 (FIG. 7) can be coupled to an output of the PM generator 952. The power receiving device 1020 can comprise a generator, an air compressor, a heat pump, a gear driven device, a pump, or other devices that can receive a powered input. Rotational motion can be transferred from the PM generator 952 to the power receiving device 1020 through the PTO 994 by way of the magnetic coupling 960. As explained herein, the orbital scroll decompressor 950 decompresses the high-pressure gas entering through the pipe 1010. In some embodiments, decompression of the high-pressure gas in the orbital scroll decompressor 950 generates power by rotating the PM generator 952. Low-pressure gas, subsequent to the decompressing in the orbital scroll decompressor 950 exits the orbital scroll decompressor 950 through a low-pressure gas return 1030 where it is delivered to the condenser 942. While the CPP 920 has been described and illustrated as comprising an orbital scroll decompressor 950, the disclosure is not so limited. In other embodiments, the CPP 920 includes a decompressor other than the orbital scroll decompressor 950.

The refrigerant pump 954 is mechanically coupled to the orbital scroll decompressor 950 and driven by the main shaft 1012 (FIG. 12). An oil tank with lubrication and cooling pump 1036 (FIG. 12) is similarly connected to the main shaft 1012. High pressure liquid exits a refrigerant tank 1040 to the evaporator 944 through the high-pressure liquid pipe 1042. An actuator valve 1044 is configured to control the flow of the liquid refrigerant. In some embodiments, the refrigerant tank 1040 and the evaporator 944 are sized, shaped, and positioned such that when the refrigerant tank 1040 is stationary, the liquid level in the refrigerant tank 1040 flows into the evaporator 944 by gravity. In some embodiments, the CPP 920 is configured to auto start without auxiliary power when hot water flows through the evaporator 944. Low-pressure liquid can be returned from the condenser 942 to the refrigerant tank 1040 through a low-pressure liquid return pipe 1050. In some embodiments, an oil heater 1060 (FIG. 8) is configured for heating oil as described above.

The high-pressure shell 940 can generally define various sections including an expansion tank 1070, a generator housing 1072, a power take-off (PTO) gear housing 1074, and the refrigerant tank 1040. The expansion tank 1070 houses the orbital scroll decompressor 950. The generator housing 1072 houses the PM generator 952. The PTO gear housing 1074 houses the PTO connection 1194 (FIG. 13) and supports the magnetic coupling 960. The refrigerant tank 1040 is configured to store refrigerant and house the refrigerant pump 954 and the oil tank with lubrication and cooling pump 1036.

In the CPP 920, the refrigerant pump 954 is housed within the pressurized high-pressure shell 940. At ambient conditions, the refrigerant pump 954 experiences zero pressure. Because the refrigerant pump 954 is disposed within the high-pressure shell 940, the refrigerant pump 954 may not exhibit significant pressure differentials. For example, when the refrigerant comprises carbon dioxide. In some instances, when the refrigerant pump 954 were mounted external to the high-pressure shell 940, the pump would require a differential pressure of about 5.5 MPa (about 800 psi). Because the refrigerant pump 954 is housed inside the cylindrical main housing of high-pressure shell 940, the piping and the heat exchangers create a zero-pressure environment for the refrigerant pump 954 (and other components within the pressure vessel), where mechanical work can be accomplished more efficiently without undesirable pressure differential. Accordingly, the refrigerant pump 954 may be sized lower than pumps used in conventional ORC systems. The CPP 920 provides a more compact and modular system with an inside safe ambient pressure environment allowing components within the high-pressure shell 940 to operate in an optimal component lower pressure environment that is inside the high-pressure shell 940. For example, instead of the refrigerant and the oil pumps working against low outside ambient pressure to the high-pressure side of the system, the components can work with a higher low pressure environment such as about 4.1 mPa (about 600 psi) on the low side to about 7.2 MPa (about 1050 psi) on the high side rather than working against a low side of atmospheric pressure to a high side of about 7.2 MPa (about 1050 psi).

Figure 13:
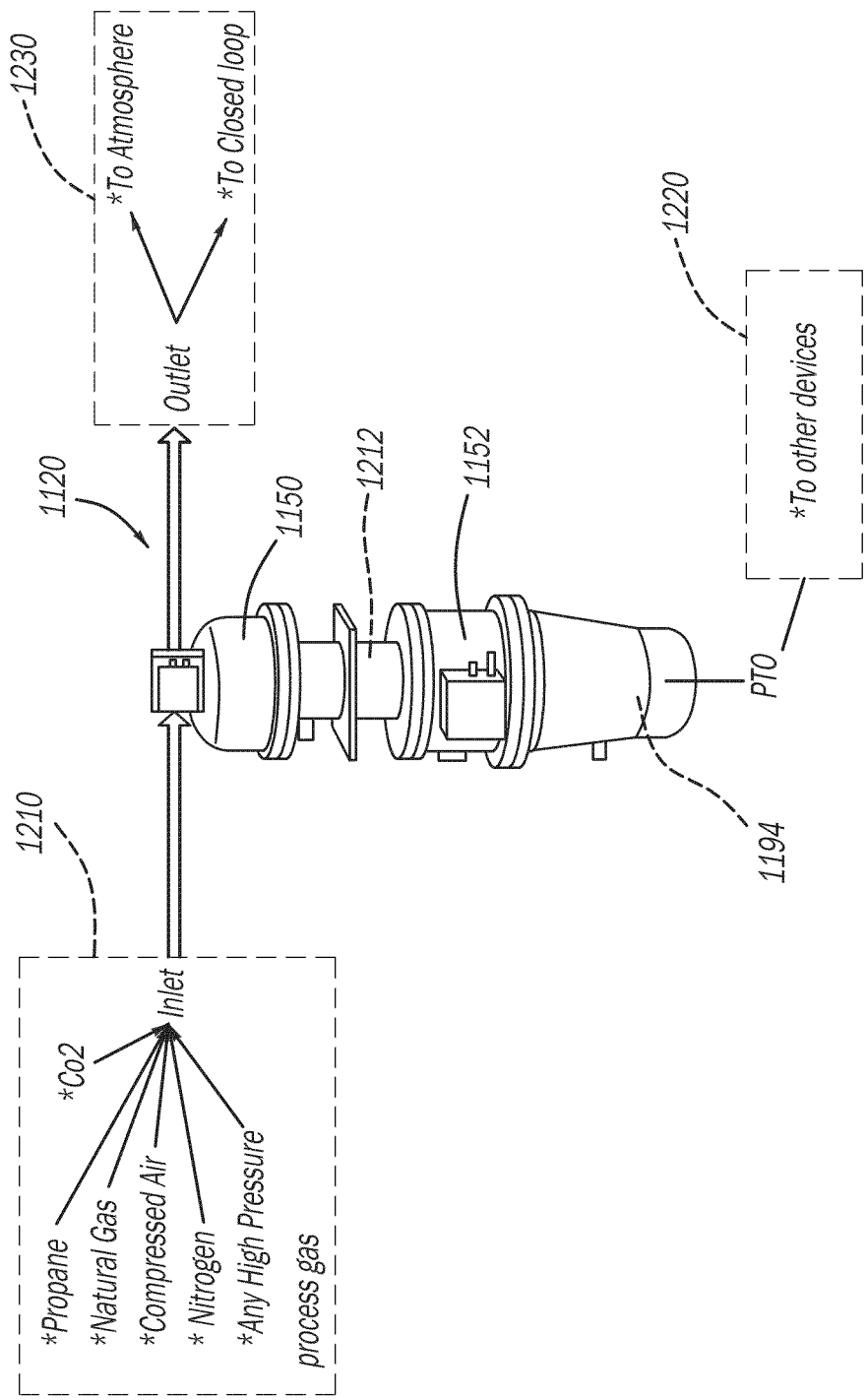
FIG. 13 is a simplified partial perspective view of a decompressor, in accordance with embodiments of the disclosure.

FIG. 13 is a simplified partial perspective view of a decompressor 1120, in accordance with embodiments of the disclosure. The decompressor 1120 may also be referred to herein as a "power tower" and includes an orbital scroll decompressor 1150. Similar to the CPP described above, the orbital scroll decompressor 1150 is configured to rotate a main shaft 1212 that in turn rotates a motor or generator 1152. A power receiving device 1220 can be coupled to an output of the generator 1152. The power receiving device 1220 may comprise a generator, an air compressor, a heat pump, a gear driven device, a pump, or other devices that can receive a powered input. Rotational motion can be transferred from the generator 1152 to the power receiving device 1220 through a power take-off (PTO) 1194 such as by way of a magnetic coupling, as previously described. The orbital scroll decompressor 1150 is configured to decompress the high-pressure gas entering the orbital scroll decompressor 1150 through an inlet 1210 to generate power by rotating the generator 1152. The inlet 1210 may be configured to receive a pressurized gas such as, but not limited to, carbon dioxide, propane, natural gas, compressed air, nitrogen, and/or other processed gas.

The decompressor 1120 may be used in one or more applications. For example, natural gas is stored at various intervals within a natural gas supply grid for delivering to commercial and residential applications (such as for supplying fuel for forced heat furnaces). In some examples, natural gas may be delivered to a distribution center in a city. For the distribution center to deliver the natural gas to the intended destinations, the natural gas is typically provided at high pressures (such as about 6,900 kPa or greater). Before entering a residence or commercial building the pressure of the natural gas is significantly reduced, such as to about 34.5 kPa to about 68.9 kPa at, for example, a natural gas meter. From the meter, the natural gas is reduced in pressure again such as to between about 6.9 kPa and about 13.8 kPa.

In some embodiments, one or more decompressors 1120 may be installed in line where it may be desirable to reduce the pressure of the natural gas from the distribution center to a residence or commercial building. In some embodiments, the one or more decompressors 1120 are configured to reduce the pressure of the national gas by about 7.2 MPa. If it is desirable to decompress more and further reduce the pressure of the natural gas, additional decompressors 1120 may be coupled in series to provide a stepwise reduction in pressure. Accordingly, the decompressor 1120 (or decompressors connected in series or parallel) may reduce the pressure of the natural gas from the inlet 1210 to an outlet 1230 and may simultaneously generate power and provide the power to various power receiving devices 1220.

In use and operation, the orbital scroll decompressor 1150 causes the main shaft 1212 to rotate during the decompression of the natural gas. Rotation of the main shaft 1212 provides a rotational input to the generator 1152. The generator 1152 may provide a rotational input to the PTO 1194 for delivering power to devices 1220.

Low-pressure gas, subsequent to the decompressing in the orbital scroll decompressor 1150, exits the orbital scroll decompressor 1150 at the outlet 1230. The outlet 1230 may be to atmosphere or may be a closed loop system for example. While the decompressor 105 has been described and illustrated as reducing the pressure of natural gas to generate electricity, the decompressor 1120 may generate power with other materials, such as liquified natural gas (LNG).

Figure 14:
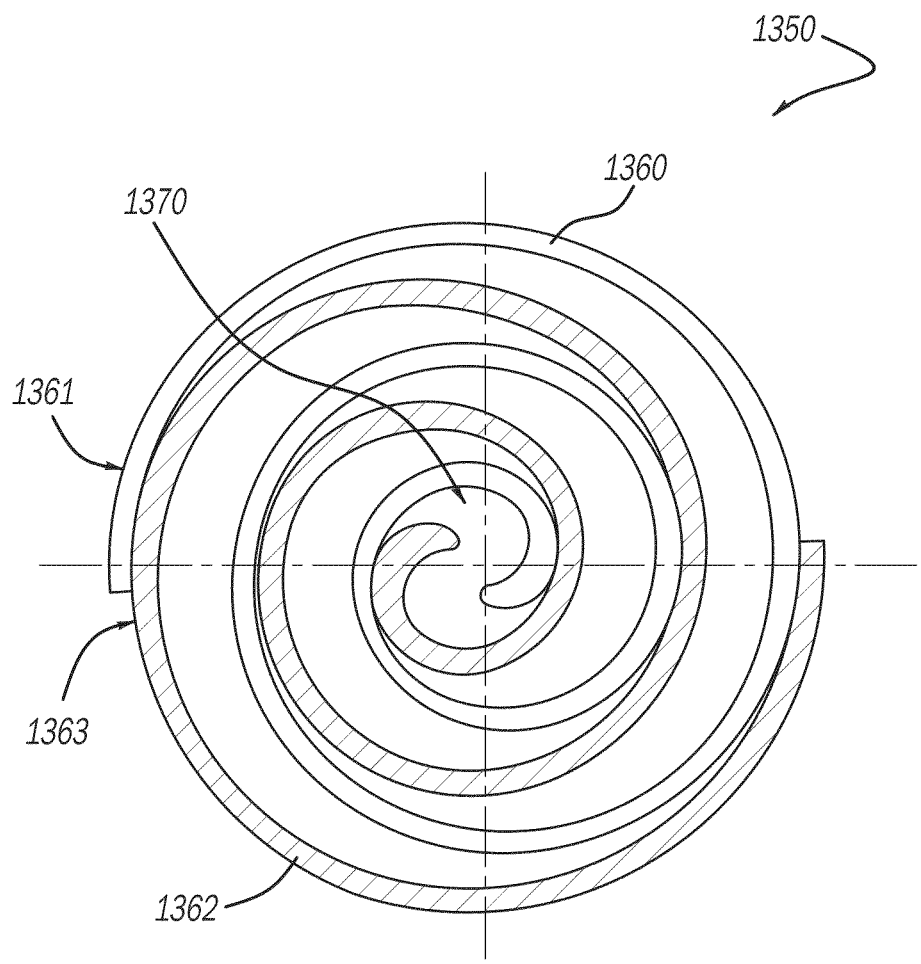
FIG. 14 is a simplified partial plan view of a scroll decompressor, in accordance with embodiments of the disclosure.

FIG. 14 is a simplified partial plan view of a scroll decompressor 1350, in accordance with embodiments of the disclosure. The scroll decompressor 1350 may be used in any of the decompressors described herein (e.g., the positive displacement decompressor 105 (FIG. 1), the expansion device 608 (FIG. 4), the orbital scroll decompressor 950 (FIG. 7), the decompressor 1120 (FIG. 13)). The scroll decompressor 1350 comprises a fixed scroll 1360 having a first wrap 1361, and an orbiting (e.g., moving) scroll 1362 having a second wrap 1363. In use and operation, a high-pressure gas enters the scroll decompressor 1350 at an entrance chamber 1370. The high-pressure gas causes the orbiting scroll 1362 to orbit. In some embodiments, the orbiting scroll has an involute (e.g., spiral) shape. As the orbiting scroll 1362 orbits, pockets of progressively reduced pressure are created between the first wraps 1361 of the orbiting scroll 1362 and second wraps 1363 of the fixed scroll 1360. The decompressed gas exits the scroll decompressor 1350 at an exit. The high-pressure gas drives the main shaft 1012, 1212 (FIG. 12, FIG. 13) that, in turn, rotates the PM generator 952, 1152 (FIG. 12, FIG. 13). In examples, when the high-pressure gas enters the first wrap 1361, the pockets of pressure have a first stage of pressure such as about 4.5 MPa (650 psi). Progressive orbiting causes the gas to enter subsequent stages of reduced pressure. In other words, pockets receiving the gas become progressively larger (in area) reducing the pressure within the scroll. In some embodiments, the main shaft 1012, 1212 defines a main shaft axis that is offset from the orbiting scroll 1362 (in some examples, 8.2 mm). Explained further, the main shaft 1012, 1212 can include an offset eccentric drive section having a drive axis that is offset relative to the main shaft axis. As a result, the orbiting scroll 1362 is driven about an orbital path when the main shaft is rotated around the main shaft axis. As the scroll decompressor 1350 decompresses, the main shaft turns 360 degrees. However, because there is an offset between the main shaft and the orbiting scroll 1362, the orbiting scroll 1362 orbits around the main shaft 1012, 1212. In some embodiments, the decompressing scroll 1350 facilitates effective force transfer of the gas, through the orbiting scroll 1362 and onto the main shaft 1012. In some embodiments, the scroll decompressors 1350 decompresses at or near a 4:1 ratio. In other words, through one 360-degree rotation of the main shaft 1012, 1212, the entry pressure of the high-pressure gas is four times the exit pressure of the gas.

In some embodiments, the orbiting scroll 1362 of the scroll decompressor 1350 exhibits a distinct shape as compared to an orbiting scroll in a conventional compression scroll. The eccentricity of the shaft is reduced such that a 90-degree force transfer in decompression is optimally transferred from the gas, through the scroll decompressor 1350 and to the main shaft 1012, 1212. In some embodiments, the tolerance between the fixed scroll 1360 and the moving scroll 1362 is less than, for example, 0.01 mm. In some embodiments, reducing the slippage between the fixed scroll 1350 and the orbital scroll 1362 increases the efficiency of the scroll decompressor 1350. As used herein, slippage occurs when pressure is released from the scroll decompressor 1350 without rotating the main shaft. The longer the pressure is held between the first wrap 1361 and the second wrap 1363, the more torque is experienced at the main shaft 1012, 1212. If slippage is occurring, some gas pressure has been decompressed without rotation of the main shaft. In some embodiments, the scroll decompressor 1350 can operate to decompress high-pressure hot gas. In some embodiments, the high-pressure hot gas is cooled during decompression, releasing local relative pockets of pressure change along the scroll. The hot gas decompression cycle disclosed herein can be more sensitive to misalignment and unbalance then a typical compression cycle. In some embodiments, the alignment and balance of the entire drivetrain of the scroll decompressor 1350, facilitates better performance and/or efficiency and better durability of the scroll decompressor 1350 compared to conventional scroll decompressors.

Figure 22:
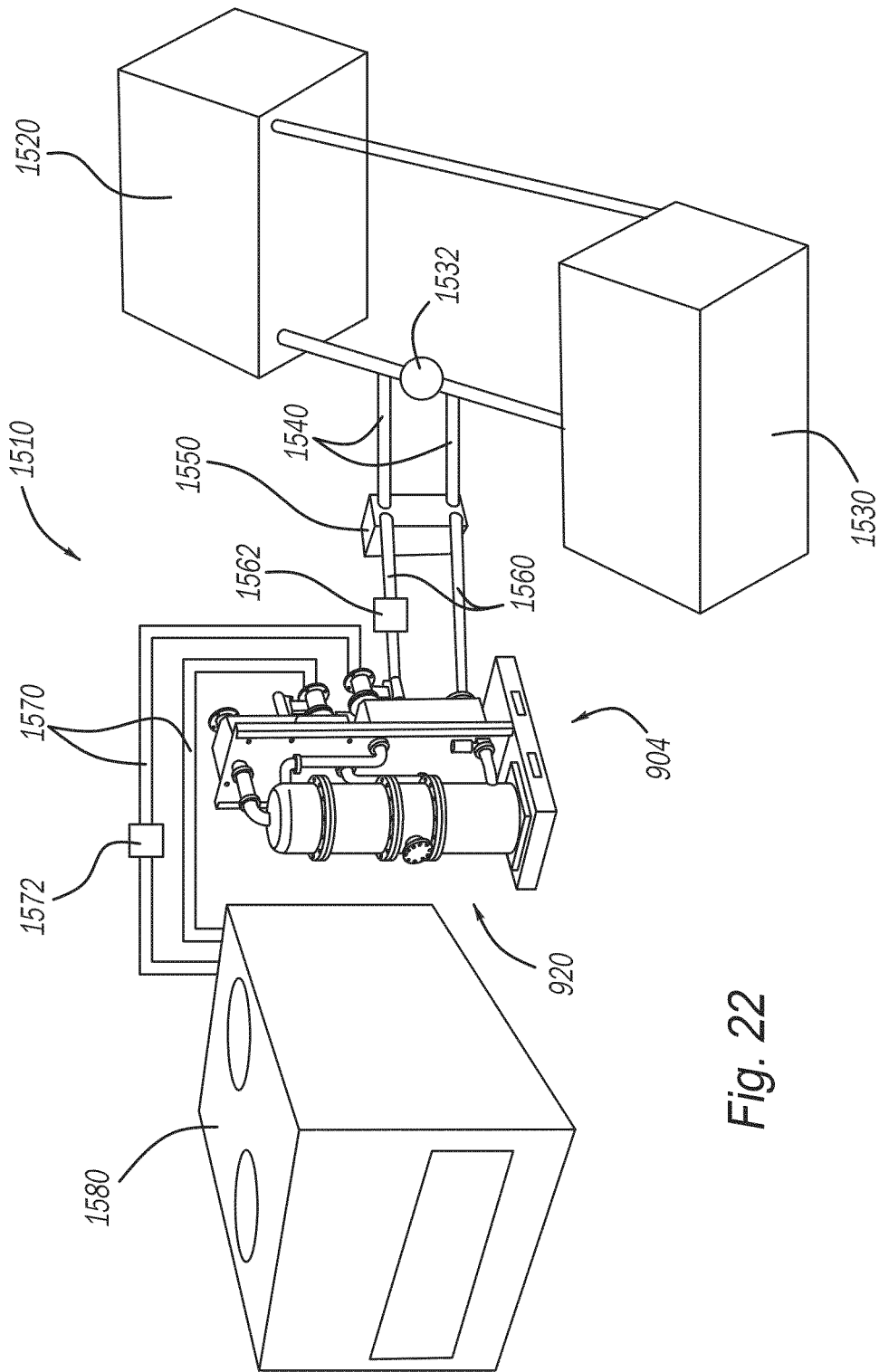
FIG. 22 is a simplified schematic diagram of a system incorporating a decompression heat engine, in accordance with embodiments of the disclosure.

With reference now to FIG. 22, a system 1510 incorporating a heat engine 904 and CPP 920 according to another example will be described. The exemplary system 1510 is constructed to generate electricity and is configured for use with a manufacturing plant. The system 1510 generally includes a transformer 1520 and radiant cooler 1530. A mineral oil loop 1540 fluidly communicates hot mineral oil from the transformer 1520 to a heat exchanger 1550. A full flow valve 1532 can be adjusted for bypassing a desired volume of the mineral oil through the heat exchanger 1550.

A hot water circulation pump 1562 can be configured to circulate hot water through a hot water loop 1560 between the heat exchanger 1550 and the heat engine 904. Pipe or hose suitable to accommodate high temperatures can be used for the hot water loop 1560 such as, but not limited to, DN 65 flexible hose. In examples, the hot water circulation pump 1562 can be a high efficiency 480-volt three-phase variable speed pump that is configured to average approximately 250 liters per minute (LPM). It is contemplated that the full flow valve 1532 can alternatively comprise a three-way valve that selectively bypasses directly to the input of the pump 1562 such as when the heat engine 904 takes over the entire waste heat and cooling of the transformer 1520. In examples, such a three-way valve can include a fail-safe component such as spring-loaded actuated valve member that is configured to automatically return to a normal operating position (without bypass) should any fault happen. Additional or alternative heat can be supplied by a solar thermal assist system, chiller waste heat assist system, a boiler waste heat assist system and thermal storage for high output demand power.

A cold water circulation pump 1572 can be configured to circulate cold water through a cold water loop 1570 between a chiller 1580 and the heat engine 904. Pipe or hose suitable to accommodate low temperatures can be used for the cold water loop 1570 such as, but not limited to, DN 65 flexible hose. In examples, the cold water circulation pump 1572 can be a high efficiency 480 volt three-phase variable speed pump that is configured to average approximately 550 LPM. The exemplary chiller 1580 is a 480 volt, three-phase chiller however chillers having other specifications are contemplated.

During operation of the system 1510, the heat engine 904 receives closed loop hot water by way of the hot water loop 1560 from the heat exchanger 1550 and closed loop cold water by way of the cold water loop 1570 from the chiller 1580. In other examples, cold water can additionally or alternatively be sourced by air cooling units, wet cooling units, boiler cool feed water, building process water, network water, ground water, ground loops, aquafers, rivers, and streams. Using the principles discussed herein, the heat engine 904 generates and outputs electricity. In examples, the heat engine 904 can be configured as a 480 volt, three-phase 100 amp input for synching with the power grid. In one operating example, the heat engine 904 of the system 1510 can provide actual efficiency of 9% with an output of 15 kWe per gang-able module using hot water temperature in of 122° F. In another operating example, the heat engine 904 of the system 1510 can provide actual efficiency of 10% with an output of 30 kWe per gang-able module using hot water temperature in of 167° F.

Turning now to FIGS. 23-26, various cooling configurations suitable for use with transformers are shown. As explained above, heated transformer oil may be used as a fluid heat source for the heat engines described herein. For example, the low-grade fluid heat source 103 (FIG. 1), the hot fluid 528 (FIG. 2), the hot fluid 640 (FIG. 3), or the heated transformed oil may be used as the heat source input for the heat engines. It will be appreciated that sourcing the transformer oil as an input to a heat engine may reduce and/or eliminate the need for cooling systems otherwise integrated into transformer operation.

Figure 23:
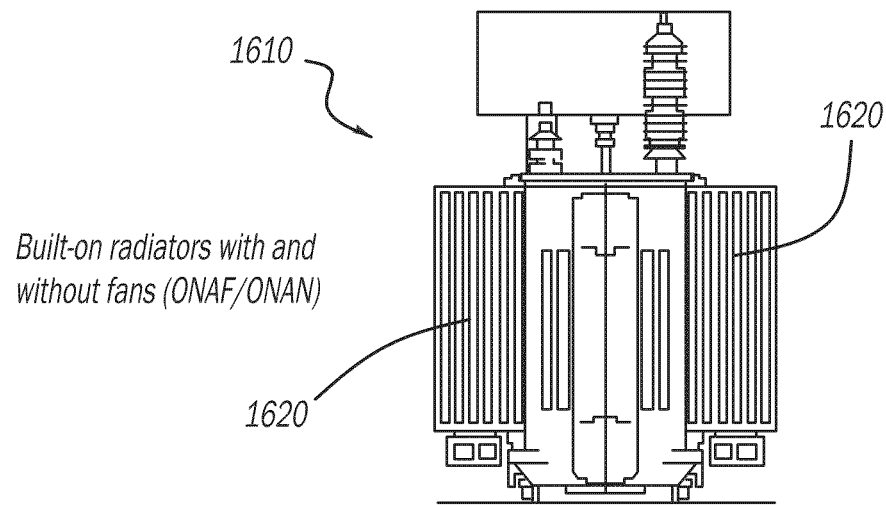
FIG. 23 is a front view of a transformer incorporating built-on radiators according to a first exemplary cooling configuration.
Figure 24:
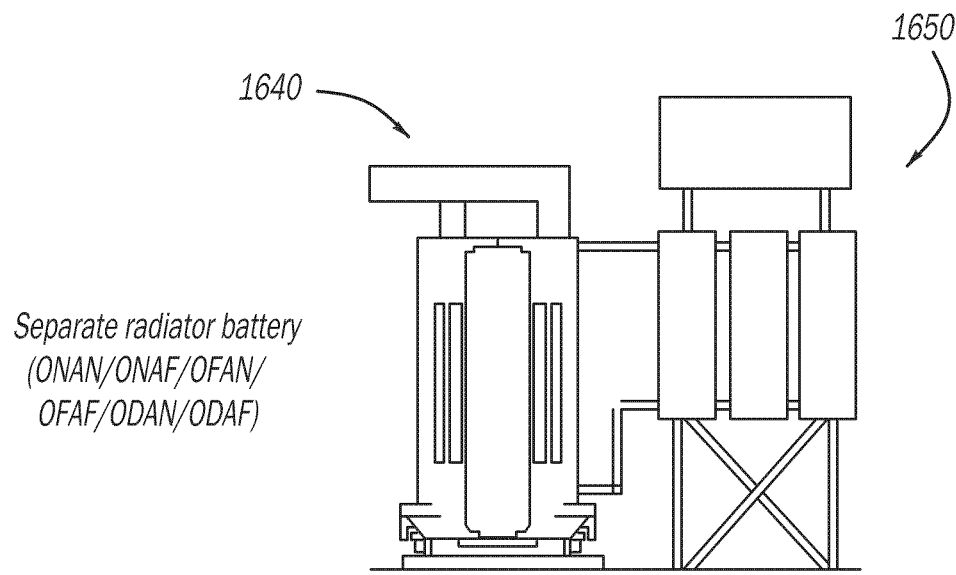
FIG. 24 is a front view of a transformer incorporating a separate radiator battery according to a second exemplary cooling configuration.
Figure 25:
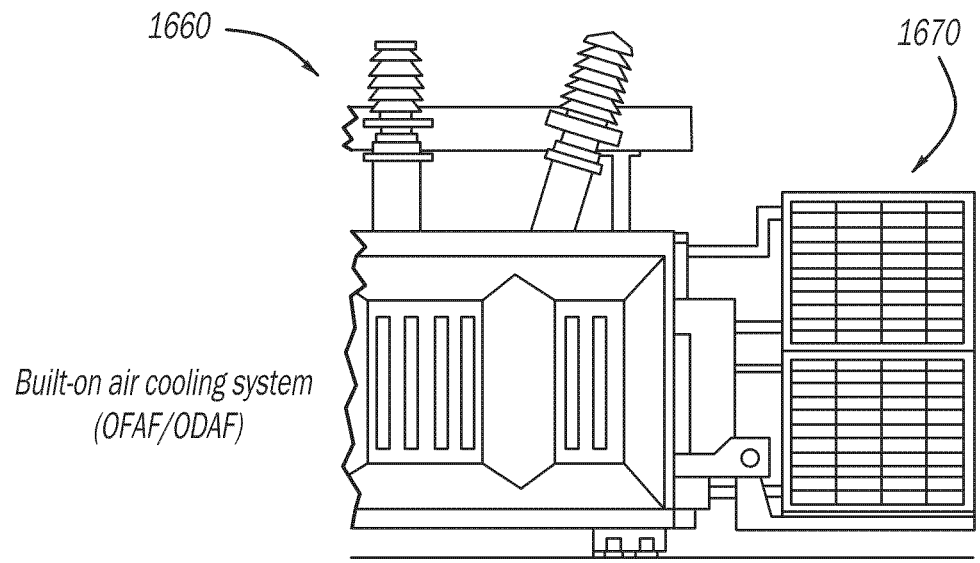
FIG. 25 is a front view of a transformer incorporating a built-on air cooling system according to a third exemplary cooling configuration.
Figure 26:
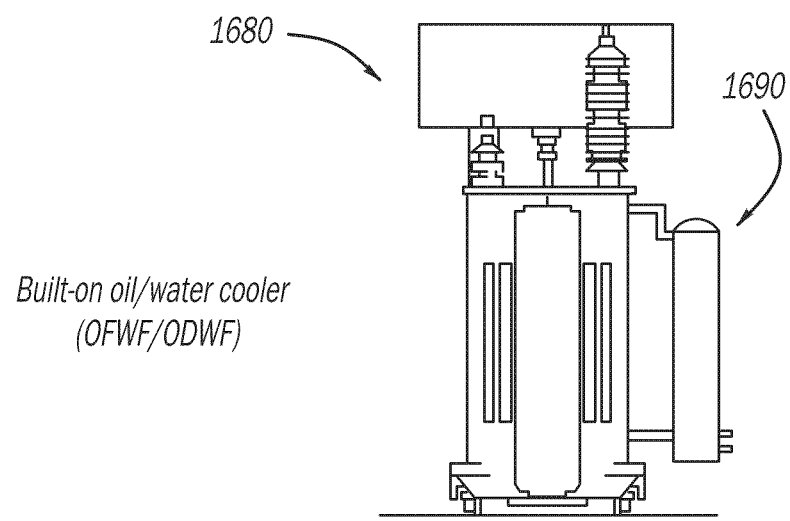
FIG. 26 is a front view of a transformer incorporating a built-on oil/water cooler according to a fourth exemplary cooling configuration.

A transformer 1610 is shown in FIG. 23 having built-on radiators 1620 with and without fans. In examples, the transformer 1610 can be configured as oil natural air forced (ONAF) or oil natural air natural (ONAN). A transformer 1640 is shown in FIG. 24 having a separate radiator battery 1650. In examples, the transformer 1640 can be configured as ONAN, ONAF, oil forced air natural (OFAN), oil forced air forced (OFAF), oil directed air natural (ODAN) or oil directed air forced (ODAF). A transformer 1660 is shown in FIG. 25 having a built-on air cooling system 1670. In examples, the transformer 1660 can be configured as OFAF or ODAF. A transformer 1680 is shown in FIG. 26 having a built-on oil/water cooler 1690. The transformer 1680 can be configured as oil forced water forced (OFWF) or oil directed water forced (ODWF). In examples, reducing the capacity of any of the cooling systems 1629, 1650, 1670 and 1690 can reduce the overall complexity of transformers providing further cost efficiencies.

In some embodiments, a heat engine is configured to operate an organic Rankine cycle, the heat engine comprising an organic refrigerant exhibiting a boiling point below about −35° C.; a closed-loop path for the organic refrigerant, the closed-loop path having both a high-pressure zone and a low-pressure zone. In some embodiments, the high-pressure zone contains a first portion of the organic refrigerant in at least a gaseous phase and the low-pressure zone contains a second portion of the organic refrigerant in at least a liquid phase. The heat engine further includes a positive-displacement decompressor configured to provide a pressure gradient through which the organic refrigerant in the gaseous phase flows continuously from the high-pressure zone to the low-pressure zone; an electrical generator coupled to the positive-displacement decompressor and configured to convert mechanical energy to electrical energy; a positive-displacement hydraulic pump for providing a continuous flow of the organic refrigerant in the liquid phase from the low-pressure zone to the high-pressure zone; and a refrigerant holding tank in the high-pressure zone and in operable communication with the positive-displacement hydraulic pump, a lower portion of the refrigerant holding tank having a larger cross-sectional area than an upper portion thereof. In some embodiments, the heat engine is configured such that the organic refrigerant in the closed-loop path absorbs heat in the high-pressure zone from a heat source having a temperature of less than 82° C. and transfers heat to a heat sink in the low-pressure zone.

In some embodiments, the heat engine further comprises a lubricating oil in the closed-loop path, the lubricating oil within a prime mover shell housing the positive-displacement decompressor.

In some embodiments, the positive-displacement decompressor comprises an orbital scroll.

In some embodiments, the refrigerant holding tank is eccentrically shaped, the refrigerant holding tank configured to hold the refrigerant in a vapor phase at the upper portion.

In some embodiments, the organic refrigerant exhibits a boiling point below −40° C.

In some embodiments, the organic refrigerant exhibits a boiling point below −45° C.

In some embodiments, the heat engine further comprises a vertically oriented refrigerant tank having a downwardly tapering and downwardly decreasing cross-sectional area in the low-pressure zone.

In some embodiments, the high-pressure zone comprises a vertically oriented tubular heat exchanger having: a fluid entrance configured to receive fluid from the heat source in an upper portion thereof; a fluid exit configured to deliver the fluid in a lower portion thereof; a refrigerant entrance for the organic refrigerant in the gaseous phase in the lower portion thereof; and a refrigerant exit for the organic refrigerant in the gaseous phase in the upper portion thereof. In some embodiments, the refrigerant exit is configured to deliver organic refrigerant in the gaseous phase to an input of the positive-displacement decompressor.

In some embodiments, the vertically oriented tubular heat exchanger is configured to maintain a temperature gradient at least partially based on gravity.

In some embodiments, the closed-loop path further comprises at least two oil separators connected in series.

In some embodiments, the low-pressure zone of the closed-loop path further comprises at least one refrigeration coil configured to receive cool, pressurized organic refrigerant from the high-pressure zone.

In some embodiments, the methods and systems further include generating electricity using an organic Rankine cycle including circulating an organic refrigerant in a closed-loop path, the organic refrigerant exhibiting a boiling point below about −35° C., the closed-loop path having both a high-pressure zone and a low-pressure zone. In embodiments, the high-pressure zone contains a first portion of the organic refrigerant in at least a gaseous phase. In embodiments, the low-pressure zone contains a second portion of the organic refrigerant in at least a liquid phase. In some embodiments, the methods and systems further include operating a positive-displacement decompressor to continuously flow the organic refrigerant in the gaseous phase from the high-pressure zone to the low-pressure zone; and operating an electrical generator to convert mechanical energy to electrical energy. In some embodiments, the electrical generator is coupled to the positive-displacement decompressor. In some embodiments, the methods and systems further include operating a positive-displacement hydraulic pump to provide continuous flow of the organic refrigerant in the liquid phase from the low-pressure zone to the high-pressure zone, the organic refrigerant flowing through a refrigerant holding tank in the high-pressure zone between the positive-displacement hydraulic pump and the positive-displacement decompressor. In some embodiments, a lower portion of the refrigerant holding tank has a larger cross-sectional area than an upper portion thereof. In some embodiments, the methods and systems further include absorbing heat from a heat source to the organic refrigerant in the high-pressure zone of the closed-loop path, the heat source having a temperature of less than 82° C.; and transferring heat from the organic refrigerant to a heat sink in a low-pressure zone of the closed-loop path.

In some embodiments, the methods and systems further include circulating a lubricating oil in the closed-loop path.

In some embodiments, the methods and systems further include heating at least a portion of the lubricating oil in a reservoir.

In some embodiments, the methods and systems further include separating at least a portion of the lubricating oil from a gaseous phase of the organic refrigerant.

In some embodiments, the absorbing heat from a heat source to the organic refrigerant comprises transferring heat from water to the organic refrigerant in a vertically oriented heat exchanger.

In some embodiments, the methods and systems further include causing a temperature gradient assisted by gravity in the vertically oriented heat exchanger.

In some embodiments, the methods and systems further include mixing a lubricating oil with a first portion of a refrigerant in a bypass zone of a heat engine to form a mixture, the first portion of the refrigerant in a liquid phase; heating the mixture of the lubricating oil and the first portion of the refrigerant in a high-pressure zone of the heat engine to form a heated mixture. In some embodiments, the at least a portion of the first portion of the refrigerant in the heated mixture is in a gaseous phase. In some embodiments, the refrigerant exhibits a boiling point below about −35° C. The method includes mixing the heated mixture with a second portion of the refrigerant in a superheated phase; atomizing the lubricating oil in an atomizer comprising a mixing media to disperse the lubricating oil within the refrigerant; and cooling the refrigerant in a low-pressure zone of the heat engine through at least one heat sink. In some embodiments, the high-pressure zone, the low-pressure zone, and the bypass zone form a closed-loop path for the refrigerant.

In some embodiments, atomizing the lubricating oil comprises passing the lubricating oil and the refrigerant through a metal mesh.

In some embodiments, heating the mixture of the lubricating oil and the first portion of the refrigerant to form a heated mixture comprises transferring heat to the mixture from at least one source selected from the group consisting of a waste heat source, an exhaust gas, a compressor intercooler, biomass, a geothermal heat source, and a solar array.

In some embodiments, the methods and systems further include passing the atomized lubricating oil and the refrigerant through a decompressor operatively associated with an electrical generator to decrease a pressure of the refrigerant and generate an electrical current; separating at least a portion of the lubricating oil from the refrigerant; and condensing at least a portion of the refrigerant to re-form the first portion of the refrigerant in the liquid phase.

In some embodiments, the at least one heat sink comprises a first heat sink and a second heat sink. In some embodiments, condensing at least a portion of the refrigerant to form the first portion of the refrigerant comprises transferring heat from the refrigerant to each of the first heat sink and the second heat sink.

In some embodiments, heating the mixture of the lubricating oil and the first portion of the refrigerant to form a heated mixture comprises increasing a specific volume of the mixture.

In some embodiments, atomizing of the lubricating oil comprises maintaining the lubricating oil and the refrigerant at constant pressure.

In some embodiments, the methods and systems further include mixing an additive with the mixture, the additive exhibiting a higher lubricity than the lubricating oil.

In some embodiments, mixing a lubricating oil with a first portion of a refrigerant to form a mixture comprises mixing the first portion of the refrigerant in a liquid phase with the lubricating oil downstream of a pump circulating the first portion of the refrigerant.

In some embodiments, the methods and systems further include a high-pressure zone configured to transfer heat from at least one heat source to a refrigerant and configured to contain a first portion of the refrigerant in a gaseous phase, the refrigerant exhibiting a boiling point below about −35° C.; a low-pressure zone configured to transfer heat from the refrigerant to at least one heat sink and configured to contain a second portion of the refrigerant in a liquid phase; a bypass zone configured to mix a third portion of the refrigerant with a lubricating oil, the third portion of the refrigerant and the lubricating oil in a liquid phase; and an atomizer comprising a mixing media configured to atomize the lubricating oil and disperse the lubricating oil within the first and third portions of the refrigerant. In embodiments, a closed-loop path for the refrigerant comprises the high-pressure zone, the low-pressure zone, and the bypass zone.

In some embodiments, the heat engine is configured to circulate the refrigerant in a Rankine cycle.

In some embodiments, the methods and systems further include a mixing device configured to mix the lubricating oil with the third portion of the refrigerant in the liquid phase.

In some embodiments, the high-pressure zone comprises at least one wall of the at least one heat source configured to transfer heat from the at least one heat source to the first portion of the refrigerant in the liquid phase. In some embodiments, the at least one heat source is configured to evaporate the first portion of the refrigerant.

In some embodiments, the methods and systems further include a positive displacement decompressor configured to provide a pressure gradient through which the refrigerant in the gaseous phase flows continuously from the high-pressure zone to the low-pressure zone, the positive displacement decompressor configured to maintain a pressure differential between the high-pressure zone and the low-pressure zone of between 20 bar and 42 bar, the positive displacement decompressor configured to extract mechanical energy based on the pressure gradient.

In some embodiments, the methods and systems further include an electrical generator coupled to the positive displacement decompressor and configured to convert the extracted mechanical energy to electrical energy.

In some embodiments, the methods and systems further include a positive displacement hydraulic pump for providing a continuous flow of the refrigerant in the liquid phase from the low-pressure zone to the high-pressure zone.

In some embodiments, the closed-loop path further comprises at least one heat-transfer conduit external to the heat engine.

In some embodiments, the methods and systems further include a heat engine employing an organic Rankine cycle including an organic refrigerant exhibiting a boiling point below about −35° C.; a hot water heat source having a temperature of less than 82° C.; a heat sink; a sealed, closed-loop path for the organic refrigerant, the sealed, closed-loop path having both a high-pressure zone configured to absorb heat from the hot water heat source, and which contains a first portion of the organic refrigerant in at least a gaseous phase, and a low-pressure zone which transfers configured to transfer heat to the heat sink, and which contains a second portion of the organic refrigerant in at least a liquid phase; a positive-displacement decompressor configured to provide a pressure gradient through which the organic refrigerant in the gaseous phase is configured to flow continuously from the high-pressure zone to the low-pressure zone, the positive-displacement decompressor maintaining a pressure differential between the high-pressure zone and the low-pressure zone of between about 2,000 kPa and about 4,200 kPa, the positive-displacement decompressor extracting mechanical energy based on the pressure gradient; an electrical generator coupled to the positive-displacement decompressor configured to convert extracted mechanical energy to electrical energy; and a positive displacement hydraulic pump for providing continuous flow of the organic refrigerant in the liquid phase from the low-pressure zone to the high-pressure zone.

In some embodiments, the methods and systems further include a lubricating oil that is generally immiscible with the organic refrigerant. In embodiments, the lubricating oil is configured to circulate through the sealed, closed-loop path and perform sealing lubrication functions in the positive-displacement decompressor.

In some embodiments, the positive-displacement decompressor is selected from the group consisting of orbital-scroll, Roots, starrotor, and dual-lobe pumps.

In some embodiments, the methods and systems further include an eccentrically shaped refrigerant holding tank configured to serve as a pulsation dampener to mitigate the effect of fluid hammer as the positive-displacement hydraulic pump transfers the organic refrigerant from the low-pressure zone to the high-pressure zone.

In some embodiments, the organic refrigerant exhibits a boiling point below −40° C.

In some embodiments, the organic refrigerant exhibits a boiling point below −45° C.

In some embodiments, the methods and systems further include a vertically oriented refrigerant tank of downwardly tapering and downwardly decreasing cross-sectional area. In some embodiments, the vertically oriented refrigerant tank is configured to employ gravity to ensure maximum density of the organic refrigerant in the liquid phase as the organic refrigerant enters the positive-displacement hydraulic pump.

In some embodiments, the high-pressure zone comprises a vertically oriented tubular heat exchanger having an entrance for water from the hot water heat source in an upper portion thereof and an exit for the water from the hot water heat source in a lower portion thereof, an entrance for the organic refrigerant in the gaseous phase in the lower portion thereof and an exit for the organic refrigerant in the gaseous phase in the upper portion thereof. In some embodiments, the organic refrigerant in the gaseous phase exiting the vertically oriented tubular heat exchanger is configured to directly enter an input of the positive-displacement decompressor, the vertically oriented tubular heat exchanger configured to create a temperature gradient assisted by gravity.

In some embodiments, the methods and systems further include at least two oil separators positioned in series to extract oil from the organic refrigerant in the gaseous phase.

In some embodiments, the methods and systems further include at least one refrigeration coil within the low-pressure zone, the at least one refrigeration coil configured to receive cool, pressurized organic refrigerant from the high-pressure zone before the organic refrigerant is heated from the hot water heat source.

In some embodiments, methods and systems described herein include a heat engine configured to receive a high-pressure fluid and release a low-pressure fluid. The heat engine includes a main housing having an expansion tank and a generator housing; a scroll decompressor disposed in the expansion tank, the scroll decompressor configured to progressively decompress the high-pressure fluid to the low-pressure fluid while rotating a main shaft; a generator disposed in the generator housing, the generator being driven by the main shaft; and a coupling disposed on the main housing that is configured to couple with a power receiving device, the coupling transferring rotational motion of the main shaft to a rotational input to the power receiving device.

In some embodiments, the main housing further comprises a power take-off (PTO) housing, the PTO housing having gearing that converts rotation of the main shaft into an input of the coupling.

In some embodiments, the coupling comprises a magnetic coupling.

In some embodiments, the power receiving device comprises one of a power generator, an air compressor, a heat pump, a gear driven device, an electric vehicle and a mechanical pump.

In some embodiments, the main housing further comprises a refrigerant tank that houses a refrigerant pump that pumps a refrigerant.

In some embodiments, the refrigerant pump is driven by the main shaft.

In some embodiments, the refrigerant comprises one of R 744 and carbon dioxide.

In some embodiments, the system includes an evaporator. In some embodiments, high-pressure liquid exits the refrigerant tank to the evaporator through a high-pressure liquid pipe.

In some embodiments, the system includes a condenser. In some embodiments, low-pressure liquid is returned to the refrigerant tank from the condenser.

In some embodiments, the low-pressure gas exits the scroll decompressor through a low-pressure gas return and is delivered to the condenser.

In some embodiments, the low-pressure gas exits the scroll decompressor and is vented to the atmosphere.

In some embodiments, the system includes the low-pressure gas exits the scroll decompressor and is directed to a supplemental closed loop system.

In some embodiments, the system includes the generator that comprises a permanent magnet (PM) with an oil-cooled jacket.

In some embodiments, the system includes the high-pressure liquid that comprises natural gas.

In some embodiments, the system includes the high-pressure liquid comprises one of propane, carbon dioxide, compressed air, nitrogen and high-pressure process gas.

In some embodiments, the high-pressure liquid comprises transformer oil.

In some embodiments, the scroll decompressor is configured to progressively decompress the high-pressure fluid to the low-pressure fluid at a ratio of 3.5:1.

In some embodiments, the scroll decompressor is configured to progressively decompress the high-pressure fluid to the low-pressure fluid at a ratio of 4:1.

In some embodiments, the scroll decompressor is configured to decompress the high-pressure fluid by about 3.1 MPa.

In some embodiments, the system includes the generator configured to provide a net output of between 30 kWe to 40 kWe.

In some embodiments, the system includes the high-pressure liquid has a hot temperature range of between about 32.2° C. (about 90° F.) to about 55.0° C. (about 131° F.).

In some embodiments, the high-pressure liquid has a cold temperature range of between about (1.2° C. (about 34° F.) to about 23.9° C. (about 75° F.).

In some embodiments, the system includes a stand including a base and a vertical support wall, the stand providing support for the heat engine.

In some embodiments, the heat engine is compact such that the stand and heat engine collectively occupy about 114.3 cm by about 83.8 cm by about 165.1 cm of space.

Example 1: Mathematical Modeled Heat Engine

A heat engine similar to the heat engine 600 shown in FIG. 3 is expected to produce 9.88 kW of electricity from a hot water source at 69.0° C., with a cold water source at 17.0° C., using R-410A refrigerant. The expansion device 608 is an orbital scroll, a commercially available scroll compressor designed for air conditioning, model SH 380, available from Danfoss A/S, of Nordborg, Denmark, operating at 1517 RPM. The compressor is operated in the reverse orientation of its intended use-thus it operates as an expander rather than as a compressor.

Calculated pressures and temperatures for the refrigerant and the hot and cold water supplies are shown in Table 1. In Table 1, the evaporator corresponds to the heat source 604 of FIG. 3; the condenser corresponds to the condenser 610; the circulation pump corresponds to the circulation pump 616; the superheater corresponds to the superheater 606; and the scroll corresponds to the expansion device 608 (FIG. 4).

TABLE 1

Operating Pressures and Temperatures

|  | Temperature (° C.) | Pressure (bar) |
|---|---|---|
| Evaporator hot water, inlet | 69.0 | |
| Evaporator hot water, outlet | 63.0 | |
| Condenser cooling water, inlet | 17.0 | |
| Condenser cooling water, outlet | 21.0 | |
| Refrigerant at circulation pump outlet | 23.0 | 36.0 |
| Refrigerant at evaporator inlet | 23.0 | 36.0 |

TABLE 1-continued

Operating Pressures and Temperatures

| | Temperature (° C.) | Pressure (bar) |
|---|---|---|
| Refrigerant at superheater outlet | 67.0 | 36.0 |
| Refrigerant at scroll inlet | 67.0 | 36.0 |
| Refrigerant at scroll outlet | 21.5 | 15.6 |
| Refrigerant at condenser inlet | 21.5 | 15.0 |
| Refrigerant at condenser outlet | 21.0 | 15.0 |
| Refrigerant at circulation pump inlet | 21.0 | 15.0 |

Additional operating parameters of the heat engine are shown in Table 2.

TABLE 2

Other Operating Parameters

| | |
|---|---|
| Refrigerant mass flow | 304.5 g/s |
| Hot water flow | 282 l/min |
| Cold water flow | 482 l/min |
| Heat transfer from hot water to refrigerant | 113.4 kW |
| Heat transfer from refrigerant to cold water | 112.0 kW |
| Carnot efficiency (theoretical maximum) | 15.20% |
| Maximum work output | 17.23 kW |
| Gross work output from scroll | 11.14 kW |
| Gross efficiency | 9.83% |
| Gross percentage of Carnot efficiency | 64.7% |
| Power consumed by pumps (oil pump, refrigerant pump, and water pumps) | 1.27 kW |
| Net power produced | 9.88 kW |
| Net efficiency | 8.71% |
| Net percentage of Carnot efficiency | 57.3% |

Example 2: Heat Engine Operating at 1,500 RPM

A heat engine similar to the heat engine 600 shown in FIG. 3 was operated to produce about 11 kW of electricity from a hot water source at about 68.9° C., with a cold water source at about 16.3° C., using R-410A refrigerant. The expansion device 608 was an orbital scroll, a commercially available scroll compressor designed for air conditioning, model SH 380, from Danfoss A/S, operating at about 1,500 RPM. Selected operating parameters as observed are shown in Table 3.

TABLE 3

Observed Operating Parameters

| | |
|---|---|
| Evaporator hot water, inlet | 68.9° C. |
| Evaporator hot water, outlet | 61.8° C. |
| Hot water flow | 260 l/min |
| Condenser cooling water, inlet | 16.3° C. |
| Condenser cooling water, outlet | 12.7° C. |
| Cold water flow | 485 l/min |
| Carnot efficiency (theoretical maximum) | 15.3% |
| Net power produced | 11 kW |
| Net efficiency | 8.8% |
| Net percentage of Carnot efficiency | 57.5% |

Example 3: Heat Engine Operating at 1121 RPM

A heat engine similar to the heat engine 600 shown in FIG. 3 was operated to produce about 6 kW of electricity from a hot water source at about 58.1° C., with a cold water source at about 15.5° C., using R-410A refrigerant. The expansion device 608 was an orbital scroll, a commercially available scroll compressor designed for air conditioning, model SH 380, available from Danfoss A/S, operating at about 1,121 RPM. Selected operating parameters as observed are shown in Table 4.

TABLE 4

Observed Operating Parameters

| | |
|---|---|
| Evaporator hot water, inlet | 58.1° C. |
| Evaporator hot water, outlet | 52.2° C. |
| Hot water flow | 191 l/min |
| Condenser cooling water, inlet | 15.5° C. |
| Condenser cooling water, outlet | 12.4° C. |
| Cold water flow | 376 l/min |
| Carnot efficiency (theoretical maximum) | 12.9% |
| Net power produced | 6 kW |
| Net efficiency | 7.1% |
| Net percentage of Carnot efficiency | 55.0% |

Non-limiting exemplary embodiments of the disclosure include:

Embodiment 1: A heat engine configured to receive a high-pressure fluid and release a low-pressure fluid, the heat engine comprising: a main housing having an expansion tank and a generator housing; a scroll decompressor disposed in the expansion tank, the scroll decompressor configured to progressively decompress the high-pressure fluid to the low-pressure fluid while rotating a main shaft; a generator disposed in the generator housing, the generator being driven by the main shaft; and a coupling disposed on the main housing configured to couple with a power receiving device, the coupling configured to transfer rotational motion of the generator to a rotational input of the power receiving device.

Embodiment 2: The heat engine of embodiment 1, wherein the main housing further comprises a power take-off (PTO) housing, the PTO housing comprising gears to convert rotation of the main shaft to an input of the coupling.

Embodiment 3: The heat engine of embodiment 2, wherein the coupling comprises a magnetic coupling.

Embodiment 4: The heat engine of any one of embodiments 1 through 3, wherein the power receiving device comprises one of a power generator, an air compressor, a heat pump, a gear driven device, an electric vehicle and a mechanical pump.

Embodiment 5: The heat engine of any one of embodiments 1 through 4, wherein the main housing further comprises a refrigerant tank that houses a refrigerant pump configured to pump a refrigerant.

Embodiment 6: The heat engine of embodiment 5, wherein the refrigerant pump is configured to be driven by the main shaft.

Embodiment 7: The heat engine of any one of embodiments 5 or 6, wherein the refrigerant comprises R 744.

Embodiment 8: The heat engine of any one of embodiments 5 through 7, further comprising an evaporator coupled to the refrigerant tank through a high-pressure liquid pipe.

Embodiment 9: The heat engine of embodiment 8, further comprising a condenser coupled to the refrigerant tank and configured to provide a low-pressure liquid to the refrigerant tank.

Embodiment 10: The heat engine of embodiment 9, further comprising a low-pressure gas return configured provide a low-pressure gas from the scroll decompressor to the condenser.

Embodiment 11: The heat engine of any one of embodiments 1 through 10, wherein the scroll decompressor comprises an outlet open to the atmosphere.

Embodiment 12: The heat engine of any one of embodiments 1 through 11, wherein the scroll decompressor comprises an outlet coupled to a closed loop system.

Embodiment 13: The heat engine of any one of embodiments 1 through 12, wherein the generator comprises a permanent magnet (PM) with an oil cooled jacket.

Embodiment 14: The heat engine of any one of embodiments 1 through 13, wherein the high-pressure fluid comprises natural gas.

Embodiment 15: The heat engine of any one of embodiments 1 through 14, wherein the high-pressure fluid comprises one of propane, carbon dioxide, compressed air, nitrogen and a high-pressure process gas.

Embodiment 16: The heat engine of any one of embodiments 1 through 15, wherein the high-pressure fluid comprises transformer oil.

Embodiment 17: The heat engine of any one of embodiments 1 through 16, wherein the scroll decompressor is configured to progressively decompress the high-pressure fluid to the low-pressure fluid at a ratio of 3.5:1.

Embodiment 18: The heat engine of any one of embodiments 1 through 17, wherein the scroll decompressor is configured to progressively decompress the high-pressure fluid to the low-pressure fluid at a ratio of 4:1.

Embodiment 19: The heat engine of any one of embodiments 1 through 18, wherein the scroll decompressor is configured to decompress the high-pressure fluid by about 3.10 MPa.

Embodiment 20: The heat engine of any one of embodiments 1 through 19, wherein the generator is configured to provide a net output of between 30 kWe to 40 kWe.

Embodiment 21: The heat engine of any one of embodiments 1 through 20, wherein the high-pressure fluid has a hot temperature range of between about 90° F. and about 131° F.

Embodiment 22: The heat engine of any one of embodiments 1 through 21 wherein the high-pressure fluid has a cold temperature range of between about 34° F. and about 75° F.

Embodiment 23: The heat engine of any one of embodiments 1 through 22, further comprising a stand including a base and a vertical support wall, the stand configured to support for the heat engine.

Embodiment 24: The heat engine of embodiment 23, wherein the stand and the heat engine collectively occupy a volume of about 114.3 cm by about 83.8 cm by about 165.1 cm.

The background description is presented simply for context, and is not necessarily well-understood, routine, or conventional. Further, the background description is not an admission of what does or does not qualify as prior art.

Physical (such as spatial and/or electrical) and functional relationships between elements (for example, between modules, circuit elements, semiconductor layers, etc.) are described using various terms. Unless explicitly described as being "direct," when a relationship between first and second elements is described, that relationship encompasses both (i) a direct relationship where no other intervening elements are present between the first and second elements and (ii) an indirect relationship where one or more intervening elements are present between the first and second elements. Example relationship terms include "adjoining," "transmitting," "receiving," "connected," "engaged," "coupled," "adjacent," "next to," "on top of," "above," "below," "abutting," and "disposed."

The detailed description includes specific examples for illustration only, and not to limit the disclosure or its applicability. The examples are not intended to be an exhaustive list, but instead simply demonstrate possession by the inventors of the full scope of the currently presented and envisioned future claims. Variations, combinations, and equivalents of the examples are within the scope of the disclosure. No language in the specification should be construed as indicating that any non-claimed element is essential or critical to the practice of the disclosure.

The term "exemplary" simply means "example" and does not indicate a best or preferred example. The term "set" does not necessarily exclude the empty set—in other words, in some circumstances a "set" may have zero elements. The term "non-empty set" may be used to indicate exclusion of the empty set—that is, a non-empty set must have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

The phrase "at least one of A, B, and C" should be construed to mean a logical (A OR B OR C), using a non-exclusive logical OR, and should not be construed to mean "at least one of A, at least one of B, and at least one of C." The use of the terms "a," "an," "the," and similar referents in the context of describing the disclosure and claims encompasses both the singular and the plural, unless contradicted explicitly or by context. Unless otherwise specified, the terms "comprising," "having," "with," "including," and "containing," and their variants, are open-ended terms, meaning "including, but not limited to."

Each publication referenced in this disclosure, including foreign and domestic patent applications and patents, is hereby incorporated by reference in its entirety.

Although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of multiple embodiments remain within the scope of this disclosure.

One or more elements (for example, steps within a method, instructions, actions, or operations) may be executed in a different order (and/or concurrently) without altering the principles of the present disclosure. Unless technically infeasible, elements described as being in series may be implemented partially or fully in parallel. Similarly, unless technically infeasible, elements described as being in parallel may be implemented partially or fully in series.

While the disclosure describes structures corresponding to claimed elements, those elements do not necessarily invoke a means plus function interpretation unless they explicitly use the signifier "means for." Unless otherwise indicated, recitations of ranges of values are merely intended to serve as a shorthand way of referring individually to each separate value falling within the range, and each separate value is hereby incorporated into the specification as if it were individually recited.

While the drawings divide elements of the disclosure into different functional blocks or action blocks, these divisions are for illustration only. According to the principles of the present disclosure, functionality can be combined in other ways such that some or all functionality from multiple separately depicted blocks can be implemented in a single functional block; similarly, functionality depicted in a single block may be separated into multiple blocks. Unless explicitly stated as mutually exclusive, features depicted in different drawings can be combined consistent with the principles of the present disclosure.

In the drawings, reference numbers may be reused to identify identical elements or may simply identify elements that implement similar functionality. Numbering or other labeling of instructions or method steps is done for convenient reference, not to indicate a fixed order. In the drawings, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. As just one example, for information sent from element A to element B, element B may send requests and/or acknowledgements to element A.

A special-purpose system includes hardware and/or software and may be described in terms of an apparatus, a method, or a computer-readable medium. In various embodiments, functionality may be apportioned differently between software and hardware. For example, some functionality may be implemented by hardware in one embodiment and by software in another embodiment. Further, software may be encoded by hardware structures, and hardware may be defined by software, such as in software-defined networking or software-defined radio.

In this application, including the claims, the term module refers to a special-purpose system. The module may be implemented by one or more special-purpose systems. The one or more special-purpose systems may also implement some or all of the other modules. In this application, including the claims, the term module may be replaced with the terms "controller" or "circuit." In this application, including the claims, the term platform refers to one or more modules that offer a set of functions. In this application, including the claims, the term system may be used interchangeably with module or with the term special-purpose system.

The special-purpose system may be directed or controlled by an operator. The special-purpose system may be hosted by one or more of assets owned by the operator, assets leased by the operator, and third-party assets. The assets may be referred to as a private, community, or hybrid cloud computing network or cloud computing environment. For example, the special-purpose system may be partially or fully hosted by a third party offering software as a service (SaaS), platform as a service (PaaS), and/or infrastructure as a service (IaaS). The special-purpose system may be implemented using agile development and operations (DevOps) principles. In embodiments, some or all of the special-purpose system may be implemented in a multiple-environment architecture. For example, the multiple environments may include one or more production environments, one or more integration environments, one or more development environments, etc.

A special-purpose system may be partially or fully implemented using or by a mobile device. Examples of mobile devices include navigation devices, cell phones, smart phones, mobile phones, mobile personal digital assistants, palmtops, netbooks, pagers, electronic book readers, tablets, music players, etc. A special-purpose system may be partially or fully implemented using or by a network device. Examples of network devices include switches, routers, firewalls, gateways, hubs, base stations, access points, repeaters, head-ends, user equipment, cell sites, antennas, towers, etc.

A special-purpose system may be partially or fully implemented using a computer having a variety of form factors and other characteristics. For example, the computer may be characterized as a personal computer, as a server, etc. The computer may be portable, as in the case of a laptop, netbook, etc. The computer may or may not have any output device, such as a monitor, line printer, liquid crystal display (LCD), light emitting diodes (LEDs), etc. The computer may or may not have any input device, such as a keyboard, mouse, touchpad, trackpad, computer vision system, barcode scanner, button array, etc. The computer may run a general-purpose operating system, such as the WINDOWS operating system from Microsoft Corporation, the MACOS operating system from Apple, Inc., or a variant of the LINUX operating system. Examples of servers include a file server, print server, domain server, internet server, intranet server, cloud server, infrastructure-as-a-service server, platform-as-a-service server, web server, secondary server, host server, distributed server, failover server, and backup server.

The term hardware encompasses components such as processing hardware, storage hardware, networking hardware, and other general-purpose and special-purpose components. Note that these are not mutually exclusive categories. For example, processing hardware may integrate storage hardware and vice versa.

Examples of a component are integrated circuits (ICs), application specific integrated circuit (ASICs), digital circuit elements, analog circuit elements, combinational logic circuits, gate arrays such as field programmable gate arrays (FPGAs), digital signal processors (DSPs), complex programmable logic devices (CPLDs), etc.

Multiple components of the hardware may be integrated, such as on a single die, in a single package, or on a single printed circuit board or logic board. For example, multiple components of the hardware may be implemented as a system-on-chip. A component, or a set of integrated components, may be referred to as a chip, chipset, chiplet, or chip stack. Examples of a system-on-chip include a radio frequency (RF) system-on-chip, an artificial intelligence (AI) system-on-chip, a video processing system-on-chip, an organ-on-chip, a quantum algorithm system-on-chip, etc.

The hardware may integrate and/or receive signals from sensors. The sensors may allow observation and measurement of conditions including temperature, pressure, wear, light, humidity, deformation, expansion, contraction, deflection, bending, stress, strain, load-bearing, shrinkage, power, energy, mass, location, temperature, humidity, pressure, viscosity, liquid flow, chemical/gas presence, sound, and air quality. A sensor may include image and/or video capture in visible and/or non-visible (such as thermal) wavelengths, such as a charge-coupled device (CCD) or complementary metal-oxide semiconductor (CMOS) sensor.

Examples of processing hardware include a central processing unit (CPU), a graphics processing unit (GPU), an approximate computing processor, a quantum computing processor, a parallel computing processor, a neural network processor, a signal processor, a digital processor, a data processor, an embedded processor, a microprocessor, and a co-processor. The co-processor may provide additional processing functions and/or optimizations, such as for speed or power consumption. Examples of a co-processor include a math co-processor, a graphics co-processor, a communication co-processor, a video co-processor, and an artificial intelligence (AI) co-processor.

The processor may enable execution of multiple threads. These multiple threads may correspond to different programs. In various embodiments, a single program may be implemented as multiple threads by the programmer or may be decomposed into multiple threads by the processing hardware. The threads may be executed simultaneously to enhance the performance of the processor and to facilitate simultaneous operations of the application. A processor may be implemented as a packaged semiconductor die. The die includes one or more processing cores and may include additional functional blocks, such as cache. In various embodiments, the processor may be implemented by multiple dies, which may be combined in a single package or packaged separately.

The networking hardware may include one or more interface circuits. In some examples, the interface circuit(s) may implement wired or wireless interfaces that connect, directly or indirectly, to one or more networks. Examples of networks include a cellular network, a local area network (LAN), a wireless personal area network (WPAN), a metropolitan area network (MAN), and/or a wide area network (WAN). The networks may include one or more of point-to-point and mesh technologies. Data transmitted or received by the networking components may traverse the same or different networks. Networks may be connected to each other over a WAN or point-to-point leased lines using technologies such as Multiprotocol Label Switching (MPLS) and virtual private networks (VPNs).

Examples of cellular networks include GSM, GPRS, 3G, 4G, 5G, LTE, and EVDO. The cellular network may be implemented using frequency division multiple access (FDMA) network or code division multiple access (CDMA) network. Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN include IEEE Standard 802.15.4, including the ZIGBEE standard from the ZigBee Alliance. Further examples of a WPAN include the BLUETOOTH wireless networking standard, including Core Specification versions 3.0, 4.0, 4.1, 4.2, 5.0, and 5.1 from the Bluetooth Special Interest Group (SIG). A WAN may also be referred to as a distributed communications system (DCS). One example of a WAN is the internet.

Storage hardware is or includes a computer-readable medium. The term computer-readable medium, as used in this disclosure, encompasses both nonvolatile storage and volatile storage, such as dynamic random-access memory (DRAM). The term computer-readable medium only excludes transitory electrical or electromagnetic signals propagating through a medium (such as on a carrier wave). A computer-readable medium in this disclosure is therefore non-transitory, and may also be considered to be tangible.

Examples of storage implemented by the storage hardware include a database (such as a relational database or a NoSQL database), a data store, a data lake, a column store, and a data warehouse. Examples of storage hardware include nonvolatile memory devices, volatile memory devices, magnetic storage media, a storage area network (SAN), network-attached storage (NAS), optical storage media, printed media (such as bar codes and magnetic ink), and paper media (such as punch cards and paper tape). The storage hardware may include cache memory, which may be collocated with or integrated with processing hardware. Storage hardware may have read-only, write-once, or read/write properties. Storage hardware may be random access or sequential access. Storage hardware may be location-addressable, file-addressable, and/or content-addressable.

Examples of nonvolatile memory devices include flash memory (including NAND and NOR technologies), solid state drives (SSDs), an erasable programmable read-only memory device such as an electrically erasable programmable read-only memory (EEPROM) device, and a mask read-only memory device (ROM). Examples of volatile memory devices include processor registers and random-access memory (RAM), such as static RAM (SRAM), dynamic RAM (DRAM), synchronous DRAM (SDRAM), synchronous graphics RAM (SGRAM), and video RAM (VRAM). Examples of magnetic storage media include analog magnetic tape, digital magnetic tape, and rotating hard disk drive (HDDs). Examples of optical storage media include a CD (such as a CD-R, CD-RW, or CD-ROM), a DVD, a Blu-ray disc, and an Ultra HD Blu-ray disc.

Examples of storage implemented by the storage hardware include a distributed ledger, such as a permissioned or permissionless blockchain. Entities recording transactions, such as in a blockchain, may reach consensus using an algorithm such as proof-of-stake, proof-of-work, and proof-of-storage. Elements of the present disclosure may be represented by or encoded as non-fungible tokens (NFTs). Ownership rights related to the non-fungible tokens may be recorded in or referenced by a distributed ledger. Transactions initiated by or relevant to the present disclosure may use one or both of fiat currency and cryptocurrencies, examples of which include bitcoin and ether. Some or all features of hardware may be defined using a language for hardware description, such as IEEE Standard 1364-2005 (commonly called "Verilog") and IEEE Standard 1076-2008 (commonly called "VHDL"). The hardware description language may be used to manufacture and/or program hardware.

A special-purpose system may be distributed across multiple different software and hardware entities. Communication within a special-purpose system and between special-purpose systems may be performed using networking hardware. The distribution may vary across embodiments and may vary over time. For example, the distribution may vary based on demand, with additional hardware and/or software entities invoked to handle higher demand. In various embodiments, a load balancer may direct requests to one of multiple instantiations of the special purpose system. The hardware and/or software entities may be physically distinct and/or may share some hardware and/or software, such as in a virtualized environment. Multiple hardware entities may be referred to as a server rack, server farm, data center, etc.

Software includes instructions that are machine-readable and/or executable. Instructions may be logically grouped into programs, codes, methods, steps, actions, routines, functions, libraries, objects, classes, etc. Software may be stored by storage hardware or encoded in other hardware. Software encompasses (i) descriptive text to be parsed, such as HTML (hypertext markup language), XML (extensible markup language), and JSON (JavaScript Object Notation), (ii) assembly code, (iii) object code generated from source code by a compiler, (iv) source code for execution by an interpreter, (v) bytecode, (vi) source code for compilation and execution by a just-in-time compiler, etc. As examples only, source code may be written using syntax from languages including C, C++, JavaScript, Java, Python, R, etc.

Software also includes data. However, data and instructions are not mutually exclusive categories. In various embodiments, the instructions may be used as data in one or more operations. As another example, instructions may be derived from data. The functional blocks and flowchart elements in this disclosure serve as software specifications, which can be translated into software by the routine work of a skilled technician or programmer. Software may include and/or rely on firmware, processor microcode, an operating system (OS), a basic input/output system (BIOS), application programming interfaces (APIs), libraries such as dynamic-link libraries (DLLs), device drivers, hypervisors, user applications, background services, background applications, etc. Software includes native applications and web applications. For example, a web application may be served to a device through a browser using hypertext markup language 5th revision (HTML5).

Software may include artificial intelligence systems, which may include machine learning or other computational intelligence. For example, artificial intelligence may include one or more models used for one or more problem domains. When presented with many data features, identification of a subset of features that are relevant to a problem domain may improve prediction accuracy, reduce storage space, and increase processing speed. This identification may be referred to as feature engineering. Feature engineering may be performed by users or may only be guided by users. In various implementations, a machine learning system may computationally identify relevant features, such as by performing singular value decomposition on the contributions of different features to outputs.

Examples of the models include recurrent neural networks (RNNs) such as long short-term memory (LSTM), deep learning models such as transformers, decision trees, support-vector machines, genetic algorithms, Bayesian networks, and regression analysis. Examples of systems based on a transformer model include bidirectional encoder representations from transformers (BERT) and generative pre-trained transformers (GPT). Training a machine-learning model may include supervised learning (for example, based on labelled input data), unsupervised learning, and reinforcement learning. In various embodiments, a machine-learning model may be pre-trained by their operator or by a third party. Problem domains include nearly any situation where structured data can be collected, and includes natural language processing (NLP), computer vision (CV), classification, image recognition, etc.

Some or all of the software may run in a virtual environment rather than directly on hardware. The virtual environment may include a hypervisor, emulator, sandbox, container engine, etc. The software may be built as a virtual machine, a container, etc. Virtualized resources may be controlled using, for example, a DOCKER container platform, a pivotal cloud foundry (PCF) platform, etc.

In a client-server model, some of the software executes on first hardware identified functionally as a server, while other of the software executes on second hardware identified functionally as a client. The identity of the client and server is not fixed: for some functionality, the first hardware may act as the server while for other functionality, the first hardware may act as the client. In different embodiments and in different scenarios, functionality may be shifted between the client and the server. In one dynamic example, some functionality normally performed by the second hardware is shifted to the first hardware when the second hardware has less capability. In various embodiments, the term "local" may be used in place of "client," and the term "remote" may be used in place of "server."

Some or all of the software may be logically partitioned into microservices. Each microservice offers a reduced subset of functionality. In various embodiments, each microservice may be scaled independently depending on load, either by devoting more resources to the microservice or by instantiating more instances of the microservice. In various embodiments, functionality offered by one or more microservices may be combined with each other and/or with other software not adhering to a microservices model.

Some or all of the software may be arranged logically into layers. In a layered architecture, a second layer may be logically placed between a first layer and a third layer. The first layer and the third layer would then generally interact with the second layer and not with each other. In various embodiments, this is not strictly enforced—that is, some direct communication may occur between the first and third layers.

The invention claimed is:

1. A heat engine configured to receive a high-pressure fluid and release a low-pressure fluid, the heat engine comprising:
a main housing including an expansion tank and a generator housing;
a scroll decompressor disposed in the expansion tank, wherein the scroll decompressor is configured to progressively decompress the high-pressure fluid to the low-pressure fluid while rotating a main shaft, wherein the scroll decompressor includes an outlet open to atmosphere;
a generator disposed in the generator housing, wherein the generator is driven by the main shaft; and
a coupling disposed on the main housing configured to couple with a power receiving device, wherein:
the coupling is configured to transfer rotational motion of the generator to a rotational input of the power receiving device, and
the power receiving device is external to the heat engine.

2. The heat engine of claim 1, wherein:
the main housing includes a power take-off (PTO) housing, and
the PTO housing includes gears to convert rotation of the main shaft to an input of the coupling.

3. The heat engine of claim 2, wherein the coupling includes a magnetic coupling.

4. The heat engine of claim 1, wherein the power receiving device includes at least one of a power generator, an air compressor, a heat pump, a gear driven device, an electric vehicle, and a mechanical pump.

5. The heat engine of claim 1, wherein the main housing includes a refrigerant tank that houses a refrigerant pump configured to pump a refrigerant.

6. The heat engine of claim 5, wherein the refrigerant pump is configured to be driven by the main shaft.

7. The heat engine of claim 5, wherein the refrigerant includes R744.

8. The heat engine of claim 5, further comprising an evaporator coupled to the refrigerant tank through a high-pressure liquid pipe.

9. The heat engine of claim 8, further comprising a condenser coupled to the refrigerant tank and configured to provide a low-pressure liquid to the refrigerant tank.

10. The heat engine of claim 9, further comprising a low-pressure gas return configured to provide a low-pressure gas from the scroll decompressor to the condenser.

11. The heat engine of claim 1, wherein the generator includes a permanent magnet (PM) with an oil cooled jacket.

12. The heat engine of claim 1, wherein the high-pressure fluid includes natural gas.

13. The heat engine of claim 1, wherein the high-pressure fluid includes a high-pressure process gas selected from the group consisting essentially of: propane, carbon dioxide, compressed air, and nitrogen.

14. The heat engine of claim 1, wherein the high-pressure fluid includes transformer oil.

15. The heat engine of claim 1, wherein the scroll decompressor is configured to progressively decompress the high-pressure fluid to the low-pressure fluid at a ratio of 3.5:1.

16. The heat engine of claim 1, wherein the scroll decompressor is configured to progressively decompress the high-pressure fluid to the low-pressure fluid at a ratio of 4:1.

17. The heat engine of claim 1, wherein the scroll decompressor is configured to decompress the high-pressure fluid by about 3.10 MPa.

18. The heat engine of claim 1, wherein the generator is configured to provide a net output of between 30 kWe to 40 kWe.

19. The heat engine of claim 1, wherein the high-pressure fluid has a hot temperature range of between about 90° F. and about 131° F.

20. The heat engine of claim 1, wherein the high-pressure fluid has a cold temperature range of between about 34° F. and about 75° F.

21. The heat engine of claim 1, further comprising:
a stand including a base and a vertical support wall,
wherein the stand is configured to support the heat engine.

22. The heat engine of claim 21, wherein the heat engine, including the stand, occupies a volume of about 114.3 cm by about 83.8 cm by about 165.1 cm.

* * * * *